United States Patent
Oguni et al.

(10) Patent No.: US 11,088,363 B2
(45) Date of Patent: Aug. 10, 2021

(54) POSITIVE ELECTRODE ACTIVE MATERIAL FOR SECONDARY BATTERY, SECONDARY BATTERY, BATTERY MANAGEMENT UNIT, AND ELECTRONIC DEVICE

(71) Applicant: SEMICONDUCTOR ENERGY LABORATORY CO., LTD., Atsugi (JP)

(72) Inventors: Teppei Oguni, Kanagawa (JP); Takuya Miwa, Mie (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 487 days.

(21) Appl. No.: 15/446,041

(22) Filed: Mar. 1, 2017

(65) Prior Publication Data
US 2017/0256785 A1 Sep. 7, 2017

(30) Foreign Application Priority Data
Mar. 3, 2016 (JP) .............................. JP2016-040959

(51) Int. Cl.
*H01M 4/136* (2010.01)
*C01B 25/45* (2006.01)
(Continued)

(52) U.S. Cl.
CPC .............. *H01M 4/136* (2013.01); *C01B 25/45* (2013.01); *H01M 4/366* (2013.01);
(Continued)

(58) Field of Classification Search
CPC ........... H01M 10/052; H01M 10/0525; H01M 4/366; H01M 4/136; H01M 4/5825; H01M 10/425
See application file for complete search history.

(56) References Cited

U.S. PATENT DOCUMENTS 6,110,417 A * 8/2000 Sugikawa .......... B01D 39/2044
419/2
7,718,314 B2 5/2010 Komiyama et al.
(Continued)

FOREIGN PATENT DOCUMENTS

JP 11-025983 A 1/1999
JP 2004-079276 A 3/2004
(Continued)

OTHER PUBLICATIONS

Kang.B et al., "Battery Materials for Ultrafast Charging and Discharging", Nature, Letters, Mar. 12, 2009, vol. 458, No. 7235, pp. 190-193.
(Continued)

*Primary Examiner* — Olatunji A Godo
(74) *Attorney, Agent, or Firm* — Nixon Peabody LLP; Jeffrey L. Costellia

(57) ABSTRACT

A lithium-ion secondary battery including a lithium-containing complex phosphate as a positive electrode active material is provided. Furthermore, a positive electrode active material with high diffusion rate of lithium ions is provided to provide a lithium-ion secondary battery with high output. A positive electrode active material of a lithium-ion secondary battery includes a first plate-like component and a second plate-like component, a third prismatic component between the first component and the second component, and a space between the first component and the second component.

22 Claims, 36 Drawing Sheets

(51) Int. Cl.
*H01M 4/36* (2006.01)
*H01M 4/58* (2010.01)
*H01M 10/0525* (2010.01)
*H01M 10/42* (2006.01)
*H01M 4/02* (2006.01)

(52) U.S. Cl.
CPC ..... *H01M 4/5825* (2013.01); *H01M 10/0525* (2013.01); *H01M 10/425* (2013.01); *H01M 2004/028* (2013.01); *H01M 2010/4278* (2013.01); *H01M 2220/20* (2013.01); *H01M 2220/30* (2013.01); *Y02E 60/10* (2013.01); *Y02T 10/70* (2013.01)

(56) References Cited

U.S. PATENT DOCUMENTS

| | | | |
|---|---|---|---|
| 8,945,498 | B2 | 2/2015 | Futamura |
| 2004/0096743 | A1 | 5/2004 | Okae et al. |
| 2008/0248382 | A1 | 10/2008 | Sastry et al. |
| 2008/0268339 | A1 | 10/2008 | Suzuki |
| 2009/0197174 | A1 | 8/2009 | Levassbur et al. |
| 2009/0305135 | A1* | 12/2009 | Shi .................. B82Y 30/00 429/217 |
| 2010/0163790 | A1 | 7/2010 | Ceder et al. |
| 2010/0176337 | A1* | 7/2010 | Zhamu .............. H01M 4/1395 252/182.1 |
| 2010/0203389 | A1* | 8/2010 | Yoshida .............. C01B 25/45 429/224 |
| 2011/0195310 | A1 | 8/2011 | Kawamoto et al. |
| 2012/0244430 | A1* | 9/2012 | Yamazaki ............ H01M 4/131 429/211 |
| 2014/0197802 | A1* | 7/2014 | Yamazaki ............ H02J 7/0052 320/137 |

FOREIGN PATENT DOCUMENTS

| | | |
|---|---|---|
| JP | 2004-095385 A | 3/2004 |
| JP | 2006-252945 A | 9/2006 |
| JP | 2007-103339 A | 4/2007 |
| JP | 4767798 | 9/2011 |
| JP | 2012-221716 A | 11/2012 |
| WO | WO-2006/027925 | 3/2006 |
| WO | WO-2008/07447 | 7/2008 |

OTHER PUBLICATIONS

Zhou.F et al., "The Li intercalation potential of LiMPO4 and LiMSiO4 olivines with M=Fe, Mn, Co, Ni", Electrochemistry Communications, Nov. 1, 2004, vol. 6, No. 11, pp. 1144-1148.

Yang.S et al., "Hydrothermal Synthesis of Lithium Iron Phosphate Cathodes", Electrochemistry Communications, 2001, vol. 3, No. 9, pp. 505-508.

Liang.G et al., "Anisotropy in magnetic properties and electronic structure of single-crystal LiFePO4", Phys. Rev. B (Physical Review. B), 2008, vol. 77, pp. 064414-1-064414-12.

Tannai.H et al., "Optimization of Hydrothermal Synthesis Process and Evaluation of LiFePO4 Cathode for Rechargable Lithium Batteries", The 48th Batter Symposium in Japan, Nov. 13, 2007, pp. 66-67.

Dokko.K et al., "Electrochemical properties of LiFePO4 prepared via hydrothermal route", Journal of Power Sources, Mar. 20, 2007, vol. 165, No. 2, pp. 656-659.

* cited by examiner

FIG. 15A
FIG. 15B
FIG. 15C
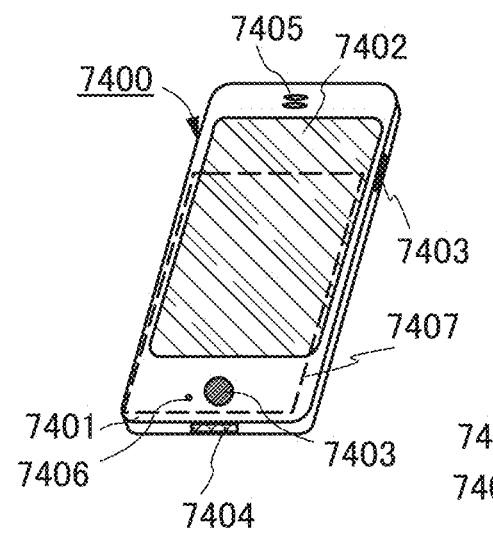
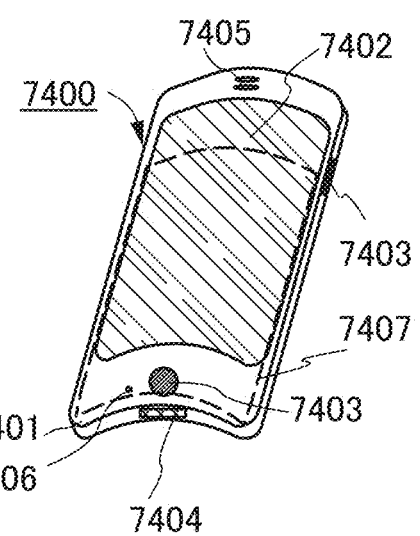
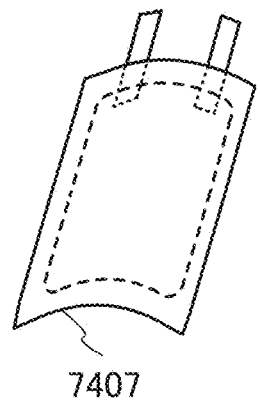
FIG. 15D
FIG. 15E
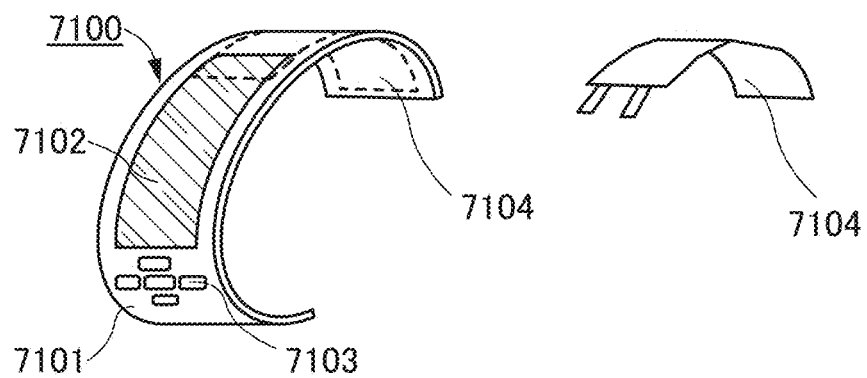

POSITIVE ELECTRODE ACTIVE MATERIAL FOR SECONDARY BATTERY, SECONDARY BATTERY, BATTERY MANAGEMENT UNIT, AND ELECTRONIC DEVICE

BACKGROUND OF THE INVENTION

1. Field of the Invention

The present invention relates to a lithium-containing complex phosphate. The present invention also relates to a lithium-ion secondary battery including an electrode in which a lithium-containing oxide is used as an active material. The present invention also relates to a battery management unit and an electronic device.

2. Description of the Related Art

In recent years, power storage devices such as lithium ion secondary batteries have been developed.

Examples of such power storage devices include a power storage device having an electrode formed using lithium iron phosphate ($LiFePO_4$), which is a composite oxide, as an active material. The power storage device having an electrode formed using $LiFePO_4$ has high thermal stability and favorable cycle characteristics.

As an example of a method for forming a composite oxide such as $LiFePO_4$, a hydrothermal method can be used (e.g., Patent Document 1). A hydrothermal method is a method, which is performed in the presence of hot water, for synthesizing a compound or growing crystal of a compound.

By using a hydrothermal method, even a material which is less likely to be dissolved in water at ordinary temperatures and pressures can be dissolved, and thus a substance which is hardly obtained by a production method performed at ordinary temperatures and pressures can be synthesized or crystal growth of such a substance can be conducted. Further, by using a hydrothermal method, microparticles of single crystals of an objective substance can be easily synthesized.

Using a hydrothermal method, for example, enables a desired compound to be formed in the following manner: a solution containing a raw material is introduced into a container resistant to pressure and be subjected to heat and pressure treatment; and the treated solution is filtered.

REFERENCE

Patent Document

[Patent Document 1] Japanese Published Patent Application No. 2004-95385

SUMMARY OF THE INVENTION

It is highly demanded that in-vehicle secondary batteries for HEVs, EVs, PHEVs, and the like and stationary secondary batteries among lithium-ion secondary batteries for a variety of uses have higher output. To achieve high output of the lithium-ion secondary battery, the electrode reaction speed and the diffusion rate of lithium are required to be high. The output of the lithium-ion secondary battery can be increased by increasing the diffusion rate of lithium in a composite oxide such as $LiFePO_4$ used as a positive electrode active material.

In view of the above, an object of one embodiment of the present invention is to provide a composite oxide such as $LiFePO_4$ with high diffusion rate of lithium. Another object of one embodiment of the present invention is to provide a positive electrode active material with high diffusion rate of lithium. Another object of one embodiment of the present invention is to provide a lithium-ion secondary battery with high output. Another object of one embodiment of the present invention is to provide a novel battery.

Note that the descriptions of these objects do not disturb the existence of other objects. In one embodiment of the present invention, there is no need to achieve all the objects. Other objects will be apparent from and can be derived from the description of the specification, the drawings, the claims, and the like.

One embodiment of the invention disclosed in this specification is a positive electrode active material of a lithium-ion secondary battery including a first plate-like component, a second plate-like component, a third component between the first component and the second component, and a space between the first component and the second component.

In one embodiment of the present invention, the first component includes a first surface, a second surface, and a third surface. The first surface has a larger area than the third surface. The second surface has a larger area than the third surface.

In one embodiment of the present invention, the first surface and the second surface do not share a side.

In one embodiment of the present invention, the first surface has a substantially n-gon shape (n is a natural number of 5 or more), and at least one of interior angles of the n-gon shape is 100° or less.

In one embodiment of the present invention, the third component has a substantially polygonal columnar shape, and one or a plurality of the third component is included between the first component and the second component.

In one embodiment of the present invention, the first component, the second component, and the third component include lithium (Li), a metal, phosphorus (P), and oxygen (O), and the metal includes at least one or more elements selected from iron (Fe), manganese (Mn), cobalt (Co), and nickel (Ni).

In one embodiment of the present invention, the first component, the second component, and the third component include lithium (Li), iron (Fe), phosphorus (P), and oxygen (O).

In one embodiment of the present invention, the first component, the second component, and the third component include lithium iron phosphate.

In one embodiment of the present invention, the first component, the second component, and the third component include $LiFePO_4$.

One embodiment of the present invention is a secondary battery including a positive electrode including the positive electrode active material according to any one of the above embodiments of the present invention, a negative electrode, and an electrolyte.

One embodiment of the present invention is a battery management unit including the secondary battery according to any one of the above embodiments of the present invention and a control circuit.

One embodiment of the present invention is an electronic device including the secondary battery according to any one of the above embodiments of the present invention and a power switch.

One embodiment of the present invention is an electronic device including the secondary battery according to any one of the embodiments of the present invention and a display device.

One embodiment of the present invention is an electronic device including the secondary battery according to any one of the embodiments of the present invention and an input-output terminal and the input-output terminal is configured to perform wireless communication.

A positive electrode active material with high diffusion rate of lithium can be provided. One embodiment of the present invention can provide a composite oxide such as $LiFePO_4$ with high speed diffusion rate of lithium. One embodiment of the present invention can provide a lithium-ion secondary battery with high output. One embodiment of the present invention can provide a novel battery.

Note that one embodiment of the present invention is not limited to these effects. For example, depending on circumstances or conditions, one embodiment of the present invention might produce another effect. Furthermore, depending on circumstances or conditions, one embodiment of the present invention might not produce any of the above effects.

BRIEF DESCRIPTION OF THE DRAWINGS

In the accompanying drawings:

FIGS. 2A1 to 2A6 and 2B1 to 2B6 each show a schematic view of a lithium-containing complex phosphate;

FIGS. 15A to 15E illustrate flexible laminated secondary batteries;

FIGS. 17A1, 17A2, 17B1, and 17B2 illustrate examples of power storage devices;

FIGS. 31A, 31B, 31C1, 31C2, and 31D are a perspective view, a top view, and cross-sectional views illustrating a structure example of a secondary battery;

DETAILED DESCRIPTION OF THE INVENTION

Figure 1:
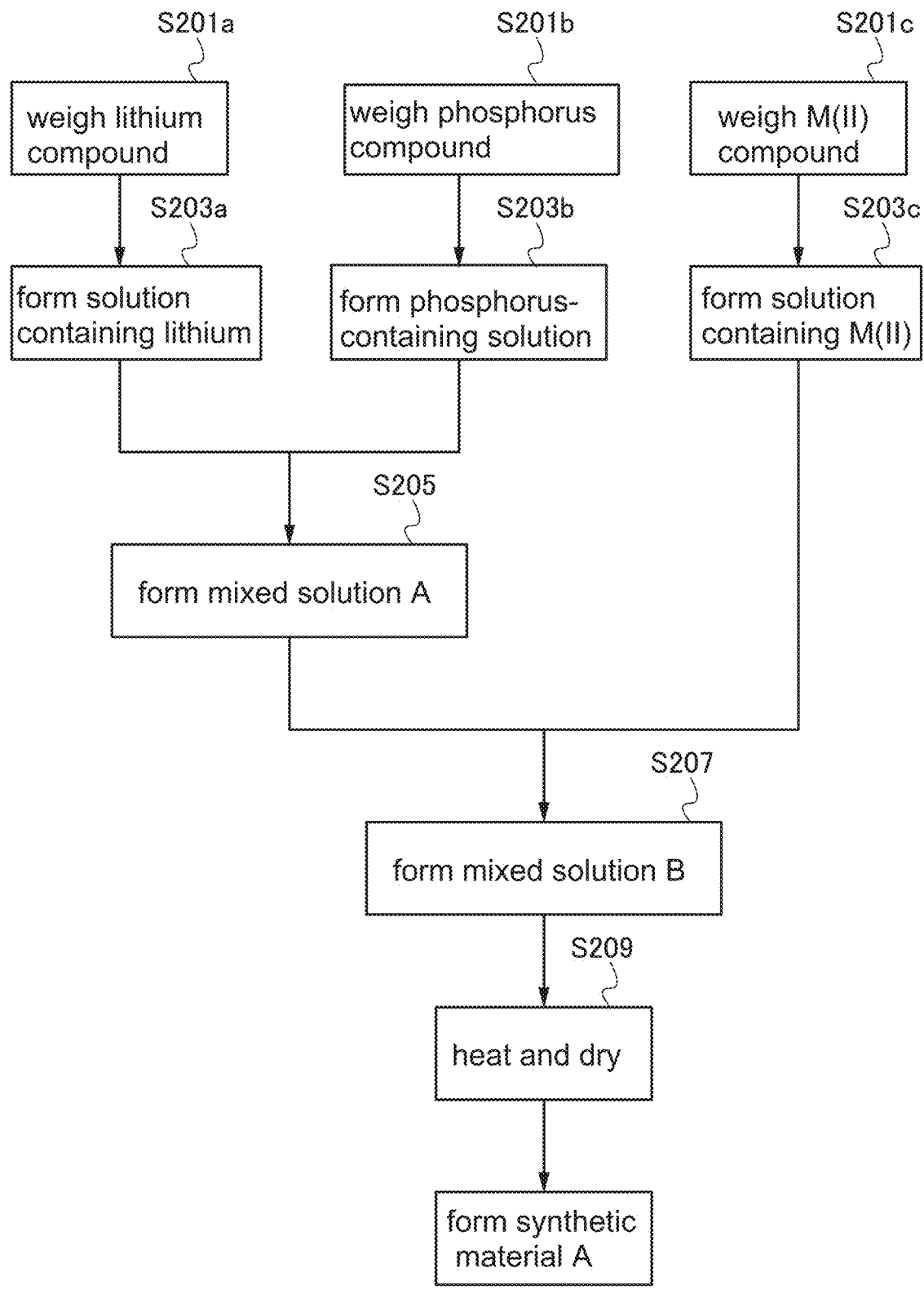
FIG. 1 shows a method for manufacturing a lithium-containing complex phosphate.

Embodiments of the present invention will be described below. However, the present invention is not limited to the description below, and it is easily understood by those skilled in the art that modes and details disclosed herein can be modified in various ways. Therefore, the present invention is not construed as being limited to the description of the embodiments below.

Note that the terms "film" and "layer" can be interchanged with each other depending on circumstances or conditions. For example, the term "conductive layer" can be changed into the term "conductive film" in some cases. Also, the term "insulating film" can be changed into the term "insulating layer" in some cases.

Note that in each drawing described in this specification, the size, the thickness, or the like of each component such as a positive electrode, a negative electrode, an active material layer, a separator, an exterior body, and the like is exaggerated for clarity in some cases. Therefore, the sizes of the components are not limited to the sizes in the drawings and relative sizes between the components.

Note that in the structures of one embodiment of the present invention described in this specification and the like, the same portions or portions having similar functions in different drawings are denoted by the same reference numerals, and description of such portions is not repeated. Further, the same hatching pattern is applied to portions having similar functions, and the portions are not especially denoted by reference numerals in some cases.

In this specification, the power storage device is a collective term describing elements and devices having a power storage function. For example, a storage battery such as the lithium-ion secondary battery (also referred to as secondary battery), a lithium-ion capacitor, and an electric double layer capacitor are included in the category of the power storage device.

The descriptions in embodiments for the present invention can be combined with each other as appropriate.

Embodiment 1

In this embodiment, a method for manufacturing a lithium-containing complex phosphate according to one embodiment of the present invention will be described with reference to FIG. 1.

In a step S201a, a lithium compound is weighed. In a step S201b, a phosphorus compound is weighed. In a step S201c, one or more of an iron(II) compound, a manganese(II) compound, a cobalt(II) compound, and a nickel(II) compound (hereinafter referred to as an M(II) compound) are weighed.

Typical examples of the lithium compound are lithium hydroxide-hydrate (LiOH.H$_2$O), lithium chloride (LiCl), lithium carbonate (Li$_2$CO$_3$), lithium acetate (LiCH$_3$COO), and lithium oxalate ((COOLi)$_2$).

Typical examples of the phosphorus compound are a phosphoric acid such as orthophosphoric acid (H$_3$PO$_4$), and ammonium hydrogenphosphates such as diammonium hydrogenphosphate ((NH$_4$)$_2$HPO$_4$) and ammonium dihydrogenphosphate (NH$_4$H$_2$PO$_4$).

Typical examples of the iron(II) compound are iron chloride tetrahydrate (FeCl$_2$.4H$_2$O), iron sulfate heptahydrate (FeSO$_4$.7H$_2$O), and iron acetate (Fe(CH$_3$COO)$_2$).

Typical examples of the manganese(II) compound are manganese chloride tetrahydrate (MnCl$_2$.4H$_2$O), manganese sulfate-hydrate (MnSO$_4$.H$_2$O), and manganese acetate tetrahydrate (Mn(CH$_3$COO)$_2$.4H$_2$O).

Typical examples of the cobalt(II) compound are cobalt chloride hexahydrate (CoCl$_2$.6H$_2$O), cobalt sulfate heptahydrate (CoSO$_4$.7H$_2$O), and cobalt acetate tetrahydrate (Co(CH$_3$COO)$_2$.4H$_2$O).

Typical examples of the nickel(II) compound are nickel chloride hexahydrate (NiCl$_2$.6H$_2$O), nickel sulfate hexahydrate (NiSO$_4$.6H$_2$O), and nickel acetate tetrahydrate (Ni(CH$_3$COO)$_2$.4H$_2$O).

In a step S203a, the lithium compound is dissolved in a solvent to form a solution containing lithium. Similarly, in a step S203b and a step S203c, the phosphorus compound and the M(II) compound are dissolved in solvents to form a solution containing phosphorus and a solution containing M(II), respectively.

As the solvents in which the lithium compound, the phosphorus compound, and the M(II) compound are dissolved, water is given.

In a step S205, the lithium-containing solution formed in the step S203 a and the phosphorus-containing solution formed in the step S203b are mixed to form a mixed solution A in an air atmosphere.

Note that instead of the mixed solution A, a solution containing lithium and phosphorus may be formed by dissolving a lithium salt such as Li$_3$PO$_4$, Li$_2$HPO$_4$, or LiH$_2$PO$_4$ in a solvent such as water.

In a step S207, while the mixed solution A formed in the step S205 is stirred, the M(II)-containing solution is added dropwise to the mixed solution A little by little, so that a mixed solution B is formed in an air atmosphere.

In the step S205, a precipitate may be formed in the mixed solution A depending on the concentrations of the lithium-containing solution and the phosphorus-containing solution. The existence of the precipitate prevents the dropwise addition by causing clogging of a nozzle of a dripping apparatus when the mixed solution A is added dropwise. In this manner, it is preferable to drip the M(II)-containing solution little by little while stirring the mixed solution A in the step S207.

In a step S209, the mixed solution B is put in a container resistant to heat and pressure such as an autoclave, heated at 100° C. to 350° C. inclusive and at 0.1 MPa to 100 MPa inclusive, for 0.5 hours to 24 hours inclusive, and then cooled. After that, the mixture in the container resistant to heat and pressure is filtrated, the obtained solid is washed with water, and dried.

As a result, an olivine-type lithium-containing complex phosphate (LiMPO$_4$ (M is one or more of Fe(II), Ni(II), Co(II), and Mn(II))) can be formed as a synthetic material A with high yield. As the lithium-containing complex phosphate, LiFePO$_4$, LiNiPO$_4$, LiCoPO$_4$, LiMnPO$_4$, LiFe$_a$Ni$_b$PO$_4$, LiFe$_a$Co$_b$PO$_4$, LiFe$_a$Mn$_b$PO$_4$, LiNi$_a$Co$_b$PO$_4$, LiNi$_a$Mn$_b$PO$_4$ (a+b≤1, 0<a<1, 0<b<1), LiFe$_c$Ni$_d$Co$_e$PO$_4$, LiFe$_c$Ni$_d$Mn$_e$PO$_4$, LiNi$_c$Co$_d$Mn$_e$PO$_4$ (c+d+e≤1, 0<c<1, 0<d<1, 0<e<1), LiFe$_f$Ni$_g$Co$_h$Mn$_i$PO$_4$ (f+g+h+i≤1, 0<f<1, 0<g<1, 0<h<1, 0<i<1), or the like can be obtained as appropriate depending on the type of the M(II) compound. The lithium-containing complex phosphate obtained in this embodiment might be a single-crystal grain.

Here, the shape of the lithium-containing complex phosphate obtained by the manufacturing method shown in FIG. 1 will be described.

Figures 1, 2A:
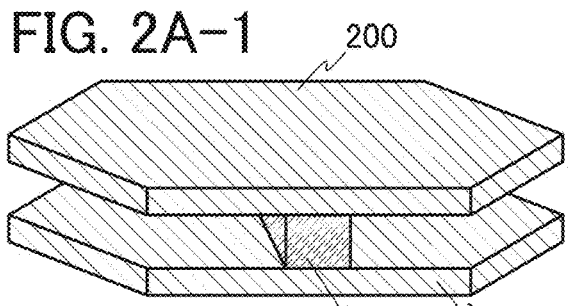
Figures 1, 2B:
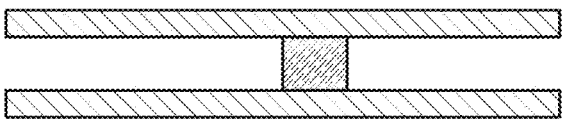
Figures 2, 2A:
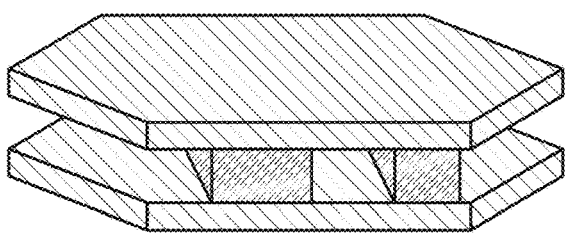
Figures 2, 2B:
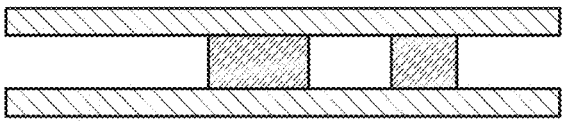
Figures 2, 2A, 3:
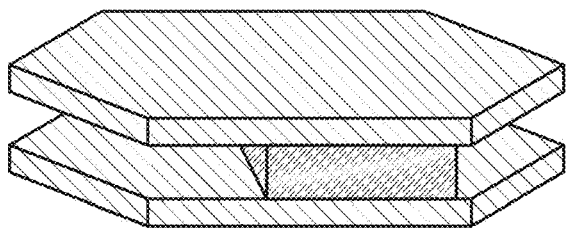
Figures 2, 2B, 3:
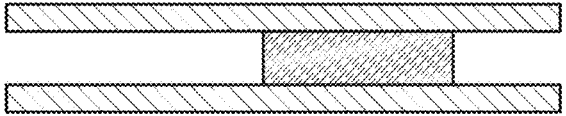
Figures 2, 2A, 3, 4:
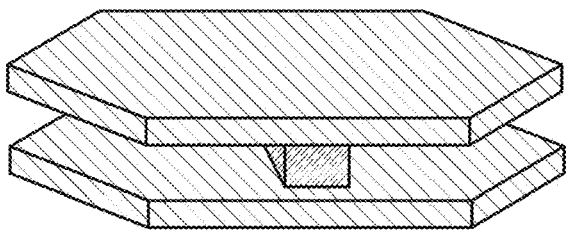
Figures 2, 2B, 3, 4:
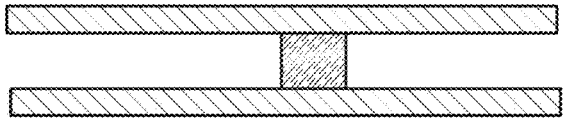
Figures 2, 2A, 3, 4, 5:
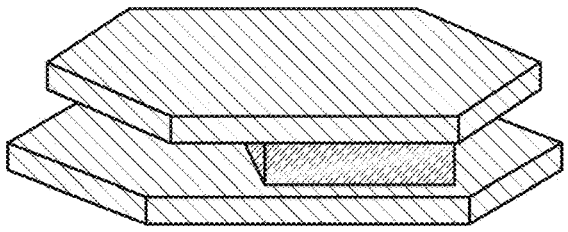
Figures 2, 2B, 3, 4, 5:
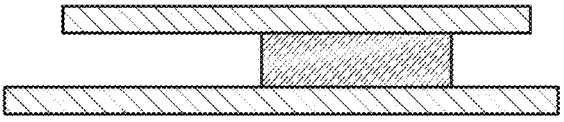
Figures 2, 2A, 3, 4, 5, 6:
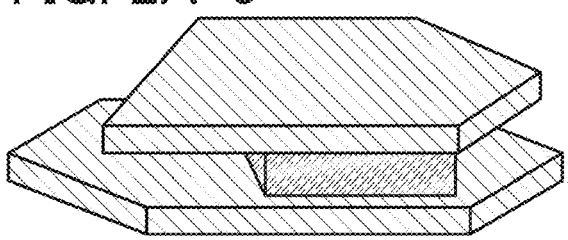
Figures 2, 2B, 3, 4, 5, 6:
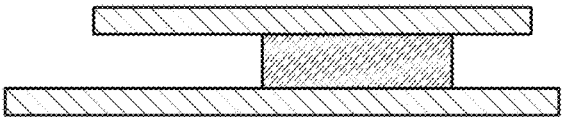

The schematic views of the lithium-containing complex phosphate manufactured according to an embodiment of the present invention are shown in FIGS. 2A1 to 2A6 and 2B1 to 2B6. FIGS. 2A1 to 2A6 are bird's-eye views and FIGS. 2B1 to 2B6 are cross-sectional views. FIG. 2B1 shows a cross section of FIG. 2A1, FIG. 2B2 shows a cross section of FIG. 2A2, FIG. 2B3 shows a cross section of FIG. 2A3, FIG. 2B4 shows a cross section of FIG. 2A4, FIG. 2B5 shows a cross section of FIG. 2A5, and FIG. 2B6 shows a cross section of FIG. 2A6. The lithium-containing complex phosphate manufactured according to an embodiment of the present invention includes a prismatic component 204 between plate-like components 200 and 202, and in some cases includes a space between the plate-like components 200 and 202 as shown in FIGS. 2A1 to 2A6 and 2B1 to 2B6. Note that the prismatic component 204 between the plate-like components 200 and 202 is a plurality of prismatic components in some cases as shown in FIG. 2A2 or FIG. 2B2. In FIGS. 2A1 to 2A6 and 2B1 to 2B6, the components 200, 202, and 204 are differently hatched for convenient differentiation; however, components 200, 202, and 204 may use the same material and may be integrated to form one lithium-containing complex phosphate. In a case where the lithium-containing complex phosphate manufactured according to an embodiment of the present invention is used as an electrode active material of a secondary battery, a contact area between the lithium-containing complex phosphate and an electrolytic solution increases by the space. The battery reaction of the secondary battery is caused by the insertion-elimination reaction of the ions in the electrodes and thus, when the reaction area of the positive electrode and the lithium ion increases, the reaction speed thereof increases. Therefore, it is possible to increase the output of the secondary battery.

When the lithium-containing complex phosphate includes a plate-like component, the lithium diffusion to the whole region of the plate-like component of the oxide can be completed in a short time. The shape of the plate-like component has a wide surface and a short side and thus, the lithium taken in from the wide surface can reach to the whole region of the oxide by moving only a distance of the short side. Therefore, the reaction speed of the positive electrode and lithium increases. Thus, it is possible to increase the output of the secondary battery.

On a surface of the plate-like component of the lithium-containing complex phosphate, for example, on a surface with the largest area, at least one of interior angles is lower than or equal to 100° and the distance between the particles of the phosphate is increased in a layer manufactured using the phosphate. The increase of the distance between the particles is preferable because the electrolytic solution enters there easily and thus the transfer of lithium ions in the electrolytic solution is easy.

On the other hand, when all the interior angles of the plate-like component are more than or equal to 100°, the plate-like component has a substantially regular polygon shape or circular shape and thus, the particles are close to each other reducing the distance between the particles in some cases. In such a case, the electrolytic solution cannot enter the space easily; thus, inhibits the transfer of lithium ions in the electrolytic solution, and the output of the secondary battery is suppressed in some cases. The battery reaction of the secondary battery is caused by the insertion and elimination of the ions into and from the electrodes and thus, when the transfer of lithium ions increases, the reaction speed of the positive electrode and lithium increases. Therefore, it is possible to increase the output of the secondary battery.

From such a point of view, at least one of the interior angles of the plate-like component of the phosphate is preferably less than or equal to 100°, preferably less than or equal to 95°, more preferably less than or equal to 90°.

In the above manner, with the use of the lithium-containing complex phosphate according to one embodiment of the present invention in a lithium-ion storage battery, the output of the secondary battery can be increased.

Note that the structure described in this embodiment can be combined with any of the structures described in the other embodiments and the examples as appropriate.

In Embodiment 1, one embodiment of the present invention has been described. Other embodiments of the present invention are described in Embodiments 2 to 5. Note that one embodiment of the present invention is not limited to the above examples. In other words, various embodiments of the invention are described in this embodiment and the other embodiments, and one embodiment of the present invention is not limited to a particular embodiment. For example, although an example of use in the secondary battery is described in this embodiment, one embodiment of the present invention is not limited thereto. Depending on circumstances or conditions, application of one embodiment of the present invention to a variety of secondary batteries such as a lead storage battery, a lithium-ion polymer secondary battery, a nickel-hydrogen battery, a nickel-cadmium storage battery, a nickel-iron battery, a nickel-zinc battery, a silver oxide-zinc battery, a solid-state battery, and an air battery is also possible. Application to a variety of power storage devices such as a primary battery, a capacitor, and a lithium-ion capacitor is also possible. Furthermore, depending on circumstances or conditions, for example, one embodiment of the present invention is not necessarily applied to the secondary battery. The case where lithium-containing complex phosphate is provided is described; however, one embodiment of the present invention is not limited to this. Depending on circumstances or conditions, it is acceptable that a variety of materials are provided in one embodiment of the present invention. Alternatively, for example, depending on circumstances or conditions, one embodiment of the present invention does not necessarily include a lithium-containing complex phosphate.

Embodiment 2

In this embodiment, the secondary battery of one embodiment of the present invention and a fabricating method thereof will be described.

<<Structure and Assembly of Secondary Battery>>

Figure 3A:
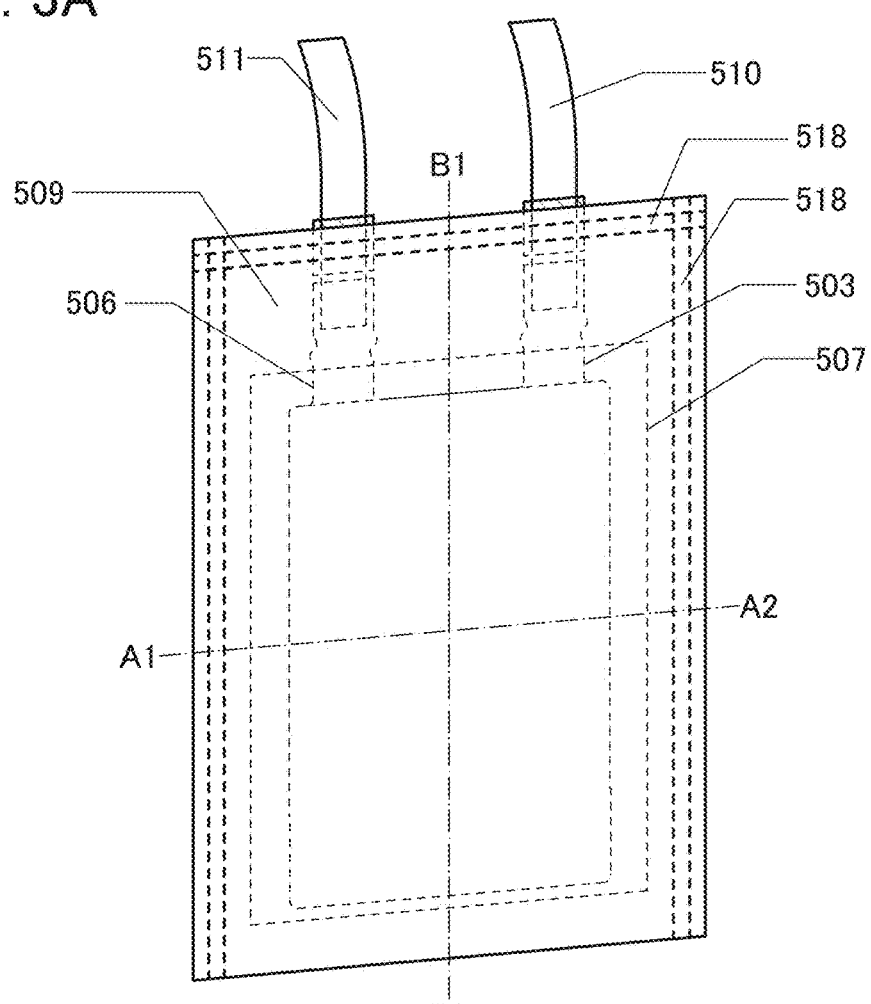
FIGS. 3A to 3C illustrate an example of a secondary battery and examples of electrodes.

A secondary battery 500 of an embodiment of the present invention is illustrated in FIG. 3A. Although FIG. 3A illustrates a mode of a thin secondary battery as an example of the secondary battery, the secondary battery of one embodiment of the present invention is not limited to this example.

As illustrated in FIG. 3A, the secondary battery 500 includes a positive electrode 503, a negative electrode 506, a separator 507, and an exterior body 509. The secondary battery 500 may include a positive electrode lead 510 and a negative electrode lead 511. A bonding portion 518 corresponds to a thermocompression bonding portion in the outer region of the exterior body 509.

Figure 4A:
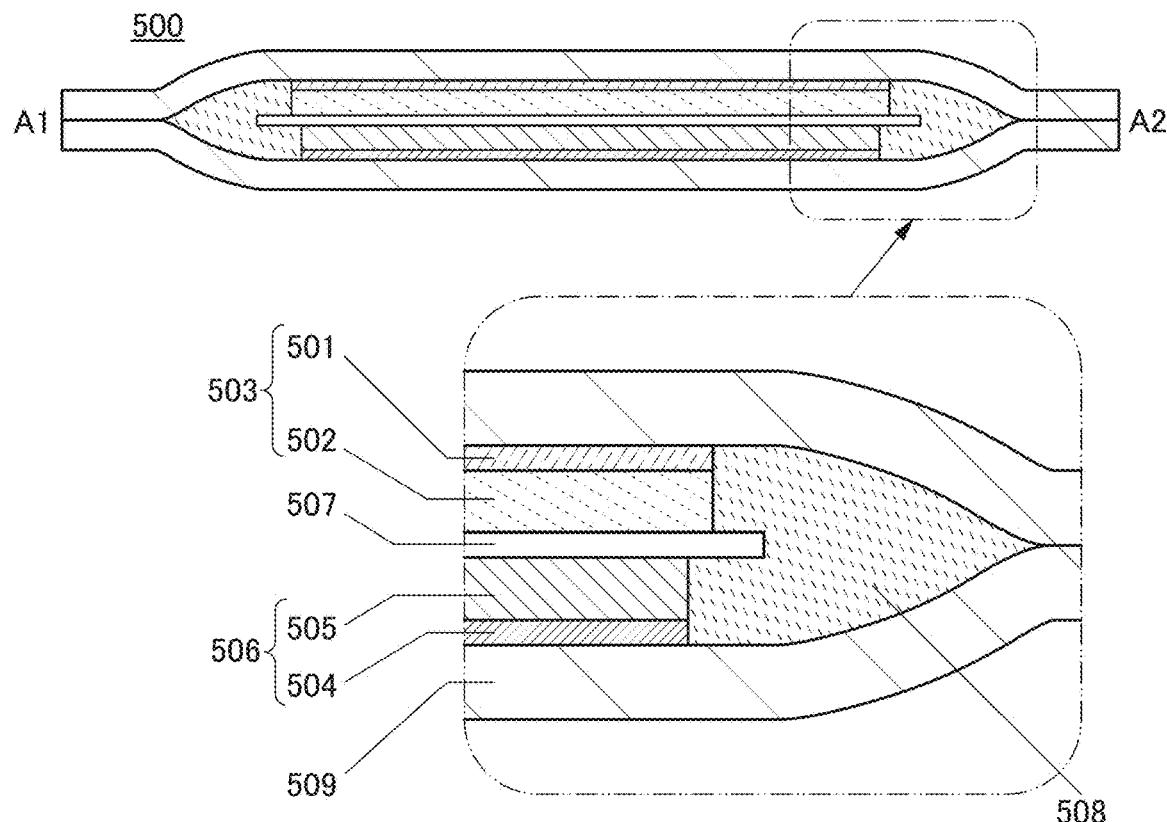
FIGS. 4A and 4B illustrate an example of a secondary battery.
Figure 4B:
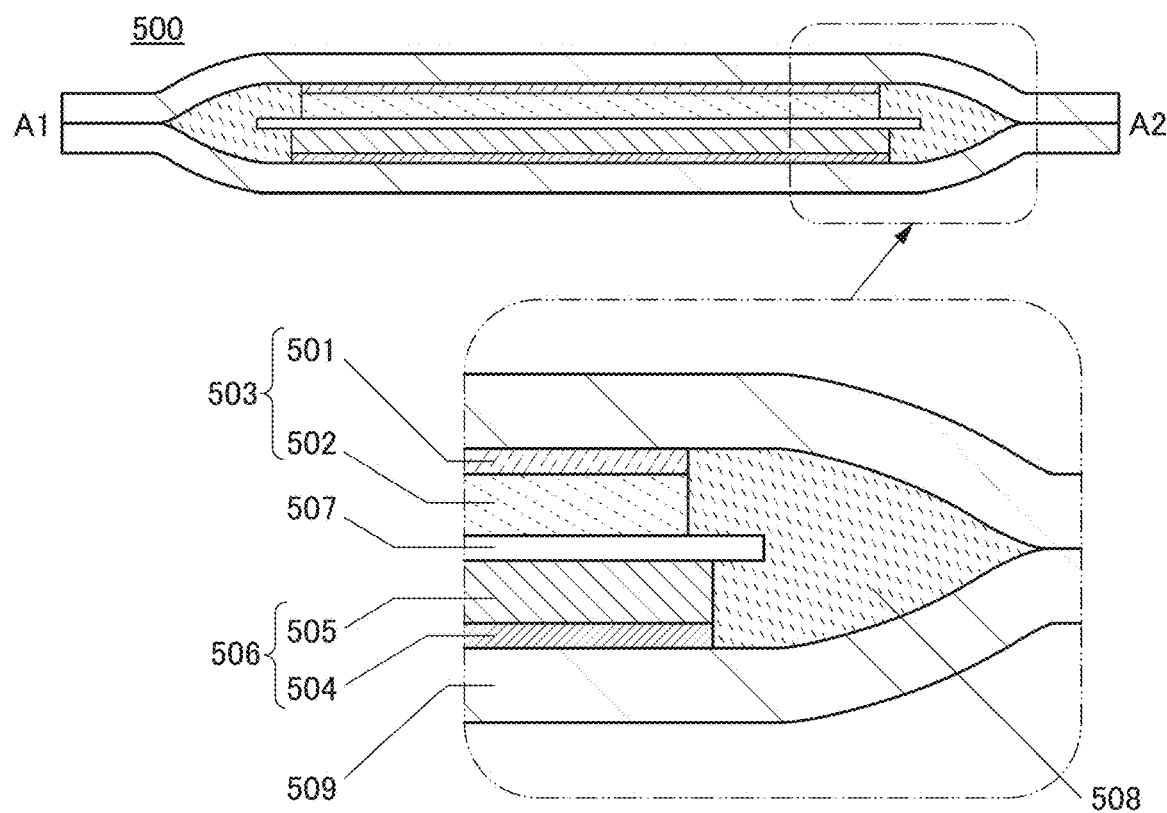

FIGS. 4A and 4B each illustrate an example of a cross-sectional view along dashed-dotted line A1-A2 in FIG. 3A. FIGS. 4A and 4B each illustrate a cross-sectional structure of the secondary battery 500 that is formed using a pair of the positive electrode 503 and the negative electrode 506.

As illustrated in FIGS. 4A and 4B, the secondary battery 500 includes the positive electrode 503, the negative electrode 506, the separator 507, an electrolytic solution 508, and the exterior body 509. The separator 507 is located between the positive electrode 503 and the negative electrode 506. The electrolytic solution 508 is included in the exterior body 509.

The positive electrode 503 includes a positive electrode active material layer 502 and a positive electrode current collector 501. The negative electrode 506 includes a negative electrode active material layer 505 and a negative electrode current collector 504. The active material layer is formed on one surface or opposite surfaces of the current collector. The separator 507 is located between the positive electrode current collector 501 and the negative electrode current collector 504.

A battery cell may include one or more positive electrodes and one or more negative electrodes. For example, the battery cell can have a stacked-layer structure including a plurality of positive electrodes and a plurality of negative electrodes.

Figure 5A:
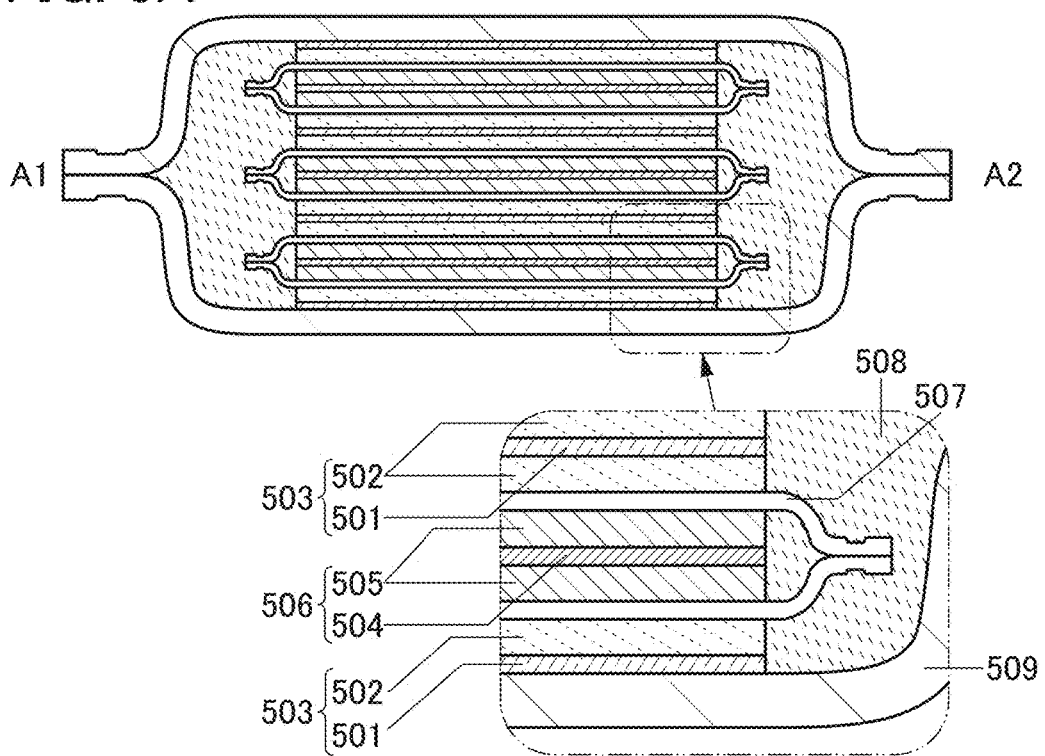
FIGS. 5A and 5B illustrate an example of a secondary battery.
Figure 5B:
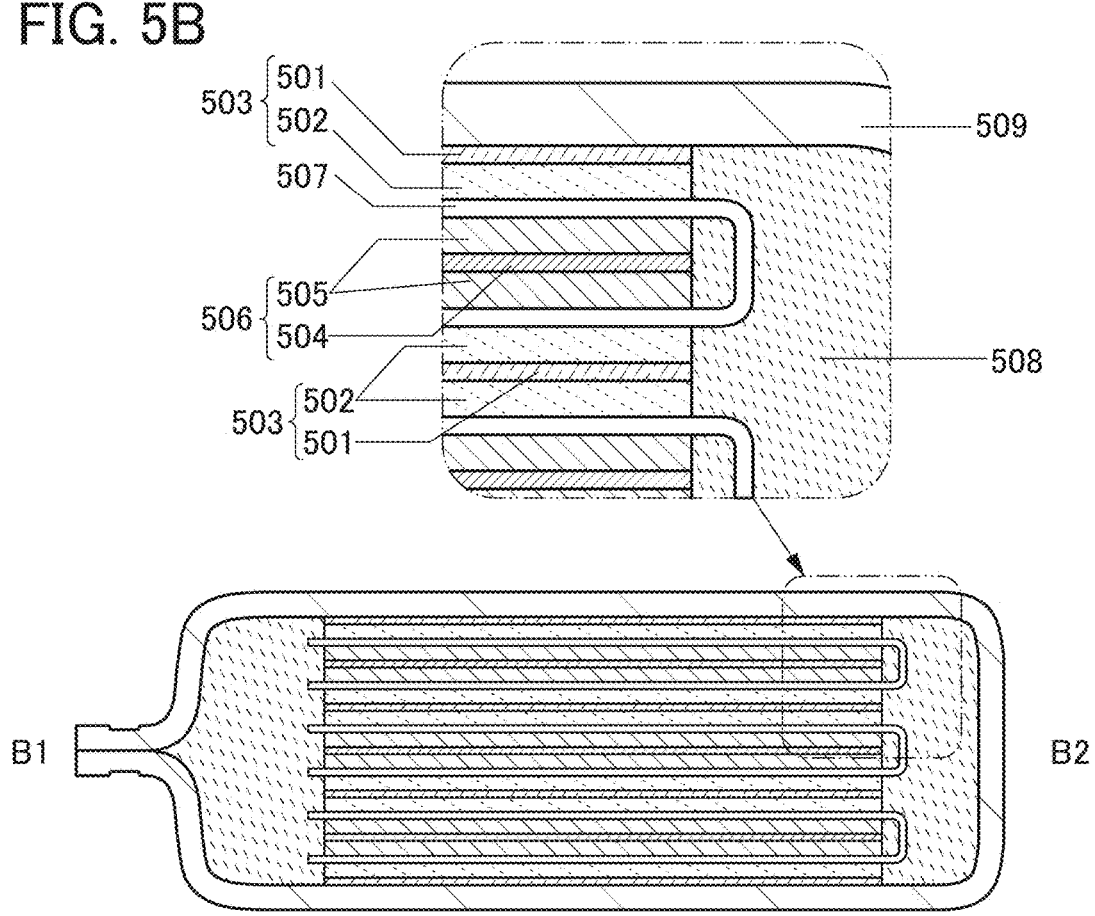

FIG. 5A illustrates another example of a cross-sectional view along dashed-dotted line A1-A2 in FIG. 3A. FIG. 5B is a cross-sectional view along dashed-dotted line B1-B2 in FIG. 3A.

FIGS. 5A and 5B illustrate a cross-sectional structure of the secondary battery 500 that is formed using a plurality of pairs of the positive electrode 503 and the negative electrode 506. There is no limitation on the number of electrode layers of the secondary battery 500. With a larger number of electrode layers, the secondary battery can have higher capacity. In contrast, with a smaller number of electrode layers, the secondary battery can have smaller thickness and higher flexibility.

The examples in FIGS. 5A and 5B each include two positive electrodes 503 in each of which the positive electrode active material layer 502 is provided on one surface of the positive electrode current collector 501; two positive electrodes 503 in each of which the positive electrode active material layers 502 are provided on opposite surfaces of the positive electrode current collector 501; and three negative electrodes 506 in each of which the negative electrode active material layers 505 are provided on opposite surfaces of the negative electrode current collector 504. In other words, the secondary battery 500 includes six positive electrode active material layers 502 and six negative electrode active material layers 505. Note that although the separator 507 has a bag-like shape in the examples illustrated in FIGS. 5A and 5B, the present invention is not limited to this example and the separator 507 may have a strip shape or a bellows shape.

Figure 6A:
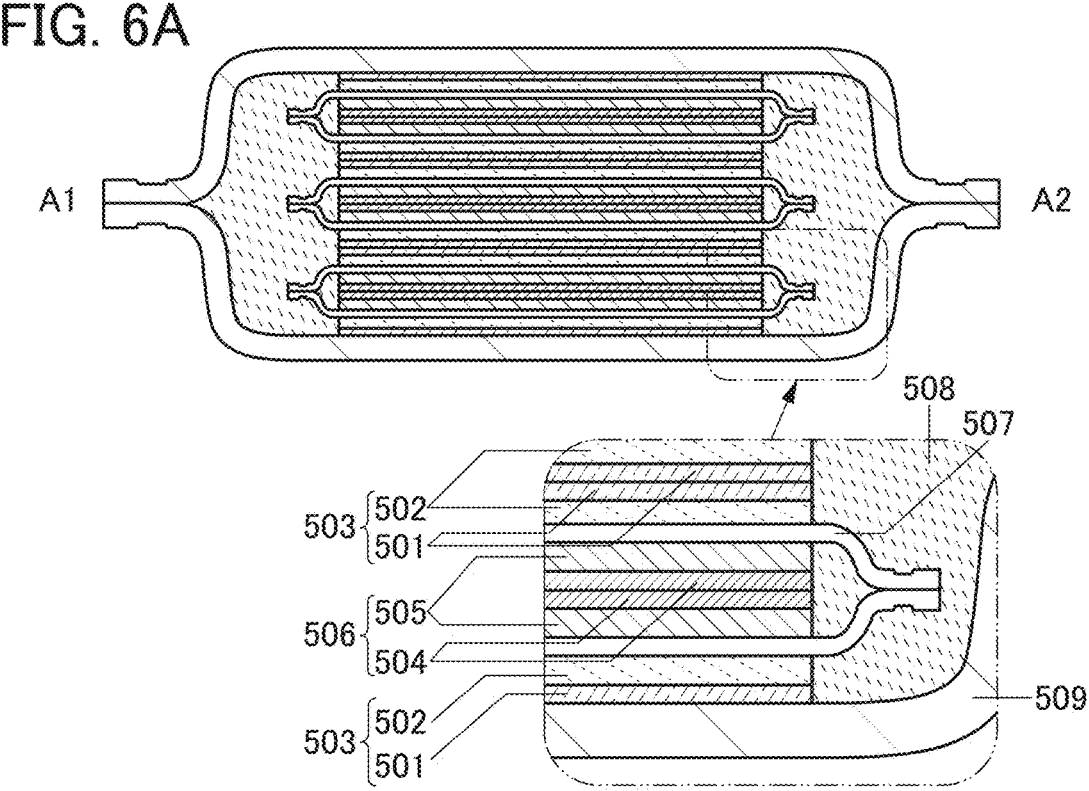
FIGS. 6A and 6B illustrate an example of a secondary battery.
Figure 6B:
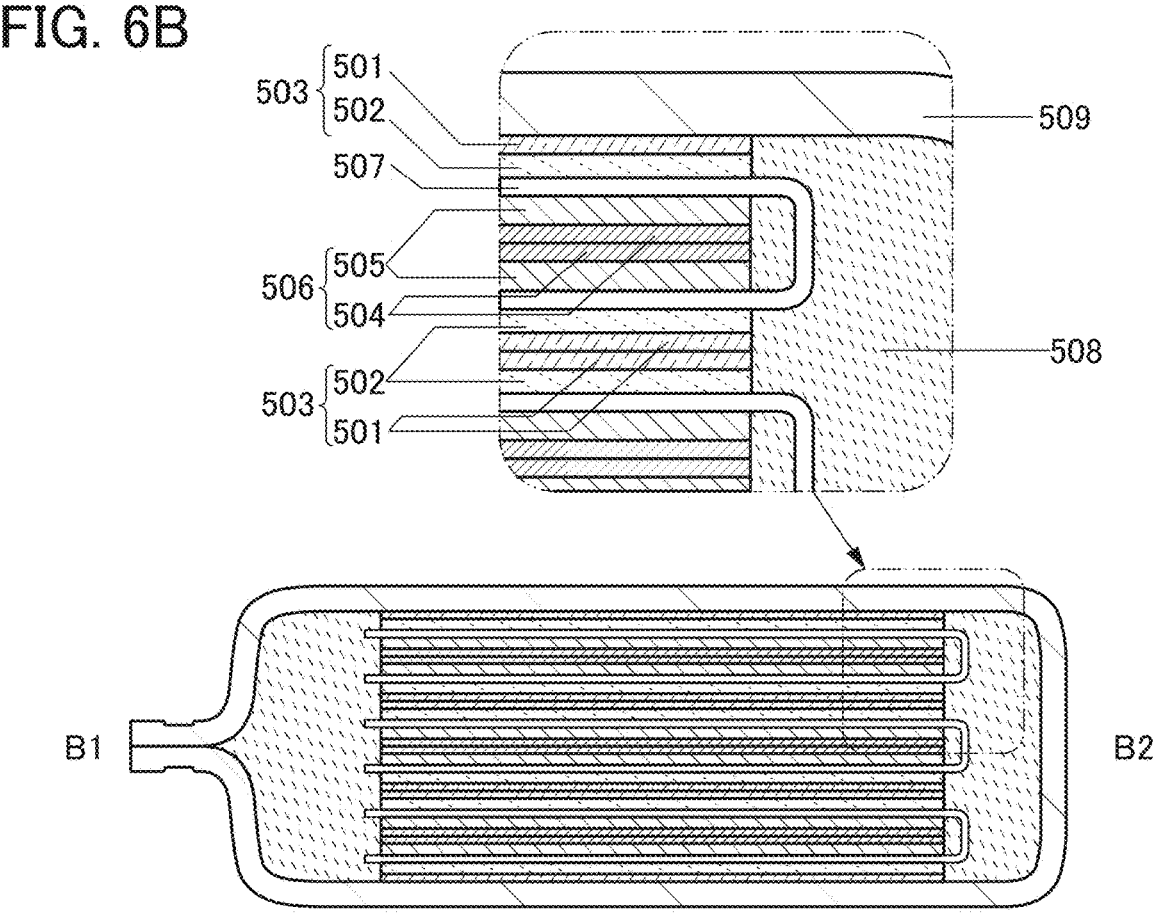

Alternatively, one positive electrode in which opposite surfaces of the positive electrode current collector 501 are provided with the positive electrode active material layers 502 in FIGS. 5A and 5B is preferably replaced with two positive electrodes in each of which one surface of the positive electrode current collector 501 is provided with the positive electrode active material layer 502. Similarly, one negative electrode in which opposite surfaces of the negative electrode current collector 504 are provided with the negative electrode active material layers 505 is preferably replaced with two negative electrodes in each of which one surface of the negative electrode current collector 504 is provided with the negative electrode active material layer 505. In the secondary battery 500 in FIGS. 6A and 6B, surfaces of the positive electrode current collectors 501 on the side not provided with the positive electrode active material layer 502 face and are in contact with each other, and surfaces of the negative electrode current collectors 504 on the side not provided with the negative electrode active material layer 505 face and are in contact with each other. Such a structure allows the interface between the two positive electrode current collectors 501 and the two negative electrode current collectors 504 to serve as sliding planes when the secondary battery 500 is curved, relieving stress caused in the secondary battery 500.

Figure 3B:
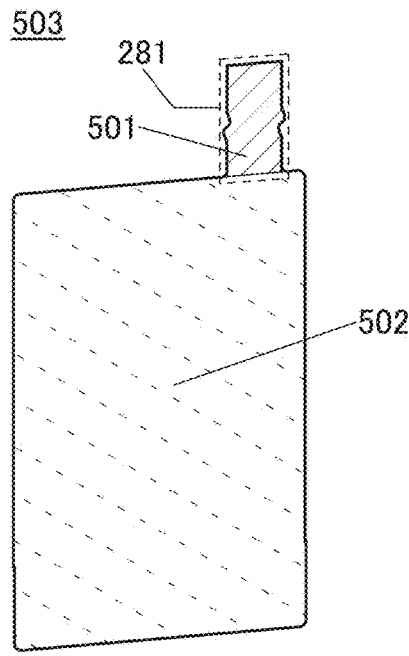

FIG. 3B illustrates the appearance of the positive electrode 503. The positive electrode 503 includes the positive electrode current collector 501 and the positive electrode active material layer 502.

Figure 3C:
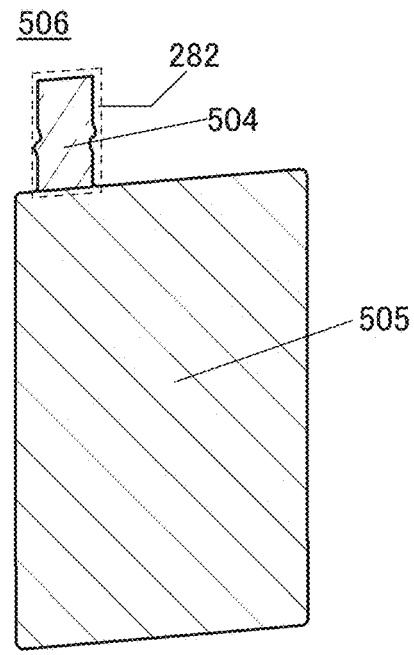

FIG. 3C illustrates the appearance of the negative electrode 506. The negative electrode 506 includes the negative electrode current collector 504 and the negative electrode active material layer 505.

The positive electrode 503 and the negative electrode 506 preferably include tab regions so that a plurality of stacked positive electrodes can be electrically connected to each other and a plurality of stacked negative electrodes can be electrically connected to each other. Furthermore, an electrode lead is preferably electrically connected to the tab region.

As illustrated in FIG. 3B, the positive electrode 503 preferably includes a tab region 281. The positive electrode lead 510 is preferably welded to part of the tab region 281. The tab region 281 preferably includes a region where the positive electrode current collector 501 is exposed. When the positive electrode lead 510 is welded to the region where the positive electrode current collector 501 is exposed, contact resistance can be further reduced. Although FIG. 3B illustrates the example where the positive electrode current collector 501 is exposed in the entire tab region 281, the tab region 281 may partly include the positive electrode active material layer 502.

As illustrated in FIG. 3C, the negative electrode 506 preferably includes a tab region 282. The negative electrode lead 511 is preferably welded to part of the tab region 282. The tab region 282 preferably includes a region where the negative electrode current collector 504 is exposed. When the negative electrode lead 511 is welded to the region where the negative electrode current collector 504 is exposed, contact resistance can be further reduced. Although FIG. 3C illustrates the example where the negative electrode current collector 504 is exposed in the entire tab region 282, the tab region 282 may partly include the negative electrode active material layer 505.

Although FIG. 3A illustrates the example where the end portions of the positive electrode 503 and the negative electrode 506 are substantially aligned with each other, part of the positive electrode 503 may extend beyond the end portion of the negative electrode 506.

In the secondary battery 500, the area of a region where the negative electrode 506 does not overlap with the positive electrode 503 is preferably as small as possible.

In the example illustrated in FIG. 4A, the end portion of the negative electrode 506 is located inward from the end portion of the positive electrode 503. With this structure, the entire negative electrode 506 can overlap with the positive electrode 503 or the area of the region where the negative electrode 506 does not overlap with the positive electrode 503 can be small.

The areas of the positive electrode 503 and the negative electrode 506 in the secondary battery 500 are preferably substantially equal. For example, the areas of the positive electrode 503 and the negative electrode 506 that face each other with the separator 507 therebetween are preferably substantially equal. For example, the areas of the positive electrode active material layer 502 and the negative electrode active material layer 505 that face each other with the separator 507 therebetween are preferably substantially equal.

For example, as illustrated in FIGS. 5A and 5B, the area of the positive electrode 503 on the separator 507 side is preferably substantially equal to the area of the negative electrode 506 on the separator 507 side. When the area of a surface of the positive electrode 503 on the negative electrode 506 side is substantially equal to the area of a surface of the negative electrode 506 on the positive electrode 503 side, the region where the negative electrode 506 does not overlap with the positive electrode 503 can be small (does not exist, ideally), whereby the secondary battery 500 can have reduced irreversible capacity. Alternatively, as illustrated in FIGS. 5A and 5B, the area of the surface of the positive electrode active material layer 502 on the separator 507 side is preferably substantially equal to the area of the surface of the negative electrode active material layer 505 on the separator 507 side.

As illustrated in FIGS. 5A and 5B, the end portion of the positive electrode 503 and the end portion of the negative electrode 506 are preferably substantially aligned with each other. End portions of the positive electrode active material layer 502 and the negative electrode active material layer 505 are preferably substantially aligned with each other.

In the example illustrated in FIG. 4B, the end portion of the positive electrode 503 is positioned on an inner side of the negative electrode 506. With this structure, the entire positive electrode 503 can overlap with the negative electrode 506 or the area of the region where the positive electrode 503 does not overlap with the negative electrode 506 can be small. In the case where the end portion of the negative electrode 506 is positioned inward from the end portion of the positive electrode 503, a current sometimes concentrates at the end portion of the negative electrode 506. For example, concentration of a current in part of the negative electrode 506 results in deposition of lithium on the negative electrode 506 in some cases. By reducing the area of the region where the positive electrode 503 does not overlap with the negative electrode 506, concentration of a current in part of the negative electrode 506 can be inhibited. As a result, deposition of lithium on the negative electrode 506 can be inhibited, for example.

As illustrated in FIG. 3A, the positive electrode lead 510 is preferably electrically connected to the positive electrode 503. Similarly, the negative electrode lead 511 is preferably electrically connected to the negative electrode 506. The positive electrode lead 510 and the negative electrode lead 511 are exposed to the outside of the exterior body 509 so as to serve as terminals for electrical contact with an external portion.

The positive electrode current collector 501 and the negative electrode current collector 504 can double as terminals for electrical contact with an external portion. In that case, the positive electrode current collector 501 and the negative electrode current collector 504 may be arranged so that part of the positive electrode current collector 501 and part of the negative electrode current collector 504 are exposed outside the exterior body 509 without using electrode leads.

Figure 7:
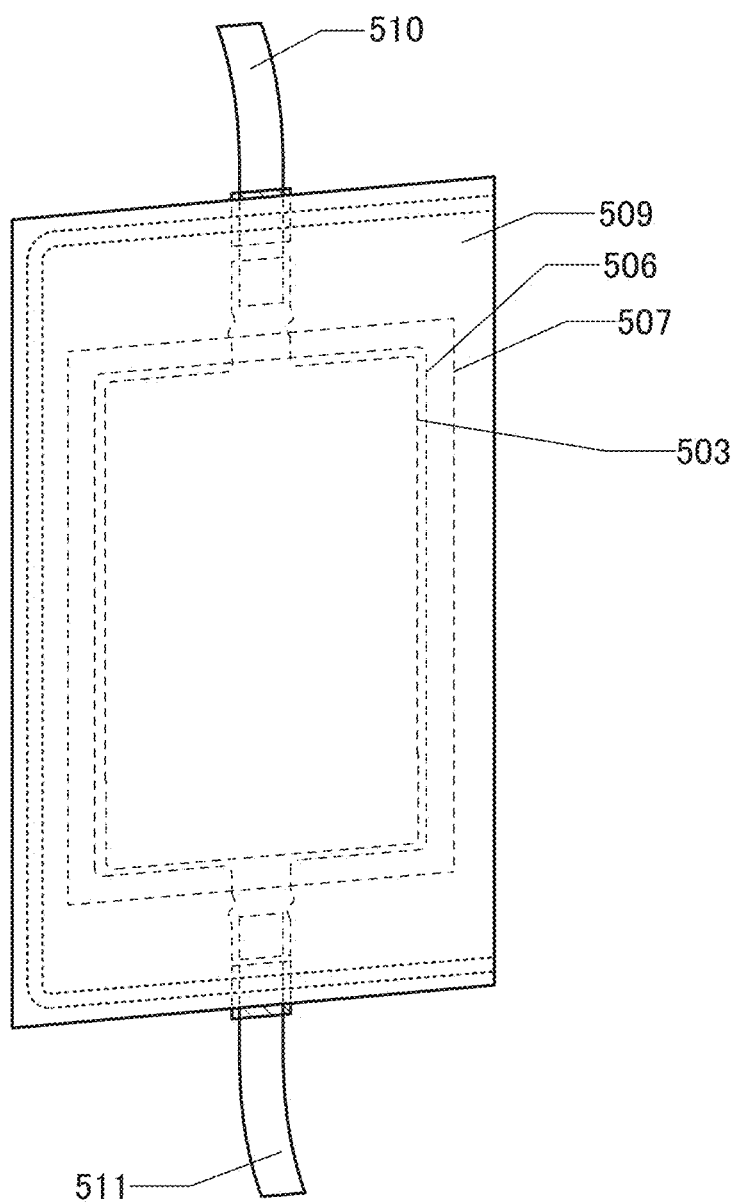
FIG. 7 illustrates an example of a secondary battery.

Although the positive electrode lead 510 and the negative electrode lead 511 are provided on the same side of the secondary battery 500 in FIG. 3A, the positive electrode lead 510 and the negative electrode lead 511 may be provided on different sides of the secondary battery 500 as illustrated in FIG. 7. The electrode leads of the secondary battery of one embodiment of the present invention can be freely positioned as described above; therefore, the degree of freedom in design is high. Accordingly, a product including the secondary battery of one embodiment of the present invention can have a high degree of freedom in design. Furthermore, the yield of products each including the secondary battery of one embodiment of the present invention can be increased.

<<Secondary Battery Manufacturing Method Example>>

Next, an example of a manufacturing method of the secondary battery 500, which is the secondary battery of one embodiment of the present invention, is described with reference to FIGS. 8A and 8B, FIGS. 9A to 9C, and FIG. 10.

First, the positive electrode 503, the negative electrode 506, and the separator 507 are stacked. Specifically, the separator 507 is positioned over the positive electrode 503. Then, the negative electrode 506 is positioned over the separator 507.

In the case of using two or more positive electrode-negative electrode pairs, another separator 507 is positioned over the negative electrode 506, and then, the positive electrode 503 is positioned. In this manner, the positive electrodes 503 and the negative electrodes 506 are alternately stacked and separated by the separator 507.

Alternatively, the separator 507 may have a bag-like shape. When the electrode is surrounded by the separator 507, damage caused to the electrode during a manufacturing process can be inhibited.

First, the positive electrode 503 is positioned over the separator 507. Then, the separator 507 is folded along the broken line in FIG. 8A so that the positive electrode 503 is sandwiched by the separator 507. Although the example where the positive electrode 503 is sandwiched by the separator 507 is described here, the negative electrode 506 may be sandwiched by the separator 507.

Here, it is preferable that the outer edges of the separator 507 outside the positive electrode 503 be bonded so that the separator 507 has a bag-like shape (or an envelope-like shape). The bonding of the outer edges of the separator 507 can be performed with the use of an adhesive or the like, by ultrasonic welding, and by thermal fusion bonding.

Figure 8A:
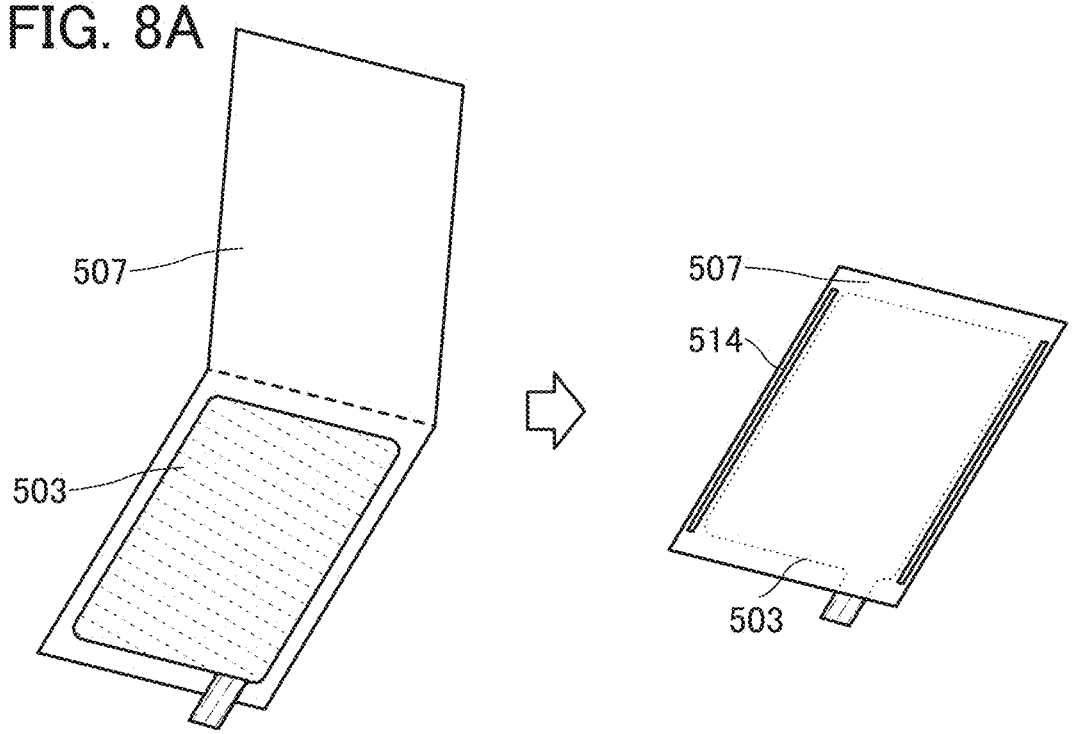
FIGS. 8A and 8B show an example of a method for manufacturing a secondary battery.

Next, the outer edges of the separator 507 are bonded by heating. Bonding portions 514 are illustrated in FIG. 8A. In such a manner, the positive electrode 503 can be covered with the separator 507.

Figure 8B:
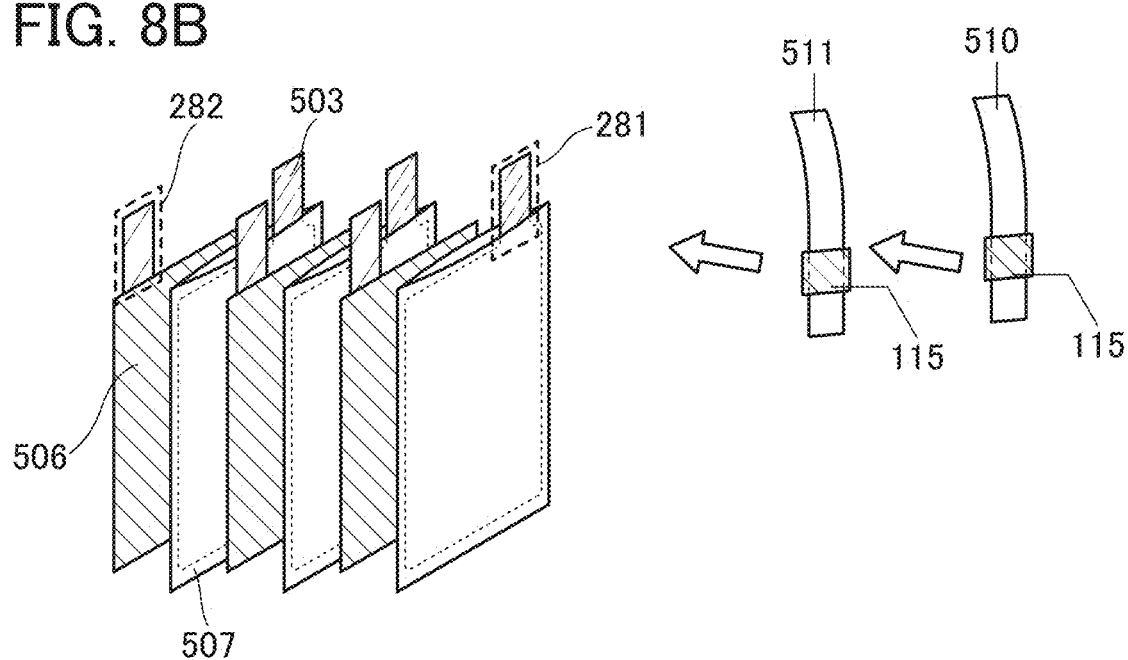

Then, the negative electrodes 506 and the positive electrodes 503 each covered with the separator are alternately stacked as illustrated in FIG. 8B. Furthermore, the positive electrode lead 510 and the negative electrode lead 511 each having a sealing layer 115 are prepared.

Figure 9A:
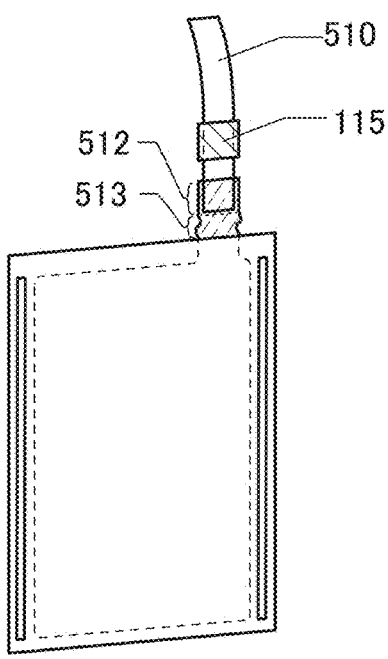
FIGS. 9A to 9C show an example of a method for manufacturing a secondary battery.
Figure 9B:
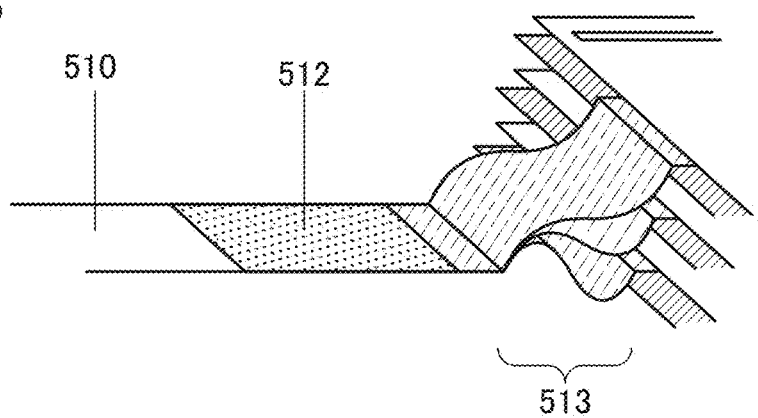

After that, the positive electrode lead 510 having the sealing layer 115 is connected to the tab region 281 of the positive electrode 503 as illustrated in FIG. 9A. FIG. 9B is an enlarged view of a connection portion. The tab region 281 of the positive electrode 503 and the positive electrode lead 510 are electrically connected to each other by irradiating the bonding portion 512 with ultrasonic waves while applying pressure thereto (ultrasonic welding). In that case, a curved portion 513 is preferably provided in the tab region 281.

This curved portion 513 can relieve stress due to external force applied after fabrication of the secondary battery 500. Thus, the secondary battery 500 can have high reliability.

The tab region 282 of the negative electrode 506 and the negative electrode lead 511 can be electrically connected to each other by a similar method.

Subsequently, the positive electrode 503, the negative electrode 506, and the separator 507 are positioned over the exterior body 509.

Figure 9C:
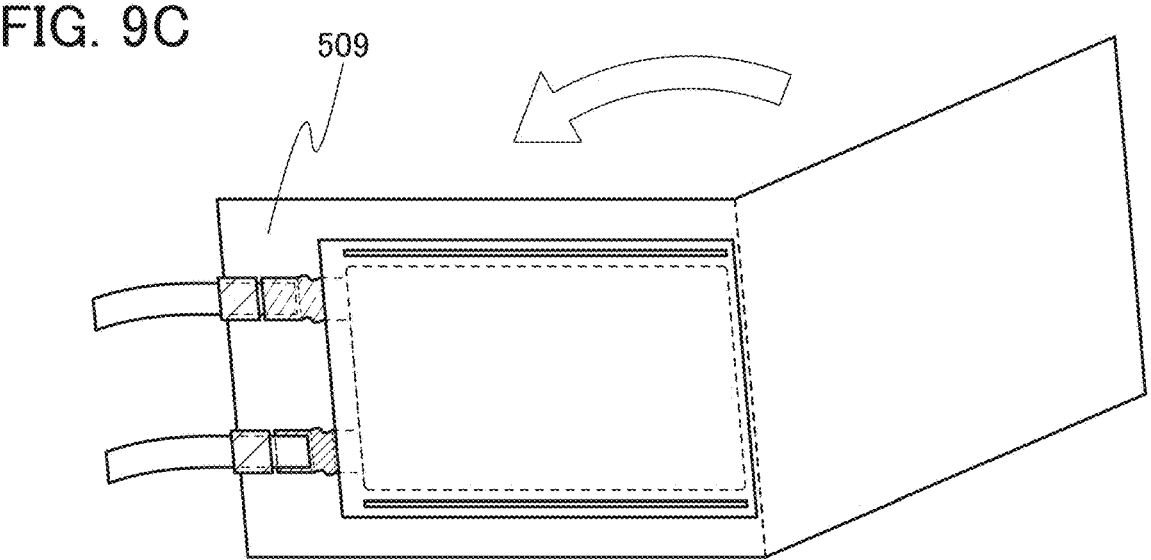

Then, the exterior body 509 is folded along a portion shown by the dotted line in the vicinity of a center portion of the exterior body 509 in FIG. 9C.

Figure 10:
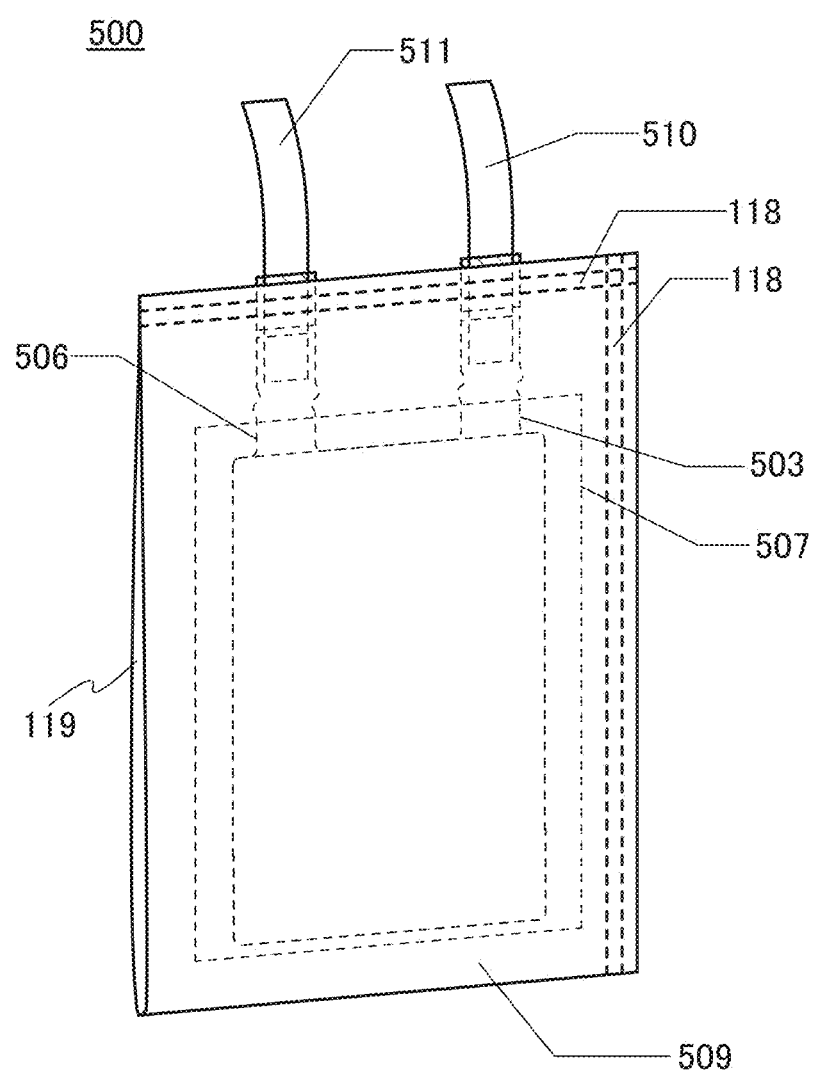
FIG. 10 shows an example of a method for manufacturing a secondary battery.

In FIG. 10, the thermocompression bonding portion in the outer edges of the exterior body 509 is illustrated as a bonding portion 118. The outer edges of the exterior body 509 except an inlet 119 for introducing the electrolytic solution 508 are bonded by thermocompression bonding. In thermocompression bonding, the sealing layers provided over the electrode leads are also melted, thereby fixing the electrode leads and the exterior body 509 to each other. Moreover, adhesion between the exterior body 509 and the electrode leads can be increased.

After that, in a reduced-pressure atmosphere or an inert gas atmosphere, a desired amount of electrolytic solution 508 is introduced to the inside of the exterior body 509 from the inlet 119. Lastly, the inlet 119 is sealed by thermocompression bonding. Through the above steps, the secondary battery 500, which is a thin storage battery, can be fabricated.

Aging is preferably performed after fabrication of the secondary battery 500. The aging can be performed under the following conditions, for example. Charging is performed at a rate of 0.001 C or more and 0.2 C or less. The temperature may be higher than or equal to room temperature and lower than or equal to 50° C. In the case where an electrolytic solution is decomposed and a gas is generated and accumulated in the cell, the electrolytic solution cannot be in contact with a surface of the electrode in some regions. That is to say, an effectual reaction area of the electrode is reduced and effectual resistance is increased.

When the resistance is extremely increased, a charging voltage is increased in accordance with the resistance of the electrode, and the negative electrode potential is lowered. Consequently, lithium is intercalated into graphite and lithium is deposited on the surface of graphite in some cases. The lithium deposition might reduce capacity. For example, if a coating film or the like is grown on the surface after lithium deposition, lithium deposited on the surface cannot be dissolved again. This lithium cannot contribute to capacity. In addition, when deposited lithium is physically collapsed and conduction with the electrode is lost, the lithium also cannot contribute to capacity. Therefore, the gas is preferably released to prevent the potential of the negative electrode from reaching the potential of lithium because of an increase in a charging voltage.

In the case of performing degasification, for example, part of the exterior body of the thin storage battery may be cut to open the storage battery. When the exterior body is expanded because of a gas, the form of the exterior body is preferably adjusted. Furthermore, the electrolytic solution may be added as needed before resealing.

After the release of the gas, the charging state may be maintained at a temperature higher than room temperature, preferably higher than or equal to 30° C. and lower than or equal to 60° C., more preferably higher than or equal to 35° C. and lower than or equal to 50° C. for, for example, 1 hour or more and 100 hours or less. In the initial charge, an electrolytic solution decomposed on the surface forms a coating film. The formed coating film may thus be densified when the charging state is held at a temperature higher than room temperature after the release of the gas, for example.

<<Structure of Positive Electrode>>

Next, components and materials used for the secondary battery of one embodiment of the present invention will be described. First, the positive electrode will be described with reference to FIG. 4A. The positive electrode includes a positive electrode active material layer 502 and a positive electrode current collector 501.

As a positive electrode active material used for the positive electrode active material layer 502, a material into and from which carrier ions such as lithium ions can be inserted and extracted can be used. Examples of the material are a lithium-containing material with an olivine crystal structure, a layered rock-salt crystal structure, a spinel crystal structure, and the like.

For example, lithium iron phosphate (LiFePO$_4$) shown in Example 1 is preferable because it properly has properties necessary for the positive electrode active material, such as safety, stability, high capacity density, high potential, and the existence of lithium ions which can be extracted in initial oxidation (charge).

The positive electrode active material and a negative electrode active material have a central role in battery reactions of a secondary battery, and release and occlude carrier ions. To increase the lifetime of a secondary battery, the materials preferably have a small amount of capacity which relates to irreversible battery reactions, and have high charge and discharge efficiency.

The active material is in contact with an electrolytic solution. When the active material reacts with the electrolytic solution, the active material is lost and deteriorates by the reaction, which decreases the capacity of the secondary battery. Therefore, it is preferable that such a reaction not be caused in the secondary battery in order to achieve a secondary battery which hardly deteriorates.

Examples of the conductive additive in the electrode include acetylene black (AB), graphite (black lead) particles, carbon nanotubes, reduced graphene oxide (RGO), and fullerene.

A network for electrical conduction can be formed in the electrode by the conductive additive. The conductive additive also allows maintaining of a path for electric conduction between the particles of the positive electrode active material. The addition of the conductive additive to the positive electrode active material layer increases the electrical conductivity of the positive electrode active material layer 502.

A typical example of the binder is polyvinylidene fluoride (PVDF), and other examples of the binder include polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

The content of the binder with respect to the total amount of the positive electrode active material layer 502 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive with respect to the total amount of the positive electrode active material layer 502 is preferably greater than or equal to 1 wt % and less than or equal to 10 wt %, further preferably greater than or equal to 1 wt % and less than or equal to 5 wt %.

In the case where the positive electrode active material layer 502 is formed by a coating method, the positive electrode active material, the binder, the conductive additive, and a dispersion medium are mixed to form an electrode slurry, and the slurry is applied to the positive electrode current collector 501 and dried.

The positive electrode current collector 501 can be formed using a material, which has high conductivity and is not alloyed with carrier ions of lithium or the like, such as stainless steel, gold, platinum, aluminum, or titanium, or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon are zirconium, titanium, hafnium, vanadium, niobium, tantalum, chromium, molybdenum, tungsten, cobalt, nickel, and the like. The positive electrode current collector can have a foil shape, a plate (sheet) shape, a net shape, a punching-metal shape, an expanded-metal shape, or the like as appropriate.

Through the above steps, the positive electrode of the secondary battery can be formed.

<Structure of Negative Electrode>

Next, the negative electrode is described with reference to FIG. 4A. The negative electrode includes a negative electrode active material layer 505 and a negative electrode current collector 504. Steps of forming the negative electrode are described below.

Examples of a carbon-based material as the negative electrode active material used for the negative electrode active material layer 505 include graphite, graphitizing carbon (soft carbon), non-graphitizing carbon (hard carbon), a carbon nanotube, graphene, and carbon black. Examples of the graphite include artificial graphite such as meso-carbon microbeads (MCMB), coke-based artificial graphite, pitch-based artificial graphite, and natural graphite such as spherical natural graphite. In addition, the shape of the graphite is a flaky shape and a spherical shape, for example.

Other than the carbon-based material, a material which enables charge-discharge reactions by an alloying reaction and a dealloying reaction with lithium can be used as the negative electrode active material. A material including at least one of Ga, Si, Al, Ge, Sn, Pb, Sb, Bi, Ag, Zn, Cd, In, and the like can be used, for example. Such elements have higher capacity than carbon. In particular, silicon has a significantly high theoretical capacity of 4200 mAh/g. Examples of an alloy-based material (compound-based material) using such elements include Mg$_2$Si, Mg$_2$Ge, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, and SbSn.

Alternatively, for the negative electrode active material, an oxide such as SiO, SnO, $SnO_2$, titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, for the negative electrode active material, $Li_{3-x}MN$ (M is Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

When a nitride containing lithium and a transition metal is used, lithium is included in the negative electrode active material; thus, the negative electrode active material can be used in combination with a material for a positive electrode active material which does not contain lithium, such as $V_2O_5$ or $Cr_3O_8$. In the case of using a material containing lithium as a positive electrode active material, the nitride containing lithium and a transition metal can be used for the negative electrode active material by extracting lithium contained in the positive electrode active material in advance.

Alternatively, a material which causes a conversion reaction can be used for the negative electrode active material; for example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$.

The particle size of the negative electrode active material is preferably greater than or equal to 50 nm and less than or equal to 100 μm, for example.

Note that it is acceptable that a plurality of materials for active materials are combined at a given proportion both for the positive electrode active material layer 502 and the negative electrode active material layer 505. The use of a plurality of materials for the active material layer makes it possible to select the performance of the active material layer in detail.

Examples of the conductive additive in the electrode include acetylene black (AB), graphite (black lead) particles, carbon nanotubes, reduced graphene oxide (RGO), and fullerene.

A network for electrical conduction can be formed in the electrode by the conductive additive. The conductive additive also allows maintaining of a path for electric conduction between the particles of the negative electrode active material. The addition of the conductive additive to the negative electrode active material layer increases the electric conductivity of the negative electrode active material layer 505.

A typical example of the binder is polyvinylidene fluoride (PVDF), and other examples of the binder include polyimide, polytetrafluoroethylene, polyvinyl chloride, ethylene-propylene-diene polymer, styrene-butadiene rubber, acrylonitrile-butadiene rubber, fluorine rubber, polyvinyl acetate, polymethyl methacrylate, polyethylene, and nitrocellulose.

The content of the binder with respect to the total amount of the negative electrode active material layer 505 is preferably greater than or equal to 1 wt % and less than or equal to 10 wt %, further preferably greater than or equal to 2 wt % and less than or equal to 8 wt %, and still further preferably greater than or equal to 3 wt % and less than or equal to 5 wt %. The content of the conductive additive with respect to the total amount of the negative electrode active material layer 505 is preferably greater than or equal to 1 wt % and less than or equal to 10 wt %, further preferably greater than or equal to 1 wt % and less than or equal to 5 wt %.

Next, the negative electrode active material layer 505 is formed on the negative electrode current collector 504. In the case where the negative electrode active material layer 505 is formed by a coating method, the negative electrode active material, the binder, the conductive additive, and a dispersion medium are mixed to form a slurry, and the slurry is applied to the negative electrode current collector 504 and dried. If necessary, pressing may be performed after the drying.

The negative electrode current collector 504 can be formed using a material, which has high conductivity and is not alloyed with carrier ions of lithium or the like, such as stainless steel, gold, platinum, zinc, iron, copper, titanium, or tantalum, or an alloy thereof. Alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The negative electrode current collector 504 can have a foil shape, a plate (sheet) shape, a net shape, a cylindrical shape, a coil shape, a punching-metal shape, an expanded-metal shape, or the like as appropriate. The negative electrode current collector 504 preferably has a thickness greater than or equal to 5 μm and less than or equal to 30 μm. A part of the surface of the electrode current collector may be provided with an undercoat layer using graphite or the like.

Through the above steps, the negative electrode of the secondary battery can be formed.

<<Structure of Separator>>

The separator 507 will be described. The separator 507 may be formed using a material such as paper, nonwoven fabric, fiberglass, synthetic fiber such as nylon (polyamide), vinylon (polyvinyl alcohol based fiber), polyester, acrylic, polyolefin, or polyurethane. However, a material that does not dissolve in an electrolytic solution described later needs to be selected.

More specifically, as a material for the separator 507, high-molecular compounds based on fluorine-based polymer, polyether such as polyethylene oxide and polypropylene oxide, polyolefin such as polyethylene and polypropylene, polyacrylonitrile, polyvinylidene chloride, polymethyl methacrylate, polymethylacrylate, polyvinyl alcohol, polymethacrylonitrile, polyvinyl acetate, polyvinylpyrrolidone, polyethyleneimine, polybutadiene, polystyrene, polyisoprene, and polyurethane, derivatives thereof, cellulose, paper, nonwoven fabric, and a glass fiber can be used either alone or in combination.

<<Components of Electrolytic Solution>>

The electrolytic solution 508 used in the secondary battery of one embodiment of the present invention is preferably a nonaqueous solution (solvent) containing an electrolyte (solute).

For a solvent of the electrolytic solution 508, a material in which carrier ions can transfer is used. For example, an aprotic organic solvent is preferably used, and one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

When a gelled high-molecular material is used as the solvent of the electrolytic solution 508, safety against liquid leakage and the like is improved. Furthermore, the secondary battery can be thinner and more lightweight. Typical examples of the gelled polymer material include a silicone gel, an acrylic gel, an acrylonitrile gel, a polyethylene oxide-based gel, a polypropylene oxide-based gel, a fluorine-based polymer gel, and the like.

Alternatively, the use of one or more of ionic liquids (room temperature molten salts) that have non-flammability and non-volatility as the solvent for the electrolytic solution can prevent the secondary battery from exploding or catching fire even when the secondary battery internally shorts out or the internal temperature increases due to overcharging or the like. Thus, the secondary battery has improved safety.

Although the case where carrier ions are lithium ions in the above electrolyte is described, carrier ions other than lithium ions can be used. When the carrier ions other than lithium ions are alkali metal ions or alkaline-earth metal ions, instead of lithium in the lithium salts, an alkali metal (e.g., sodium or potassium) or an alkaline-earth metal (e.g., calcium, strontium, barium, beryllium, or magnesium) may be used as the electrolyte.

The electrolytic solution used for the secondary battery is preferably a highly purified one so as to contain a negligible small amount of dust particles and elements other than the constituent elements of the electrolytic solution (hereinafter, also simply referred to as impurities). Specifically, the mass ratio of impurities to the electrolytic solution is less than or equal to 1%, preferably less than or equal to 0.1%, and further preferably less than or equal to 0.01%. An additive agent such as vinylene carbonate may be added to the electrolytic solution.

In the case of using lithium ions as carrier ions, as an electrolyte dissolved in the above solvent, one of lithium salts such as $LiPF_6$, $LiClO_4$, $LiAsF_6$, $LiBF_4$, $LiAlCl_4$, LiSCN, LiBr, LiI, $Li_2SO_4$, $Li_2B_{10}Cl_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)(CF_3SO_2)$, and $LiN(C_2F_5SO_2)_2$ can be used, or two or more of these lithium salts can be used in an appropriate combination in an appropriate ratio.

Note that the electrolytic solution reacts with and corrodes the positive electrode current collector in some cases. In order to prevent such corrosion, several weight percent of $LiPF_6$ may be added to the electrolytic solution, in which case a passive film is formed on a surface of the positive electrode current collector and may be able to prevent reaction between the electrolytic solution and the positive electrode current collector. Note that the concentration of $LiPF_6$ is less than or equal to 10 wt %, preferably less than or equal to 5 wt %, and further preferably less than or equal to 3 wt % in order that the positive electrode active material layer is not dissolved.

<<Graphene Compound>>

Note that in one embodiment of the present invention, a graphene compound can be used in a component of the power storage device. As described later, when modification is performed, the structure and characteristics of a graphene compound can be selected from a wider range of alternatives. Thus, a preferable property can be exhibited in accordance with a component in which a graphene compound is to be used. Moreover, a graphene compound has high mechanical strength and therefore can be used in a component of a flexible power storage device. Graphene compounds are described below.

Graphene has carbon atoms arranged in one atomic layer. A π bond exists between the carbon atoms. Graphene including two or more and one hundred or less layers is referred to as multilayer graphene in some cases. The length in the longitudinal direction or the length of the major axis in a surface in each of graphene and multilayer graphene is greater than or equal to 50 nm and less than or equal to 100 µm or greater than or equal to 800 nm and less than or equal to 50 µm.

In this specification and the like, a compound including graphene or multilayer graphene as a basic skeleton is referred to as a graphene compound. Graphene compounds include graphene and multilayer graphene.

Graphene compounds are described below.

A graphene compound is, for example, a compound where graphene or multilayer graphene is modified with an atom other than carbon or an atomic group with an atom other than carbon. A graphene compound may be a compound where graphene or multilayer graphene is modified with an atomic group composed mainly of carbon, such as an alkyl group or an alkylene group. An atomic group that modifies graphene or multilayer graphene is referred to as a substituent, a functional group, a characteristic group, or the like in some cases. Modification in this specification and the like refers to introduction of an atom other than carbon, an atomic group with an atom other than carbon, or an atomic group composed mainly of carbon to graphene, multilayer graphene, a graphene compound, or graphene oxide (described later) by a substitution reaction, an addition reaction, or other reactions.

Note that the surface side and the rear surface side of graphene may be modified with different atoms or atomic groups. In multilayer graphene, multiple layers may be modified with different atoms or atomic groups.

An example of the above graphene modified with an atom or an atomic group is graphene or multilayer graphene that is modified with oxygen or a functional group containing oxygen. Examples of a functional group containing oxygen include an epoxy group, a carbonyl group such as a carboxyl group, and a hydroxyl group. A graphene compound modified with oxygen or a functional group containing oxygen is referred to as graphene oxide in some cases. In this specification, graphene oxides include multilayer graphene oxides.

As an example of modification of graphene oxide, silylation of graphene oxide will be described. First, in a nitrogen atmosphere, graphene oxide is put in a container, n-butylamine ($C_4H_9NH_2$) is added to the container, and stirring is performed for one hour with the temperature kept at 60° C. Then, toluene is added to the container, alkyltrichlorosilane is added thereto as a silylating agent, and stirring is performed in a nitrogen atmosphere for five hours with the temperature kept at 60° C. Then, toluene is further added to the container, and the resulting solution is suction-filtrated to give a solid powder. The powder is dispersed in ethanol, and the resulting solution is suction-filtered to give a solid powder. The powder is dispersed in acetone, and the resulting solution is suction-filtered to give a solid powder. A liquid of the solid powder is vaporized to give silylated graphene oxide.

The modification is not limited to silylation, and silylation is not limited to the above method. The modification is not limited to introduction of an atom or an atomic group of one kind, and the modification of two or more types may be performed to introduce atoms or atomic groups of two or more kinds. By introducing a given atomic group to a graphene compound, the physical property of the graphene compound can be changed. Therefore, by performing desirable modification in accordance with the application of a graphene compound, a desired property of the graphene compound can be exhibited intentionally.

A formation method example of graphene oxide is described below. Graphene oxide can be obtained by oxidizing the above graphene or multilayer graphene. Alternatively, graphene oxide can be obtained by being separated from graphite oxide. Graphite oxide can be obtained by oxidizing graphite. The graphene oxide may be further modified with the above atom or atomic group.

A compound that can be obtained by reducing graphene oxide is referred to as reduced graphene oxide (RGO) in some cases. In RGO, in some cases, all oxygen atoms contained in the graphene oxide are not extracted and part of them remains in a state where oxygen or atomic group containing oxygen that is bonded to carbon. In some cases, RGO includes a functional group, e.g., an epoxy group, a carbonyl group such as a carboxyl group, or a hydroxyl group.

A graphene compound may have a sheet-like shape where a plurality of graphene compounds partly overlap with each other. Such a graphene compound is referred to as a graphene compound sheet in some cases. The graphene compound sheet has, for example, an area with a thickness greater than or equal to 0.33 nm and smaller than or equal to 10 mm, preferably greater than 0.34 nm and less than or equal to 10 μm. The graphene compound sheet may be modified with an atom other than carbon, an atomic group containing an atom other than carbon, an atomic group composed mainly of carbon such as an alkyl group, or the like. A plurality of layers in the graphene compound sheet may be modified with different atoms or atomic groups.

A graphene compound may have a five-membered ring composed of carbon or a poly-membered ring that is a seven- or more-membered ring composed of carbon, in addition to a six-membered ring composed of carbon. In the neighborhood of a poly-membered ring which is a seven- or more-membered ring, a region through which a lithium ion can pass may be generated.

A plurality of graphene compounds may be gathered to form a sheet-like shape.

A graphene compound has a planar shape, thereby enabling surface contact.

In some cases, a graphene compound has high conductivity even when it is thin. The contact area between graphene compounds or between a graphene compound and an active material can be increased by surface contact. Thus, even with a small amount of a graphene compound per volume, a conductive path can be formed efficiently.

In contrast, a graphene compound may also be used as an insulator. For example, a graphene compound sheet may be used as a sheet-like insulator. Graphene oxide, for example, has a higher insulation property than a graphene compound that is not oxidized, in some cases. A graphene compound modified with an atomic group may have an improved insulation property, depending on the type of the modifying atomic group.

A graphene compound in this specification and the like may include a precursor of graphene. The precursor of graphene refers to a substance used for forming graphene. The precursor of graphene may contain the above graphene oxide, graphite oxide, or the like.

Graphene containing an alkali metal or an element other than carbon, such as oxygen, is referred to as a graphene analog in some cases. In this specification and the like, graphene compounds include graphene analogs.

A graphene compound in this specification and the like may include an atom, an atomic group, and ions thereof between the layers. The physical properties, such as electric conductivity and ion conductivity, of a graphene compound sometimes change when an atom, an atomic group, and ions thereof exist between layers of the compound. In addition, a distance between the layers is increased in some cases.

A graphene compound has excellent electrical characteristics of high conductivity and excellent physical properties of high flexibility and high mechanical strength in some cases. A modified graphene compound can have extremely low conductivity and serve as an insulator depending on the type of the modification. A graphene compound has a planar shape. A graphene compound enables low-resistance surface contact.

<<Structure of Exterior Body>>

Next, the exterior body 509 will be described. As the exterior body 509, a film having a three-layer structure can be used, for example. In the three-layer structure, a highly flexible metal thin film of, for example, aluminum, stainless steel, copper, and nickel is provided over a film formed of a material such as polyethylene, polypropylene, polycarbonate, ionomer, and polyamide, and an insulating synthetic resin film of, for example, a polyamide-based resin or a polyester-based resin is provided as the outer surface of the exterior body over the metal thin film. With such a three-layer structure, permeation of the electrolytic solution and a gas can be blocked and an insulating property and resistance to the electrolytic solution can be provided. The exterior body is folded inside in two, or two exterior bodies are stacked with the inner surfaces facing each other, in which case application of heat melts the materials on the overlapping inner surfaces to cause fusion bonding between the two exterior bodies. In this manner, a sealing structure can be formed.

A portion where the sealing structure is formed by fusion bonding or the like of the exterior body is referred to as a sealing portion. In the case where the exterior body is folded inside in two, the sealing portion is formed in the place other than the fold, and a first region of the exterior body and a second region of the exterior body that overlaps with the first region are fusion-bonded, for example. In the case where two exterior bodies are stacked, the sealing portion is formed along the entire circumference by heat fusion bonding or the like.

<<Flexible Secondary Battery>>

When a flexible material is selected from materials of the components described in this embodiment and used, a flexible secondary battery can be fabricated. Deformable devices are currently under active research and development. For such devices, flexible secondary batteries are demanded.

Figure 11A:
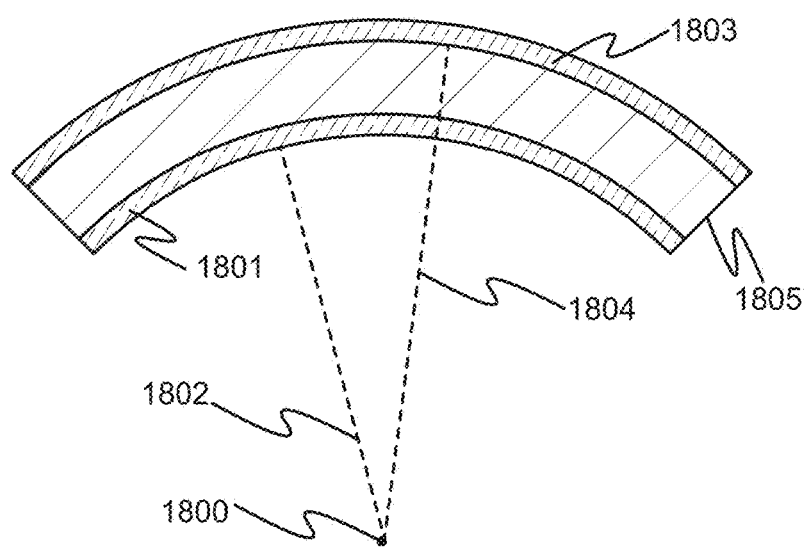
FIGS. 11A to 11D illustrate a curvature radius.
Figure 11B:
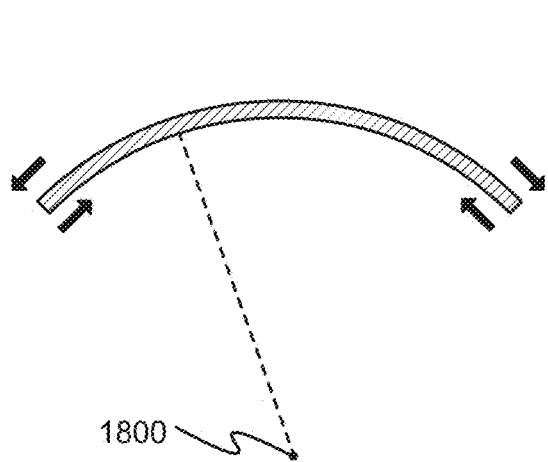

In the case of bending a secondary battery in which a battery material 1805 including electrodes and an electrolytic solution is sandwiched between two films as exterior bodies, a radius 1802 of curvature of a film 1801 on the side closer to a center 1800 of curvature of the secondary battery is smaller than a radius 1804 of curvature of a film 1803 on the side further from the center 1800 of curvature (FIG. 11A). When the secondary battery is curved and has an arc-shaped cross section, compressive stress is applied to a surface of the film close to the center 1800 of curvature and tensile stress is applied to a surface of the film far from the center 1800 of curvature (FIG. 11B).

When the flexible secondary battery is deformed, strong stress is applied to the exterior bodies. However, even with the compressive stress and tensile stress due to the deformation of the secondary battery, the influence of a strain can be reduced by forming a pattern including projections or depressions on surfaces of the exterior bodies. For this reason, the secondary battery can change its form in such a range that the exterior body on the side closer to the center of curvature has a curvature radius of 30 mm, preferably 10 mm.

Figure 12A:
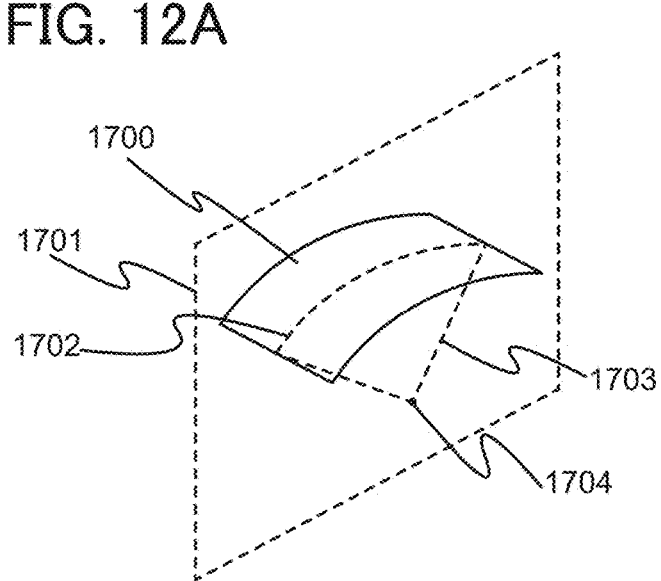
FIGS. 12A to 12C illustrate a curvature radius.
Figure 12B:
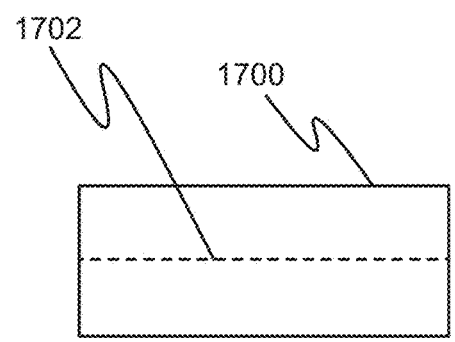
Figure 12C:
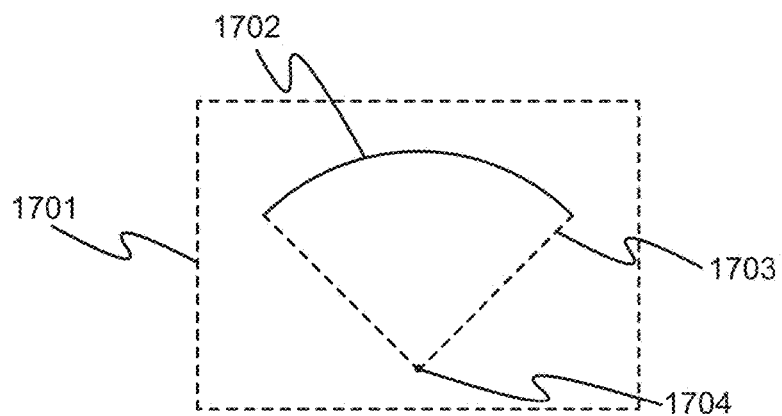

The radius of curvature of a surface will be described with reference to FIGS. 12A to 12C. In FIG. 12A, on a plan surface 1701 along which a curved surface 1700 is cut, part of a curve 1702 of the curved surface 1700 is approximate to an arc of a circle, and the radius of the circle is referred to as a radius of curvature 1703 and the center of the circle is referred to as a center of curvature 1704. FIG. 12B is a top view of the curved surface 1700. FIG. 12C is a cross-sectional view of the curved surface 1700 taken along the plan surface 1701. When a curved surface is cut by a plan surface, the radius of curvature of a curve in a cross section differs depending on the angle between the curved surface and the plan surface or on the cut position, and the smallest radius of curvature is defined as the radius of curvature of a surface in this specification and the like.

Figure 11C:
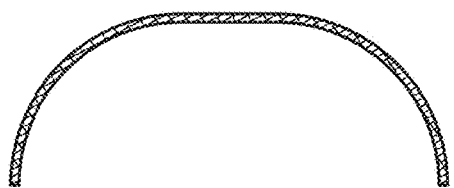
Figure 11D:
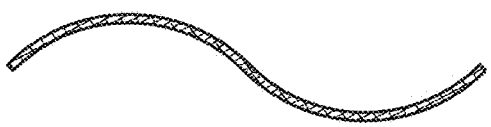

Note that the cross-sectional shape of the secondary battery is not limited to a simple arc shape, and the cross section can be partly arc-shaped; for example, a shape illustrated in FIG. 11C, a wavy shape illustrated in FIG. 11D, or an S shape can be used. When the curved surface of the secondary battery has a shape with a plurality of centers of curvature, the secondary battery can change its form in such a range that a curved surface with the smallest radius of curvature among radii of curvature with respect to the plurality of centers of curvature, which is a surface of the exterior body on the side closer to the center of curvature, has a curvature radius of 30 mm, preferably 10 mm.

As the positive electrode active material layer of the secondary battery according to this embodiment, the positive electrode active material layer according to one embodiment of the present invention is used. For this reason, the output of the secondary battery can be increased.

This embodiment can be implemented in appropriate combination with any of the other embodiments and example.

Embodiment 3

In this embodiment, structures of a secondary battery of one embodiment of the present invention are described with reference to FIGS. 13A to 13C and FIGS. 14A and 14B.

<<Coin-Type Secondary Battery>>

Figure 13A:
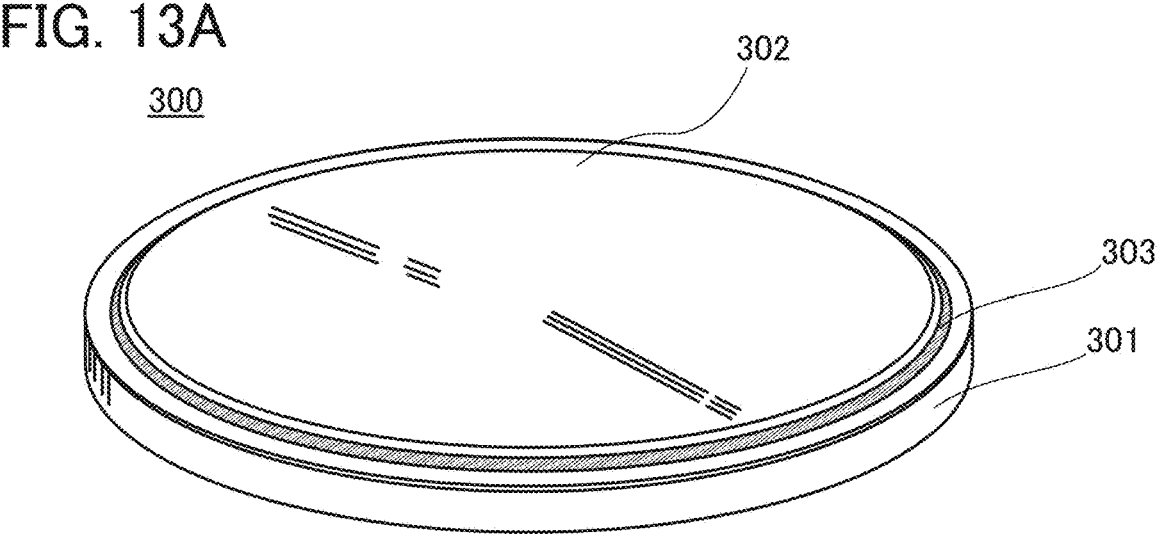
FIGS. 13A to 13C illustrate a coin-type secondary battery.
Figure 13B:
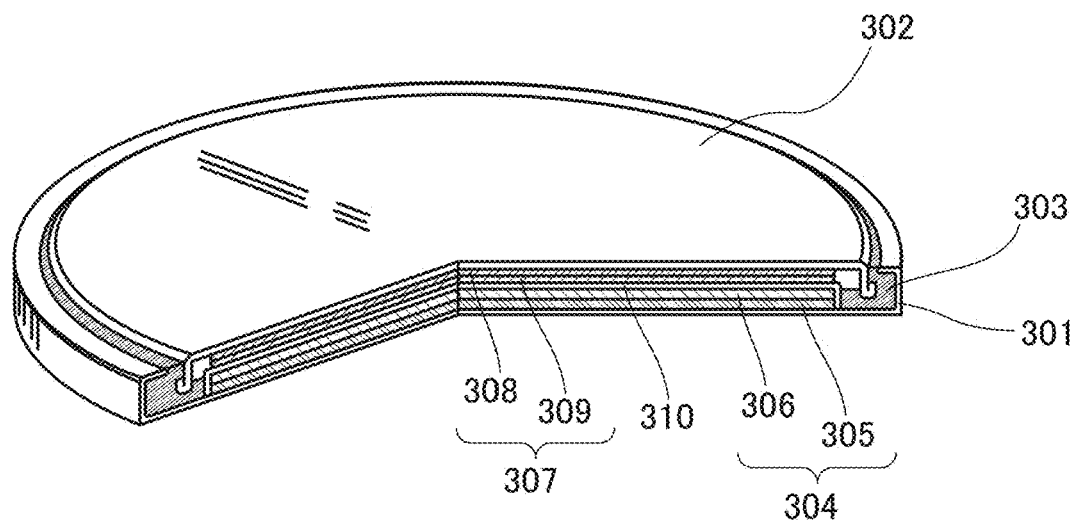

FIG. 13A is an external view of a coin-type (single-layer flat type) secondary battery. FIG. 13B is a cross-sectional view thereof.

In a coin-type secondary battery 300, a positive electrode can 301 doubling as a positive electrode terminal and a negative electrode can 302 doubling as a negative electrode terminal are insulated from each other and sealed by a gasket 303 made of polypropylene or the like. A positive electrode 304 includes a positive electrode current collector 305 and a positive electrode active material layer 306 provided in contact with the positive electrode current collector 305. The positive electrode active material layer 306 may further include a binder for increasing adhesion of positive electrode active materials, a conductive additive for increasing the conductivity of the positive electrode active material layer, and the like in addition to the positive electrode active materials.

As a positive electrode active material, the positive electrode active material described in Embodiment 1 can be used.

A negative electrode 307 includes a negative electrode current collector 308 and a negative electrode active material layer 309 provided in contact with the negative electrode current collector 308. The negative electrode active material layer 309 may further include a binder for increasing adhesion of negative electrode active materials, a conductive additive for increasing the conductivity of the negative electrode active material layer, and the like in addition to the negative electrode active materials. A separator 310 and an electrolyte (not illustrated) are provided between the positive electrode active material layer 306 and the negative electrode active material layer 309.

For the positive electrode can 301 and the negative electrode can 302, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the positive electrode can 301 and the negative electrode can 302 are preferably covered with nickel, aluminum, or the like in order to prevent corrosion due to the electrolytic solution. The positive electrode can 301 and the negative electrode can 302 are electrically connected to the positive electrode 304 and the negative electrode 307, respectively.

The negative electrode 307, the positive electrode 304, and the separator 310 are immersed in the electrolytic solution. Then, as illustrated in FIG. 13B, the positive electrode 304, the separator 310, the negative electrode 307, and the negative electrode can 302 are stacked in this order with the positive electrode can 301 positioned at the bottom, and the positive electrode can 301 and the negative electrode can 302 are subjected to pressure bonding with the gasket 303 interposed therebetween. In such a manner, the coin-type secondary battery 300 can be fabricated.

Here, a current flow in charging the secondary battery will be described with reference to FIG. 13C. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" or a "plus electrode" and the negative electrode is referred to as a "negative electrode" or a "minus electrode" in all the cases where charging is performed, discharging is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, whether it is at the time of charging or discharging is noted and whether it corresponds to a positive electrode or a negative electrode is also noted.

Figure 13C:
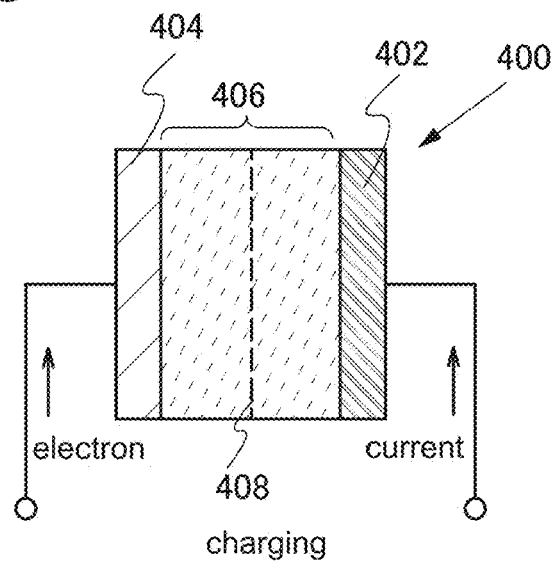

Two terminals in FIG. 13C are connected to a charger, and a secondary battery 400 is charged. As the charge of the secondary battery 400 proceeds, a potential difference between electrodes increases. The positive direction in FIG. 13C is the direction in which a current flows from the one terminal outside the secondary battery 400 to a positive electrode 402, flows from the positive electrode 402 to a negative electrode 404 in the secondary battery 400, and flows from the negative electrode 404 to the other terminal outside the secondary battery 400. In other words, the direction of a charging current is the direction of a flow of a current.

<<Cylindrical Secondary Battery>>

Figure 14A:
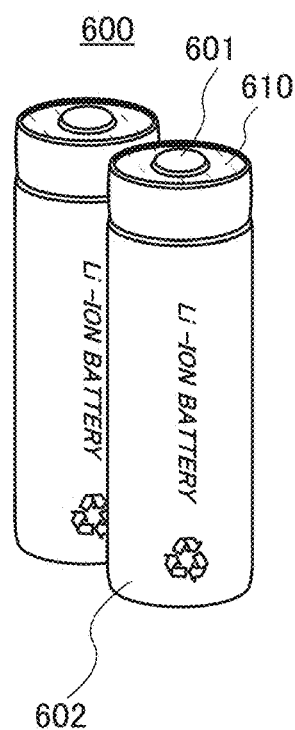
FIGS. 14A and 14B illustrate a cylindrical secondary battery.

Next, an example of a cylindrical secondary battery will be described with reference to FIGS. 14A and 14B. As illustrated in FIG. 14A, a cylindrical secondary battery 600 includes a positive electrode cap (battery cap) 601 on the top surface and a battery can (outer can) 602 on the side surface and bottom surface. The positive electrode cap 601 and the battery can 602 are insulated from each other by a gasket (insulating gasket) 610.

Figure 14B:
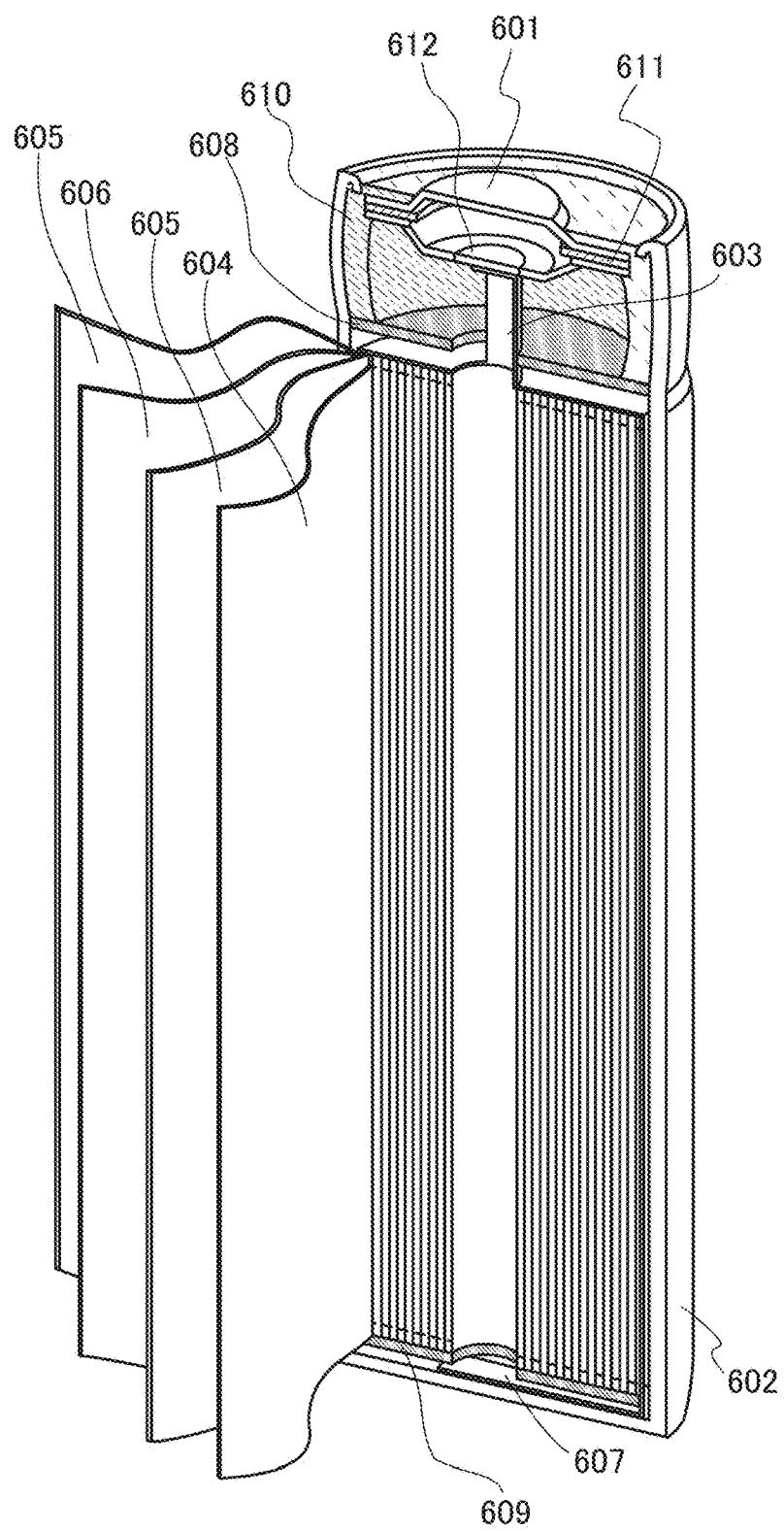

FIG. 14B is a diagram schematically illustrating a cross section of the cylindrical secondary battery. Inside the battery can 602 having a hollow cylindrical shape, a battery element in which a strip-like positive electrode 604 and a strip-like negative electrode 606 are wound with a strip-like separator 605 interposed therebetween is provided. Although not illustrated, the battery element is wound around a center pin. One end of the battery can 602 is closed and the other end thereof is open. For the battery can 602, a metal having a corrosion-resistant property to an electrolytic solution, such as nickel, aluminum, or titanium, an alloy of such a metal, or an alloy of such a metal and another metal (e.g., stainless steel or the like) can be used. Alternatively, the battery can 602 is preferably covered with nickel, aluminum, or the like in order to prevent corrosion due to the electrolytic solution. Inside the battery can 602, the battery element in which the positive electrode, the negative electrode, and the separator are wound is provided between a pair of insulating plates 608 and 609 which face each other. Furthermore, a nonaqueous electrolytic solution (not illustrated) is injected inside the battery can 602 provided with the battery element. As the nonaqueous electrolytic solution, a nonaqueous electrolytic solution that is similar to that of the coin-type secondary battery can be used.

Although the positive electrode 604 and the negative electrode 606 can be formed in a manner similar to that of the positive electrode and the negative electrode of the coin-type secondary battery described above, the difference lies in that, since the positive electrode and the negative electrode of the cylindrical secondary battery are wound, active materials are formed on both sides of the current collectors. A positive electrode terminal (positive electrode current collecting lead) 603 is connected to the positive electrode 604, and a negative electrode terminal (negative electrode current collecting lead) 607 is connected to the negative electrode 606. Both the positive electrode terminal 603 and the negative electrode terminal 607 can be formed using a metal material such as aluminum. The positive electrode terminal 603 and the negative electrode terminal 607 are resistance-welded to a safety valve mechanism 612 and the bottom of the battery can 602, respectively. The safety valve mechanism 612 is electrically connected to the positive electrode cap 601 through a positive temperature coefficient (PTC) element 611. The safety valve mechanism 612 cuts off electrical connection between the positive electrode cap 601 and the positive electrode 604 when the internal pressure of the battery exceeds a predetermined threshold value. The PTC element 611, which serves as a thermally sensitive resistor whose resistance increases as temperature rises, limits the amount of current by increasing the resistance, in order to prevent abnormal heat generation. Note that barium titanate ($BaTiO_3$)-based semiconductor ceramic can be used for the PTC element.

As the positive electrode active material layer of the secondary battery according to this embodiment, the positive electrode active material layer according to one embodiment of the present invention is used. For this reason, the output of the secondary battery can be increased.

FIGS. 15A to 15E illustrate examples of electronic devices including flexible laminated secondary batteries. Examples of electronic devices each including a flexible power storage device include television devices (also referred to as televisions or television receivers), monitors of computers or the like, cameras such as digital cameras and digital video cameras, digital photo frames, mobile phones (also referred to as mobile phones or mobile phone devices), portable game machines, portable information terminals, audio reproducing devices, and large game machines such as pachinko machines.

In addition, a flexible power storage device can be incorporated along a curved inside/outside wall surface of a house or a building or a curved interior/exterior surface of a car.

FIG. 15A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

FIG. 15B illustrates the mobile phone 7400 that is bent. When the whole mobile phone 7400 is bent by the external force, the power storage device 7407 included in the mobile phone 7400 is also bent. FIG. 15C illustrates the bent power storage device 7407. The power storage device 7407 is a laminated secondary battery.

FIG. 15D illustrates an example of a bangle display device. A portable display device 7100 includes a housing 7101, a display portion 7102, an operation button 7103, and a power storage device 7104. FIG. 15E illustrates the bent power storage device 7104.

<<Structural Example of Power Storage Device>>

Structural examples of power storage devices will be described with reference to FIGS. 16A and 16B, FIGS. 17A1, 17A2, 17B1, and 17B2, FIGS. 18A and 18B, FIGS. 19A and 19B, and FIG. 20.

Figure 16A:
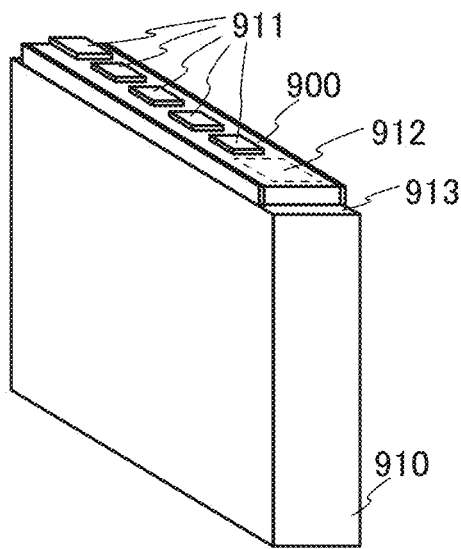
FIGS. 16A and 16B illustrate an example of a power storage device.
Figure 16B:
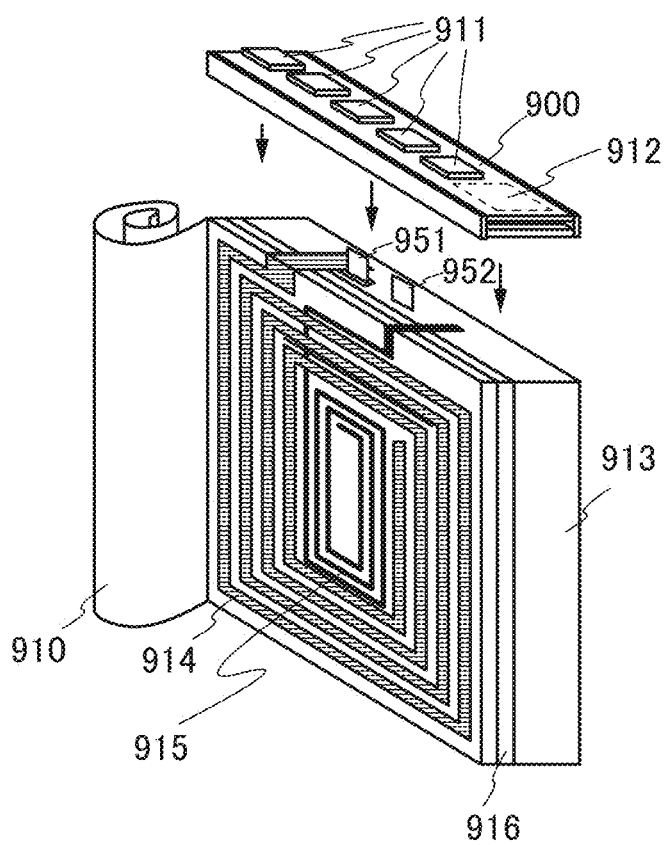

FIGS. 16A and 16B are external views of a power storage device. The power storage device includes a circuit board 900 and a secondary battery 913. A label 910 is attached to the secondary battery 913. As shown in FIG. 16B, the power storage device further includes a terminal 951, a terminal 952, an antenna 914, and an antenna 915.

The circuit board 900 includes terminals 911 and a circuit 912. The terminals 911 are connected to the terminals 951 and 952, the antennas 914 and 915, and the circuit 912. Note that a plurality of terminals 911 serving as a control signal input terminal, a power supply terminal, and the like may be provided.

The circuit 912 may be provided on the rear surface of the circuit board 900. The shape of each of the antennas 914 and 915 is not limited to a coil shape and may be a linear shape or a plate shape. Furthermore, a planar antenna, an aperture antenna, a traveling-wave antenna, an EH antenna, a magnetic-field antenna, a dielectric antenna, or the like may be used. Alternatively, the antenna 914 or the antenna 915 may be a flat-plate conductor. The flat-plate conductor can serve as one of conductors for electric field coupling. That is, the antenna 914 or the antenna 915 can serve as one of two conductors of a capacitor. Thus, electric power can be transmitted and received not only by an electromagnetic field or a magnetic field but also by an electric field.

The line width of the antenna 914 is preferably larger than that of the antenna 915. This makes it possible to increase the amount of electric power received by the antenna 914.

The power storage device includes a layer 916 between the secondary battery 913 and the antennas 914 and 915. The layer 916 may have a function of preventing an adverse effect on an electromagnetic field by the secondary battery 913. As the layer 916, for example, a magnetic body can be used.

Note that the structure of the power storage device is not limited to that shown in FIGS. 16A and 16B.

Figures 1, 17A:
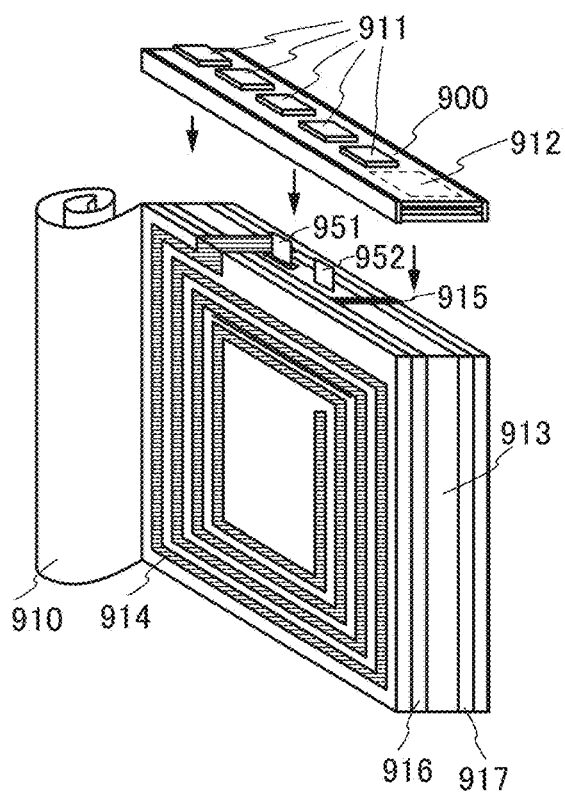
Figures 2, 17A:
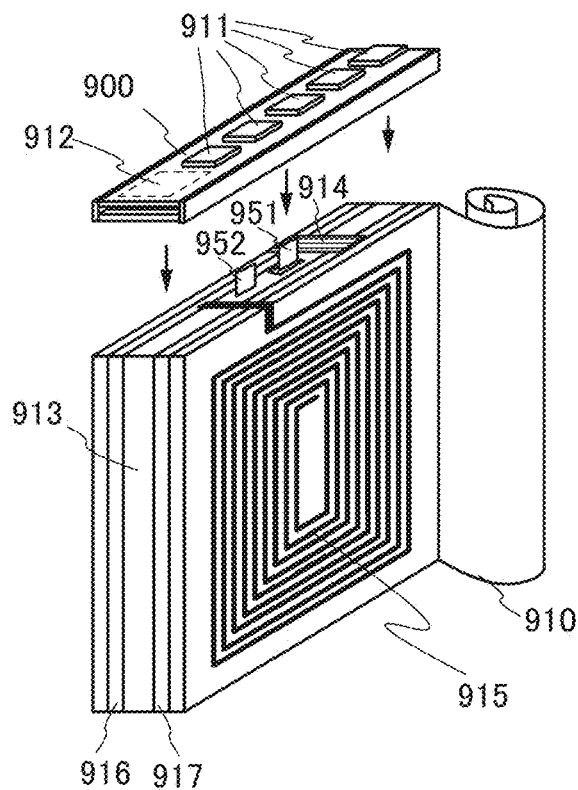

For example, as shown in FIGS. 17A1 and 17A2, two opposite surfaces of the secondary battery 913 in FIGS. 16A and 16B may be provided with respective antennas. FIG. 17A1 is an external view showing one side of the opposite surfaces, and FIG. 17A2 is an external view showing the other side of the opposite surfaces. For portions similar to those in FIGS. 16A and 16B, a description of the power storage device illustrated in FIGS. 16A and 16B can be referred to as appropriate.

As illustrated in FIG. 17A1, the antenna 914 is provided on one of the opposite surfaces of the secondary battery 913 with the layer 916 interposed therebetween, and as illustrated in FIG. 17A2, the antenna 915 is provided on the other of the opposite surfaces of the secondary battery 913 with a layer 917 interposed therebetween. The layer 917 may have a function of preventing an adverse effect on an electromagnetic field by the secondary battery 913, for example. As the layer 917, for example, a magnetic body can be used.

With the above structure, both of the antennas 914 and 915 can be increased in size.

Figures 1, 17B:
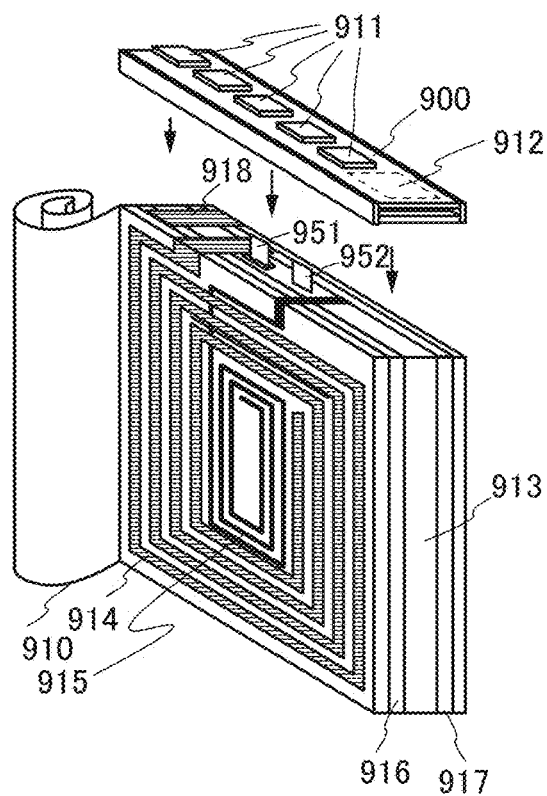
Figures 2, 17B:
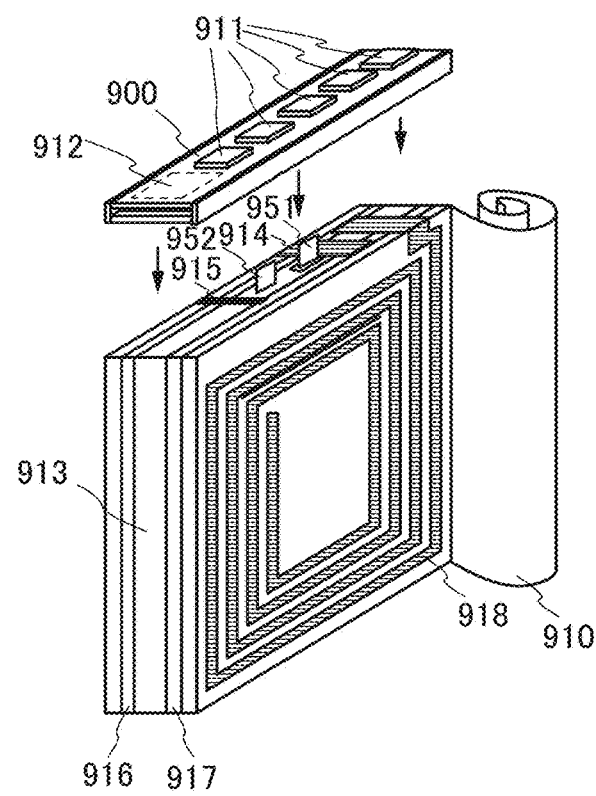

Alternatively, as illustrated in FIGS. 17B1 and 17B2, two opposite surfaces of the secondary battery 913 in FIGS. 16A and 16B may be provided with different types of antennas. FIG. 17B1 is an external view showing one side of the opposite surfaces, and FIG. 17B2 is an external view showing the other side of the opposite surfaces. For portions similar to those in FIGS. 16A and 16B, a description of the power storage device illustrated in FIGS. 16A and 16B can be referred to as appropriate.

As illustrated in FIG. 17B1, the antennas 914 and 915 are provided on one of the opposite surfaces of the secondary battery 913 with the layer 916 interposed therebetween, and as illustrated in FIG. 17B2, an antenna 918 is provided on the other of the opposite surfaces of the secondary battery 913 with the layer 917 interposed therebetween. The antenna 918 has a function of communicating data with an external device, for example. An antenna with a shape that can be applied to the antennas 914 and 915, for example, can be used as the antenna 918. As a system for communication using the antenna 918 between the power storage device and another device, a response method that can be used between the power storage device and another device, such as NFC, can be employed.

Figure 18A:
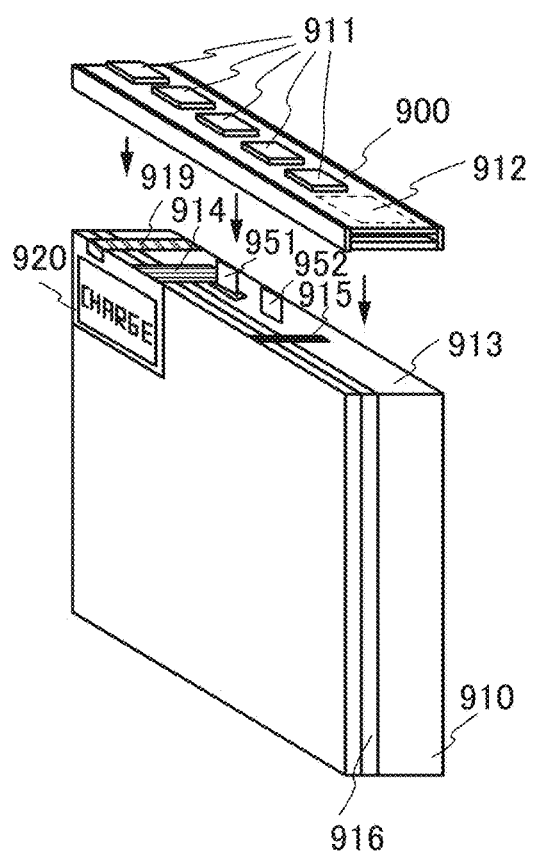
FIGS. 18A and 18B illustrate an example of a power storage device.

Alternatively, as illustrated in FIG. 18A, the secondary battery 913 in FIGS. 16A and 16B may be provided with a display device 920. The display device 920 is electrically connected to the terminal 911 via a terminal 919. It is possible that the label 910 is not provided in a portion where the display device 920 is provided. For portions similar to those in FIGS. 16A and 16B, a description of the power storage device illustrated in FIGS. 16A and 16B can be referred to as appropriate.

The display device 920 can display, for example, an image showing whether charging is being carried out, an image showing the amount of stored power, or the like. As the display device 920, electronic paper, a liquid crystal display device, an electroluminescent (EL) display device, or the like can be used. For example, the use of electronic paper can reduce power consumption of the display device 920.

Figure 18B:
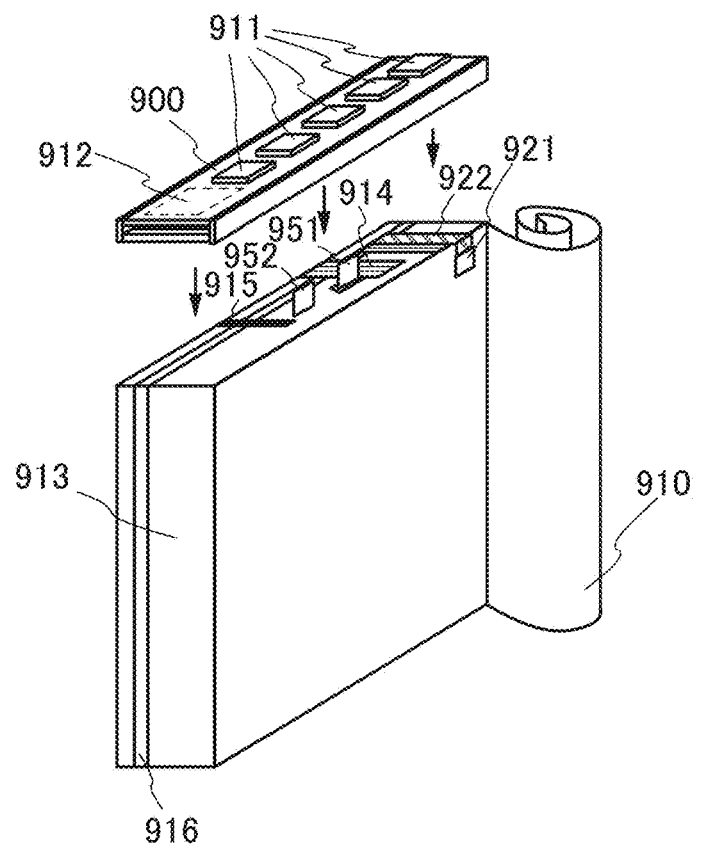

Alternatively, as illustrated in FIG. 18B, the secondary battery 913 illustrated in FIGS. 16A and 16B may be provided with a sensor 921. The sensor 921 is electrically connected to the terminal 911 via a terminal 922. For portions similar to those in FIGS. 16A and 16B, a description of the power storage device illustrated in FIGS. 16A and 16B can be referred to as appropriate.

The sensor 921 has a function of measuring, for example, displacement, position, speed, acceleration, angular velocity, rotational frequency, distance, light, liquid, magnetism, temperature, chemical substance, sound, time, hardness, electric field, electric current, voltage, electric power, radiation, flow rate, humidity, gradient, oscillation, odor, or infrared rays. With the sensor 921, for example, data on an environment (e.g., temperature) where the power storage device is placed can be determined and stored in a memory inside the circuit 912.

Furthermore, structural examples of the secondary battery 913 will be described with reference to FIGS. 19A and 19B and FIG. 20.

Figure 19A:
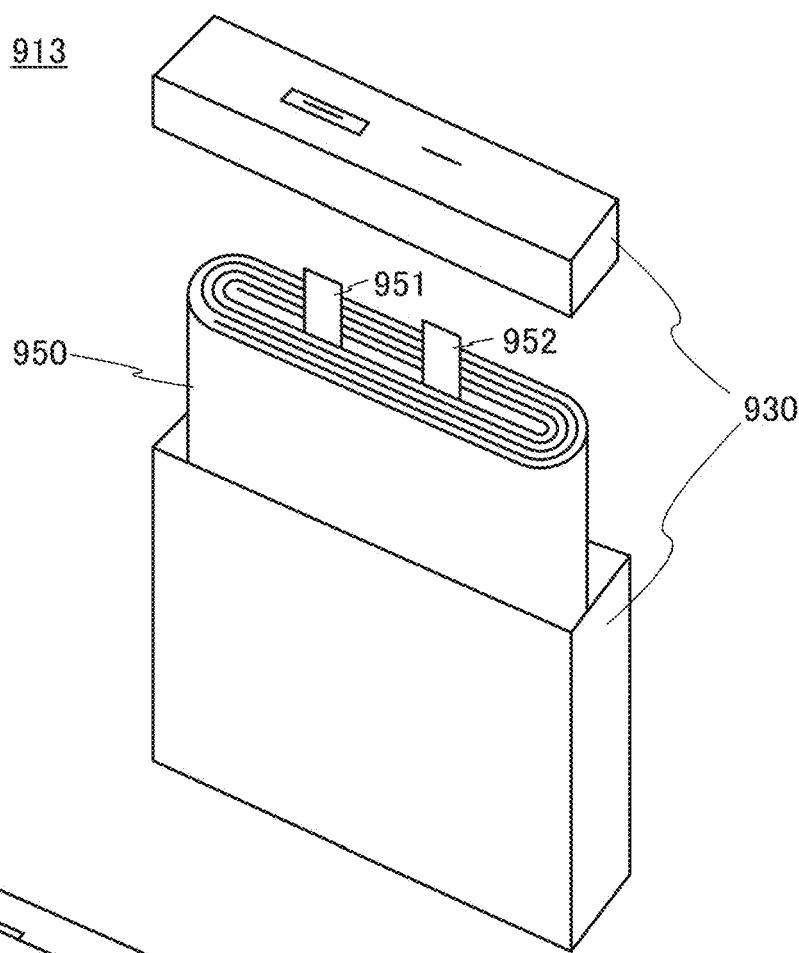
FIGS. 19A and 19B illustrate an example of a power storage device.

The secondary battery 913 illustrated in FIG. 19A includes a wound body 950 provided with the terminals 951 and 952 inside a housing 930. The wound body 950 is soaked in an electrolytic solution inside the housing 930. The terminal 952 is in contact with the housing 930. An insulator or the like prevents contact between the terminal 951 and the housing 930. Note that in FIG. 19A, the housing 930 divided into two pieces is illustrated for convenience; however, in the actual structure, the wound body 950 is covered with the housing 930 and the terminals 951 and 952 extend to the outside of the housing 930. For the housing 930, a metal material (e.g., aluminum) or a resin material can be used.

Figure 19B:
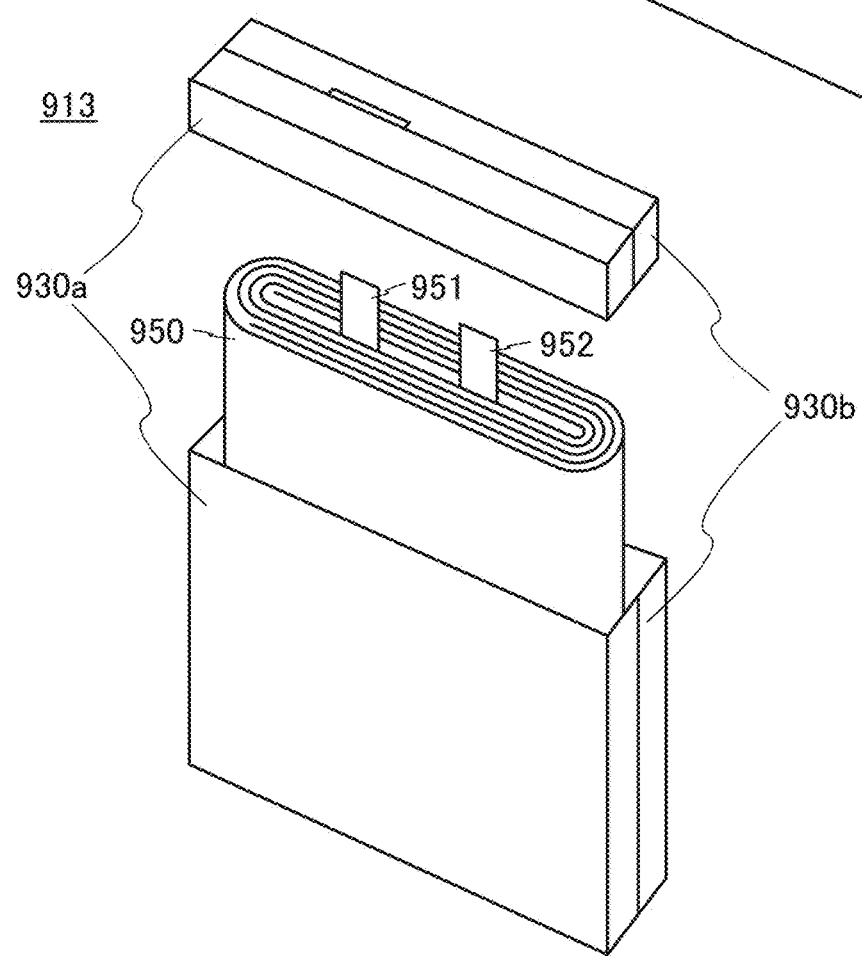

Note that as illustrated in FIG. 19B, the housing 930 in FIG. 19A may be formed using a plurality of materials. For example, in the secondary battery 913 in FIG. 19B, a housing 930*a* and a housing 930*b* are bonded to each other and the wound body 950 is provided in a region surrounded by the housing 930*a* and the housing 930*b*.

For the housing 930*a*, an insulating material such as an organic resin can be used. In particular, when a material such as an organic resin is used for the side on which an antenna is formed, blocking of an electric field by the secondary battery 913 can be prevented. When an electric field is not significantly blocked by the housing 930*a*, an antenna such as the antennas 914 and 915 may be provided inside the housing 930*a*. For the housing 930*b*, a metal material can be used, for example.

Figure 20:
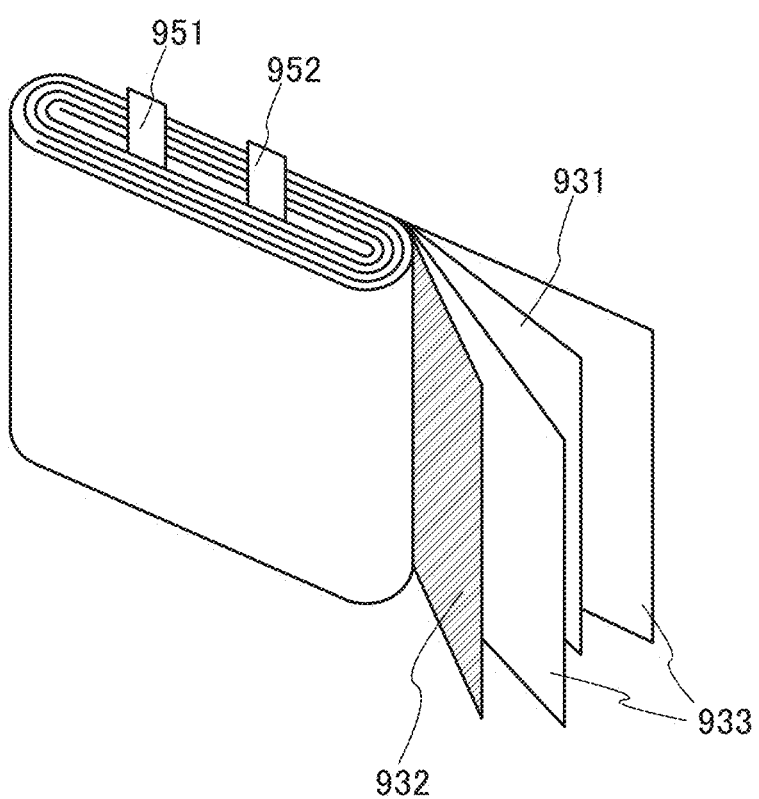
FIG. 20 illustrates an example of a power storage device.

FIG. 20 illustrates the structure of the wound body 950. The wound body 950 includes a negative electrode 931, a positive electrode 932, and separators 933. The wound body 950 is obtained by winding a sheet of a stack in which the negative electrode 931 overlaps with the positive electrode 932 with the separator 933 provided therebetween. Note that a plurality of stacks of the negative electrode 931, the positive electrode 932, and the separator 933 may be stacked.

The negative electrode 931 is connected to the terminal 911 in FIGS. 16A and 16B via one of the terminals 951 and 952. The positive electrode 932 is connected to the terminal 911 in FIGS. 16A and 16B via the other of the terminals 951 and 952.

[Examples of Electric Devices: Vehicles]

Next, examples where a secondary battery is used in a vehicle will be described. The use of secondary batteries in vehicles enables production of next-generation clean energy vehicles such as hybrid electric vehicles (HEVs), electric vehicles (EVs), and plug-in hybrid electric vehicles (PHEVs).

Figure 21A:
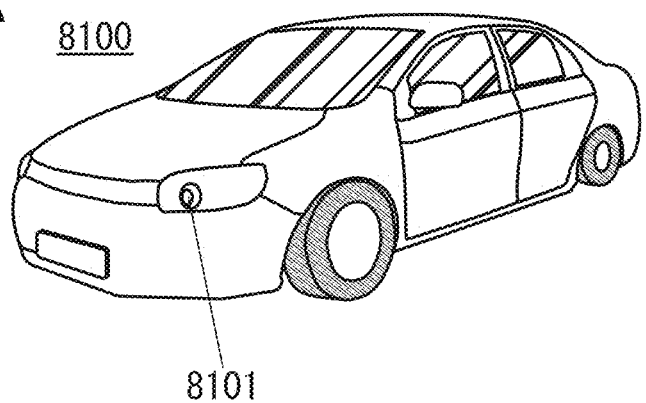
FIGS. 21A and 21B are diagrams of application examples of a power storage device.
Figure 21B:
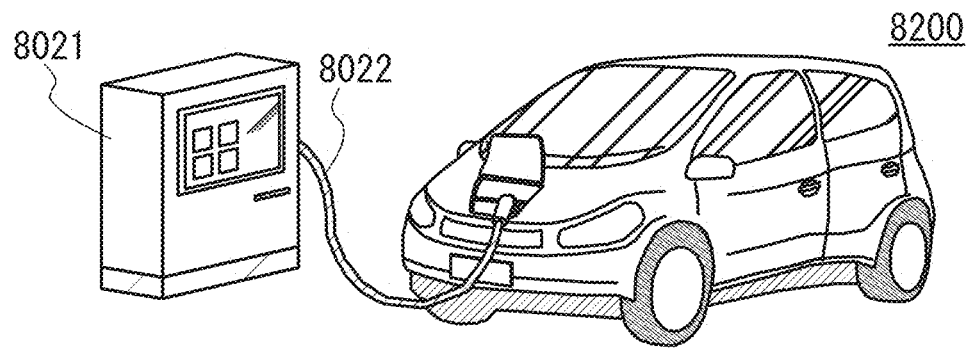

FIGS. 21A and 21B each illustrate an example of a vehicle using one embodiment of the present invention. An automobile 8100 illustrated in FIG. 21A is an electric vehicle that runs on the power of an electric motor. Alternatively, the automobile 8100 is a hybrid electric vehicle capable of driving appropriately using either the electric motor or the engine. One embodiment of the present invention can provide a vehicle which can be repeatedly charged and discharged. The automobile 8100 includes the power storage device. The power storage device is used not only for driving an electric motor, but also for supplying electric power to a light-emitting device such as a headlight 8101 or an interior light (not illustrated).

The power storage device can also supply electric power to a display device of a speedometer, a tachometer, or the like included in the automobile 8100. Furthermore, the power storage device can supply electric power to a semiconductor device included in the automobile 8100, such as a navigation system.

FIG. 21B illustrates an automobile 8200 including the power storage device. The automobile 8200 can be charged when the power storage device is supplied with electric power through external charging equipment by a plug-in system, a contactless power feeding system, or the like. In FIG. 21B, the power storage device included in the automobile 8200 is charged with the use of a ground-based charging apparatus 8021 through a cable 8022. The charging apparatus 8021 may be a charging station provided in a commerce facility or a power source in a house. For example, with the use of a plug-in technique, the power storage device included in the automobile 8200 can be charged by being supplied with electric power from outside. The charging can be performed by converting AC electric power into DC electric power through a converter such as an AC-DC converter.

Furthermore, although not illustrated, the vehicle may include a power receiving device so that it can be charged by being supplied with electric power from an above-ground power transmitting device in a contactless manner. In the case of the contactless power feeding system, by fitting a power transmitting device in a road or an exterior wall, charging can be performed not only when the electric vehicle is stopped but also when driven. In addition, the contactless power feeding system may be utilized to perform transmission and reception of electric power between vehicles. Furthermore, a solar cell may be provided in the exterior of the automobile to charge the power storage device when the automobile stops or moves. To supply electric power in such a contactless manner, an electromagnetic induction method or a magnetic resonance method can be used.

Of one embodiment of the present invention, the power storage device can have improved cycle life and reliability. Furthermore, of one embodiment of the present invention, the power storage device itself can be made more compact and lightweight as a result of improved characteristics of the power storage device. The compact and lightweight power storage device contributes to a reduction in the weight of a vehicle, and thus increases the mileage. Furthermore, the power storage device included in the vehicle can be used as a power source for supplying electric power to products other than the vehicle. In such a case, the use of a commercial power source can be avoided at peak time of electric power demand.

This embodiment can be implemented in appropriate combination with any of the other embodiments.

Note that in the case where at least one specific example is described in a diagram or a text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the invention is clear.

Note that in this specification and the like, a content described in at least a diagram (which may be part of the diagram) is disclosed as one embodiment of the invention, and one embodiment of the invention can be constituted. Therefore, when a certain content is described in a diagram, the content is disclosed as one embodiment of the invention even when the content is not described with a text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

Embodiment 4

A battery management unit (BMU) which can be combined with a battery cell including the materials described in the above embodiment, and a transistor suitable for a circuit included in the battery management unit will be described with reference to FIG. 22, FIGS. 23A to 23C, FIG. 24, FIG. 25, FIGS. 26A to 26C, FIG. 27, and FIG. 28. In this embodiment, a battery management unit of a power storage device including battery cells that are connected in series will be particularly described.

When a plurality of battery cells connected in series are charged and discharged repeatedly, each battery cell has different capacity (and output voltage depending on the capacity) from one another because of the variation in performance among the battery cells. The discharge capacity of all of the battery cells connected in series depends on a battery cell with low capacity. The variation in capacities reduces the capacity of the battery cells at the time of discharging. Charging based on a battery cell with low capacity may cause insufficient charging. Charging based on a battery cell with high capacity may cause overcharge.

Thus, the battery management unit of the power storage device including battery cells connected in series has a function of reducing variation in capacities among the battery cells which causes insufficient charging or overcharge. Although circuit structures for reducing variation in capacities among the battery cells include a resistive type, a capacitor type, and an inductor type, a circuit structure which can reduce variation in capacities among the battery cells using transistors with a low off-state current is explained here as an example.

A transistor including an oxide semiconductor in its channel formation region (an OS transistor) is preferably used as the transistor with a low off-state current. When an OS transistor with a low off-state current is used in the circuit of the battery management unit of the power storage device, the amount of electric charge leaking from a battery can be reduced, and reduction in capacity over time can be suppressed.

As the oxide semiconductor used in the channel formation region, an In-M-Zn oxide (M is Ga, Sn, Y, Zr, La, Ce, or Nd) is used. In the case where the atomic ratio of the metal elements of a target for forming an oxide semiconductor film is In:M:Zn=$x_1$:$y_1$:$z_1$, $x_1/y_1$ is preferably greater than or equal to ⅓ and less than or equal to 6, further preferably greater than or equal to 1 and less than or equal to 6, and $z_1/y_1$ is preferably greater than or equal to ⅓ and less than or equal to 6, further preferably greater than or equal to 1 and less than or equal to 6. Note that when $z_1/y_1$ is greater than or equal to 1 and less than or equal to 6, a CAAC-OS film as the oxide semiconductor film is easily formed.

Here, the details of the CAAC-OS film will be described.

The CAAC-OS film is one of oxide semiconductor films having a plurality of c-axis aligned crystal parts.

In a combined analysis image (also referred to as a high-resolution TEM image) of a bright-field image and a diffraction pattern of a CAAC-OS film, which is obtained using a transmission electron microscope (TEM), a plurality of crystal parts can be observed. However, in the high-resolution TEM image, a boundary between crystal parts, that is, a grain boundary cannot be clearly observed. Thus, in the CAAC-OS film, a reduction in electron mobility due to the grain boundary is less likely to occur.

According to the high-resolution cross-sectional TEM image of the CAAC-OS film observed in a direction substantially parallel to a sample surface, metal atoms are arranged in a layered manner in the crystal parts. Each metal atom layer has a morphology reflecting unevenness of a surface over which the CAAC-OS film is formed (hereinafter, a surface over which the CAAC-OS film is formed is referred to as a formation surface) or of a top surface of the CAAC-OS film, and is arranged parallel to the formation surface or the top surface of the CAAC-OS film.

On the other hand, according to the high-resolution planar TEM image of the CAAC-OS film observed in a direction substantially perpendicular to the sample surface, metal atoms are arranged in a triangular or hexagonal configuration in the crystal parts. However, there is no regularity of arrangement of metal atoms between different crystal parts.

A CAAC-OS film is subjected to structural analysis with an X-ray diffraction (XRD) apparatus. For example, when the CAAC-OS film including an $InGaZnO_4$ crystal is analyzed by an out-of-plane method, a peak appears frequently when the diffraction angle (2θ) is around 31°. This peak is derived from the (009) surface of the $InGaZnO_4$ crystal, which indicates that crystals in the CAAC-OS film have c-axis alignment, and that the c-axes are aligned in a direction substantially perpendicular to the formation surface or the top surface of the CAAC-OS film.

Note that when the CAAC-OS film including an $InGaZnO_4$ crystal is analyzed by an out-of-plane method, a peak of 2θ may also be observed at around 36°, in addition to the peak of 2θ at around 31°. The peak of 2θ at around 36° indicates that a crystal having no c-axis alignment is included in part of the CAAC-OS film. It is preferable that in the CAAC-OS film, a peak of 2θ appear at around 31° and a peak of 2θ not appear at around 36°.

The CAAC-OS film is an oxide semiconductor film having low impurity concentration. The impurity is an element other than the main components of the oxide semiconductor film, such as hydrogen, carbon, silicon, or a transition metal element. In particular, an element that has higher bonding strength to oxygen than a metal element included in the oxide semiconductor film, such as silicon, disturbs the atomic arrangement of the oxide semiconductor film by depriving the oxide semiconductor film of oxygen and causes a decrease in crystallinity. Further, a heavy metal such as iron or nickel, argon, carbon dioxide, or the like has a large atomic radius (molecular radius), and thus disturbs the atomic arrangement of the oxide semiconductor film and causes a decrease in crystallinity when it is contained in the oxide semiconductor film. Note that the impurity contained in the oxide semiconductor film might serve as a carrier trap or a carrier generation source.

The CAAC-OS film is an oxide semiconductor film having a low density of defect states. In some cases, oxygen vacancies in the oxide semiconductor film serve as carrier traps or serve as carrier generation sources when hydrogen is captured therein.

The state in which impurity concentration is low and density of defect states is low (the number of oxygen vacancies is small) is referred to as a "highly purified intrinsic" or "substantially highly purified intrinsic" state. A highly purified intrinsic or substantially highly purified intrinsic oxide semiconductor film has few carrier generation sources, and thus can have a low carrier density. Thus, a transistor including the oxide semiconductor film rarely has negative threshold voltage (is rarely normally on). The highly purified intrinsic or substantially highly purified intrinsic oxide semiconductor film has few carrier traps. Accordingly, the transistor including the oxide semiconductor film has little variation in electrical characteristics and high reliability. Electric charge trapped by the carrier traps in the oxide semiconductor film takes a long time to be released, and might behave like fixed electric charge. Thus, the transistor which includes the oxide semiconductor film having high impurity concentration and a high density of defect states has unstable electrical characteristics in some cases.

With the use of the CAAC-OS film in a transistor, variation in the electrical characteristics of the transistor due to irradiation with visible light or ultraviolet light is small.

Since the OS transistor has a wider band gap than a transistor including silicon in its channel formation region (a Si transistor), dielectric breakdown is unlikely to occur when a high voltage is applied. Although a voltage of several hundreds of volts is generated when battery cells are connected in series, the above OS transistor is suitable for a circuit of a battery management unit which is used for such battery cells in the power storage device.

Figure 22:
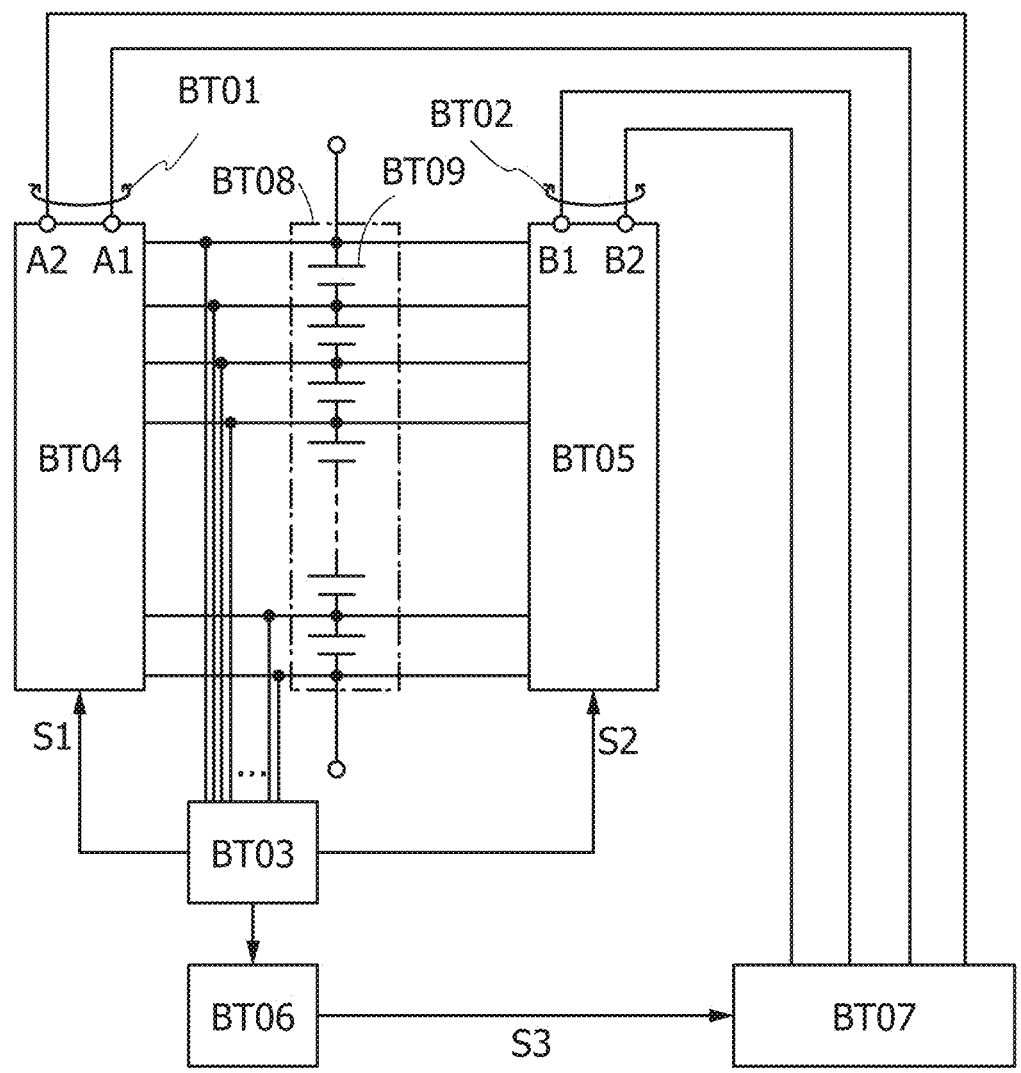
FIG. 22 is a block diagram illustrating one embodiment of the present invention.

FIG. 22 is an example of a block diagram of the power storage device. A power storage device BT00 illustrated in FIG. 22 includes a terminal pair BT01, a terminal pair BT02, a switching control circuit BT03, a switching circuit BT04, a switching circuit BT05, a voltage transformation control circuit BT06, a voltage transformer circuit BT07, and a battery portion BT08 including a plurality of battery cells BT09 connected in series.

In the power storage device BT00 illustrated in FIG. 22, a portion including the terminal pair BT01, the terminal pair BT02, the switching control circuit BT03, the switching circuit BT04, the switching circuit BT05, the voltage transformation control circuit BT06, and the voltage transformer circuit BT07 can be referred to as a battery management unit.

The switching control circuit BT03 controls operations of the switching circuits BT04 and BT05. Specifically, the switching control circuit BT03 selects battery cells to be discharged (a discharge battery cell group) and battery cells to be charged (a charge battery cell group) in accordance with voltage measured for every battery cell BT09.

Furthermore, the switching control circuit BT03 outputs a control signal S1 and a control signal S2 on the basis of the selected discharge battery cell group and the selected charge battery cell group. The control signal S1 is output to the switching circuit BT04. The control signal S1 controls the switching circuit BT04 so that the terminal pair BT01 and the discharge battery cell group are connected. In addition, the control signal S2 is output to the switching circuit BT05. The control signal S2 controls the switching circuit BT05 so that the terminal pair BT02 and the charge battery cell group are connected.

The switching control circuit BT03 generates the control signal S1 and the control signal S2 on the basis of connection relation of the switching circuit BT04, the switching circuit BT05, and the voltage transformer circuit BT07 so that terminals having the same polarity of the terminal pair BT01 and the discharge battery cell group are connected with each other, or terminals having the same polarity of the terminal pair BT02 and the charge battery cell group are connected with each other.

An operation of the switching control circuit BT03 is described in detail.

First, the switching control circuit BT03 measures the voltage of each of the plurality of battery cells BT09. Then, the switching control circuit BT03 determines that the battery cell BT09 having a voltage higher than a predetermined threshold value is a high-voltage battery cell (high-voltage cell) and that the battery cell BT09 having a voltage lower than the predetermined threshold value is a low-voltage battery cell (low-voltage cell), for example.

As a method to determine whether a battery cell is a high-voltage cell or a low-voltage cell, any of various methods can be employed. For example, the switching control circuit BT03 may determine whether each battery cell BT09 is a high-voltage cell or a low-voltage cell on the basis of the voltage of a battery cell BT09 having a highest voltage or a lowest voltage among the plurality of battery cells BT09. In this case, the switching control circuit BT03 can determine whether each battery cell BT09 is a high-voltage cell or a low-voltage cell by determining whether or not a ratio of a voltage of each battery cell BT09 to the reference voltage is the predetermined value or more. Then, the switching control circuit BT03 determines a charge battery cell group and a discharge battery cell group on the basis of the determination result.

Note that high-voltage cells and low-voltage cells are mixed in various states in the plurality of battery cells BT09. For example, the switching control circuit BT03 selects a portion having the largest number of high-voltage cells connected in series as the discharge battery cell group of mixed high-voltage cells and low-voltage cells. Furthermore, the switching control circuit BT03 selects a portion having the largest number of low-voltage cells connected in series as the charge battery cell group. In addition, the switching control circuit BT03 may preferentially select battery cells BT09 which are near overcharged or overdischarged as the discharge battery cell group or the charge battery cell group.

Figure 23A:
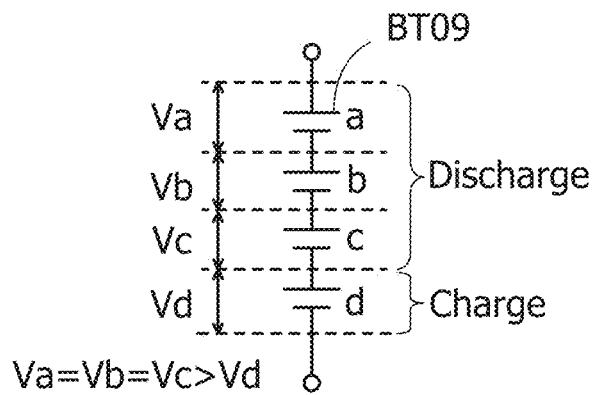
FIGS. 23A to 23C are conceptual diagrams illustrating one embodiment of the present invention.
Figure 23B:
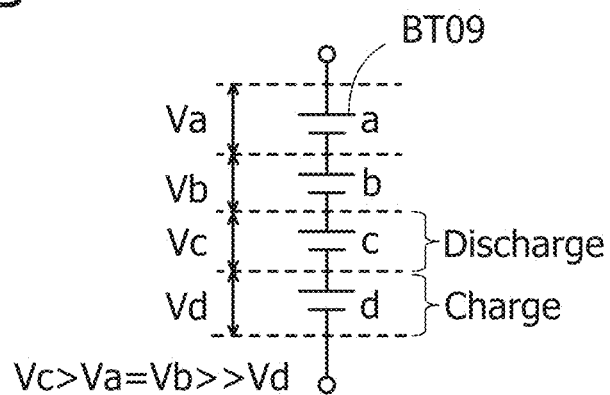
Figure 23C:
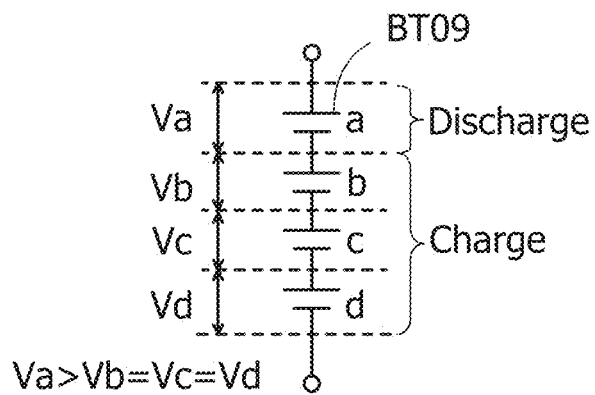

Here, operation examples of the switching control circuit BT03 in this embodiment will be described with reference to FIGS. 23A to 23C. FIGS. 23A to 23C illustrate operation examples of the switching control circuit BT03. Note that FIGS. 23A to 23C each illustrate the case where four battery cells BT09 are connected in series as an example for convenience of explanation.

FIG. 23A shows the case where the relation of voltages Va, Vb, Vc, and Vd is Va=Vb=Vc>Vd where the voltages Va, Vb, Vc, and Vd are voltages of a battery cell a, a battery cell b, a battery cell c, and a battery cell d, respectively. That is, a series of three high-voltage cells a to c and one low-voltage cell d are connected in series. In that case, the switching control circuit BT03 selects the series of three high-voltage cells a to c as the discharge battery cell group. In addition, the switching control circuit BT03 selects the low-voltage cell d as the charge battery cell group.

Next, FIG. 23B shows the case where the relation of the voltages is Vc>Va=Vb>>Vd. That is, a series of two low-voltage cells a and b, one high-voltage cell c, and one low-voltage cell d which is close to overdischarge are connected in series. In that case, the switching control circuit BT03 selects the high-voltage cell c as the discharge battery cell group. Since the low-voltage cell d is close to overdischarge, the switching control circuit BT03 preferentially selects the low-voltage cell d as the charge battery cell group instead of the series of two low-voltage cells a and b.

Lastly, FIG. 23C shows the case where the relation of the voltages is Va>Vb=Vc=Vd. That is, one high-voltage cell a and a series of three low-voltage cells b to d are connected in series. In that case, the switching control circuit BT03 selects the high-voltage cell a as the discharge battery cell group. In addition, the switching control circuit BT03 selects the series of three low-voltage cells b to d as the charge battery cell group.

On the basis of the determination result shown in the examples of FIGS. 23A to 23C, the switching control circuit BT03 outputs the control signal S1 and the control signal S2 to the switching circuit BT04 and the switching circuit BT05, respectively. Information showing the discharge battery cell group being the connection destination of the switching circuit BT04 is set in the control signal S1. Information showing the charge battery cell group being a connection destination of the switching circuit BT05 is set in the control signal S2.

The above is the detailed description of the operation of the switching control circuit BT03.

The switching circuit BT04 sets the discharge battery cell group selected by the switching control circuit BT03 as the connection destination of the terminal pair BT01 in response to the control signal S1 output from the switching control circuit BT03.

The terminal pair BT01 includes a pair of terminals A1 and A2. The switching circuit BT04 sets the connection destination of the terminal pair BT01 by connecting one of the pair of terminals A1 and A2 to a positive electrode terminal of a battery cell BT09 positioned on the most upstream side (on the high potential side) of the discharge battery cell group, and the other to a negative electrode terminal of a battery cell BT09 positioned on the most downstream side (on the low potential side) of the discharge battery cell group. Note that the switching circuit BT04 can recognize the position of the discharge battery cell group on the basis of the information set in the control signal S1.

The switching circuit BT05 sets the charge battery cell group selected by the switching control circuit BT03 as the connection destination of the terminal pair BT02 in response to the control signal S2 output from the switching control circuit BT03.

The terminal pair BT02 includes a pair of terminals B1 and B2. The switching circuit BT05 sets the connection destination of the terminal pair BT02 by connecting one of the pair of terminals B1 and B2 to a positive electrode terminal of a battery cell BT09 positioned on the most upstream side (on the high potential side) of the charge battery cell group, and the other to a negative electrode terminal of a battery cell BT09 positioned on the most downstream side (on the low potential side) of the charge battery cell group. Note that the switching circuit BT05 can recognize the position of the charge battery cell group on the basis of the information set in the control signal S2.

Figure 24:
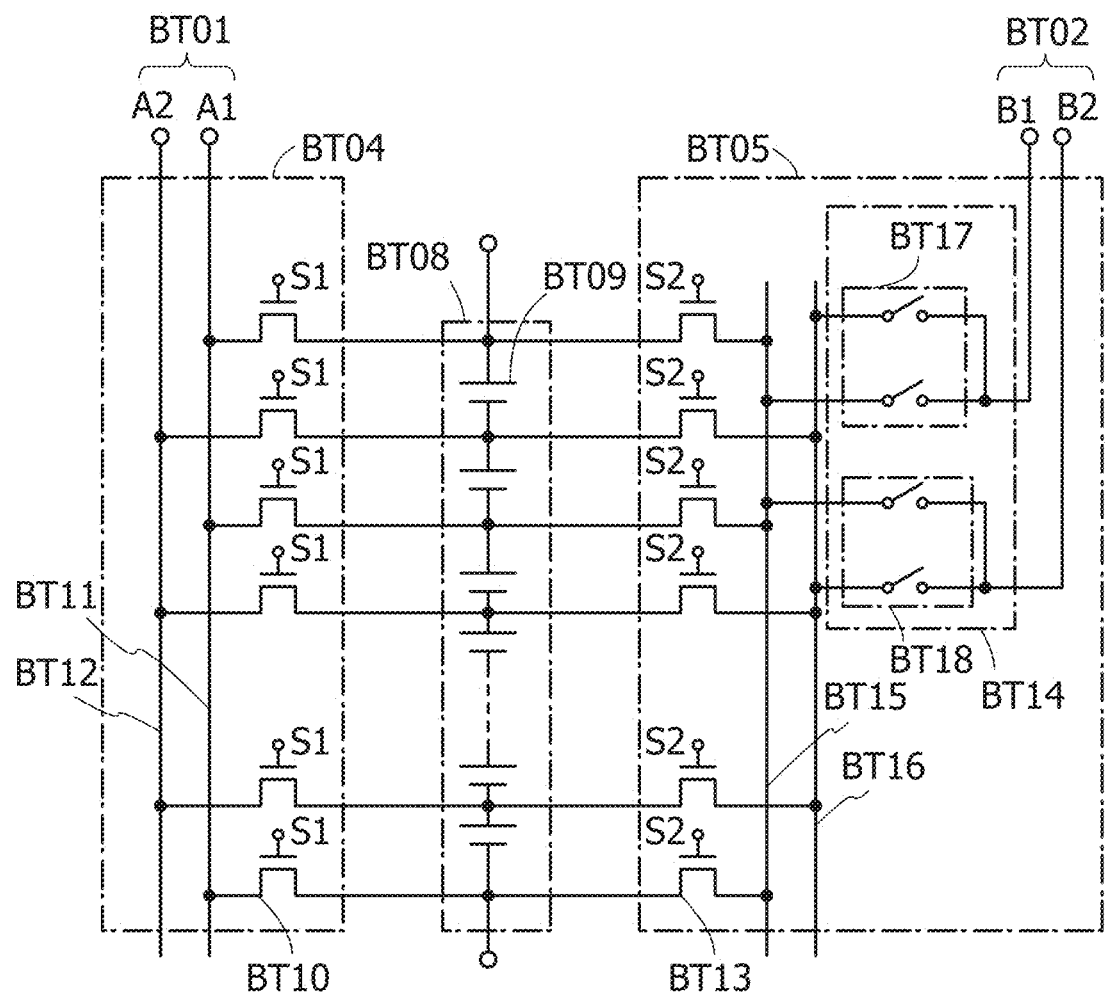
FIG. 24 is a circuit diagram illustrating one embodiment of the present invention.
Figure 25:
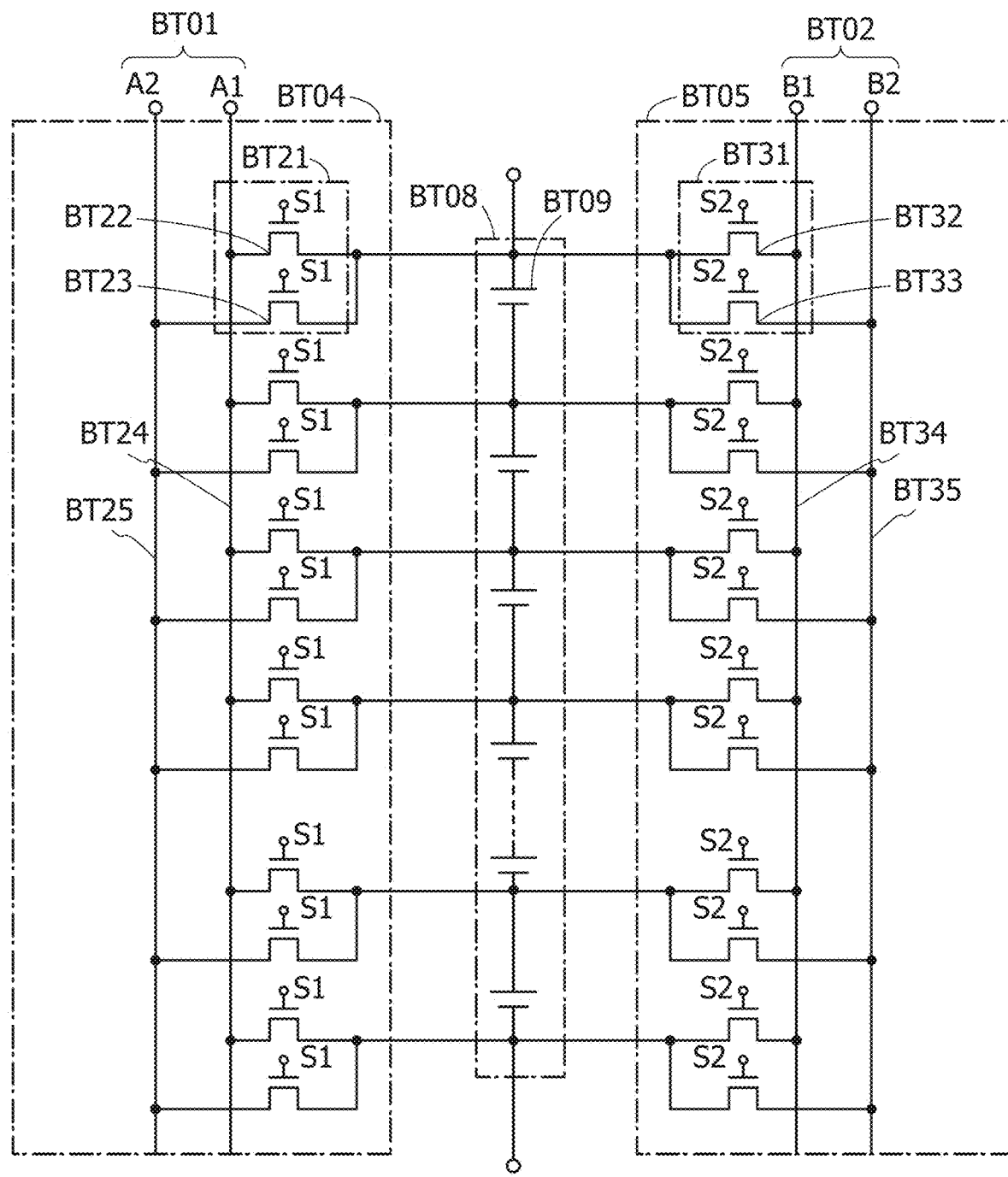
FIG. 25 is a circuit diagram illustrating one embodiment of the present invention.

FIG. 24 and FIG. 25 are circuit diagrams showing configuration examples of the switching circuits BT04 and BT05.

In FIG. 24, the switching circuit BT04 includes a plurality of transistors BT10, a bus BT11, and a bus BT12. The bus BT11 is connected to the terminal A1. The bus BT12 is connected to the terminal A2. Sources or drains of the plurality of transistors BT10 are connected alternately to the bus BT11 and the bus BT12. Sources or drains which are not connected to the bus BT11 and the bus BT12 of the plurality of transistors BT10 are each connected between two adjacent battery cells BT09.

A source or a drain which is not connected to the bus BT11 and the bus BT12 of the transistor BT10 on the most upstream side of the plurality of transistors BT10 is connected to a positive electrode terminal of a battery cell BT09 on the most upstream side of the battery portion BT08. A source or a drain which is not connected to the bus BT11 and the bus BT12 of the transistor BT10 on the most downstream side of the plurality of transistors BT10 is connected to a negative electrode terminal of a battery cell BT09 on the most downstream side of the battery portion BT08.

The switching circuit BT04 connects the discharge battery cell group to the terminal pair BT01 by bringing one of the plurality of the transistors BT10 which are connected to the bus BT11 and one of the plurality of transistors BT10 which are connected to the bus BT12 into an on state in response to the control signal S1 supplied to gates of the plurality of transistors BT10. Accordingly, the positive electrode terminal of the battery cell BT09 on the most upstream side of the discharge battery cell group is connected to one of the pair of terminals A1 and A2. In addition, the negative electrode terminal of the battery cell BT09 on the most downstream side of the discharge battery cell group is connected to the other of the pair of terminals A1 and A2 (i.e., a terminal which is not connected to the positive electrode terminal).

An OS transistor is preferably used as the transistor BT10. Since the off-state current of the OS transistor is low, the amount of electric charge leaking from battery cells which do not belong to the discharge battery cell group can be reduced, and reduction in capacity over time can be suppressed. In addition, dielectric breakdown is unlikely to occur in the OS transistor when a high voltage is applied. Therefore, the battery cell BT09 and the terminal pair BT01, which are connected to the transistor BT10 in an off state, can be insulated from each other even when an output voltage of the discharge battery cell group is high.

In FIG. 24, the switching circuit BT05 includes a plurality of transistors BT13, a current control switch BT14, a bus BT15, and a bus BT16. The bus BT15 and the bus BT16 are provided between the plurality of transistors BT13 and the current control switch BT14. Sources or drains of the plurality of transistors BT13 are connected alternately to the bus BT15 and the bus BT16. Sources or drains which are not connected to the bus BT15 and the bus BT16 of the plurality of transistors BT13 are each connected between two adjacent battery cells BT09.

A source or a drain of the transistor BT13 which is not connected to the bus BT15 on the most upstream side of the plurality of transistors BT13 is connected to a positive electrode terminal of the battery cell BT09 on the most upstream side of the battery portion BT08. A source or a drain of the transistor BT13 which is not connected to the bus BT15 on the most downstream side of the plurality of transistors BT13 is connected to a negative electrode terminal of the battery cell BT09 on the most downstream side of the battery portion BT08.

OS transistors are preferably used as the transistors BT13 like the transistors BT10. Since the off-state current of the OS transistor is low, the amount of electric charge leaking from the battery cells which do not belong to the charge battery cell group can be reduced, and reduction in capacity over time can be suppressed. In addition, dielectric breakdown is unlikely to occur in the OS transistor when a high voltage is applied. Therefore, the battery cell BT09 and the terminal pair BT02, which are connected to the transistor BT13 in an off state, can be insulated from each other even when a voltage for charging the charge battery cell group is high.

The current control switch BT14 includes a switch pair BT17 and a switch pair BT18. One end of the switch pair BT17 is connected to the terminal B1. The other ends of the switch pair BT17 extend from respective switches of the switch pair BT17. One switch is connected to the bus BT15, and the other switch is connected to the bus BT16. One end of the switch pair BT18 is connected to the terminal B2. The other ends of the switch pair BT18 extend from two switches of the switch pair BT18. One switch is connected to the bus BT15, and the other switch is connected to the bus BT16.

OS transistors are preferably used for the switches included in the switch pair BT17 and the switch pair BT18 like the transistors BT10 and BT13.

The switching circuit BT05 connects the charge battery cell group and the terminal pair BT02 in response to the control signal S2 by controlling the combination of on and off states of the transistors BT13 and the current control switch BT14.

For example, the switching circuit BT05 connects the charge battery cell group and the terminal pair BT02 in the following manner.

The switching circuit BT05 brings a transistor BT13 connected to a positive electrode terminal of a battery cell BT09 on the most upstream side of the charge battery cell group into an on state in response to the control signal S2 supplied to gates of the plurality of the transistors BT13. In addition, the switching circuit BT05 brings a transistor BT13 connected to a negative electrode terminal of a battery cell BT09 on the most downstream side of the charge battery cell group into an on state in response to the control signal S2 supplied to the gates of the plurality of the transistors BT13.

The polarities of voltages applied to the terminal pair BT02 can vary in accordance with the connection structures of the discharge battery cell group connected to the terminal pair BT01 and the voltage transformer circuit BT07. In order to supply current in a direction for charging the charge battery cell group, terminals with the same polarity of the terminal pair BT02 and the charge battery cell group are required to be connected. In view of this, the current control switch BT14 is controlled by the control signal S2 so that the connection destination of the switch pair BT17 and that of the switch pair BT18 are changed in accordance with the polarities of the voltages applied to the terminal pair BT02.

The state where voltages are applied to the terminal pair BT02 so as to make the terminal B1 a positive electrode and the terminal B2 a negative electrode is described as an example. Here, in the case where the battery cell BT09 positioned on the most downstream side of the battery portion BT08 is in the charge battery cell group, the switch pair BT17 is controlled to be connected to the positive electrode terminal of the battery cell BT09 in response to the control signal S2. That is, the switch of the switch pair BT17 connected to the bus BT16 is turned on, and the switch of the switch pair BT17 connected to the bus BT15 is turned off. In contrast, the switch pair BT18 is controlled to be connected to the negative electrode terminal of the battery cell BT09 positioned on the most downstream side of the battery portion BT08 in response to the control signal S2. That is, the switch of the switch pair BT18 connected to the bus BT15 is turned on, and the switch of the switch pair BT18 connected to the bus BT16 is turned off. In this manner, terminals with the same polarity of the terminal pair BT02 and the charge battery cell group are connected to each other. In addition, the current which flows from the terminal pair BT02 is controlled to be supplied in a direction so as to charge the charge battery cell group.

In addition, instead of the switching circuit BT05, the switching circuit BT04 may include the current control switch BT14.

FIG. 25 is a circuit diagram illustrating structure examples of the switching circuit BT04 and the switching circuit BT05 which are different from those of FIG. 24.

In FIG. 25, the switching circuit BT04 includes a plurality of transistor pairs BT21, a bus BT24, and a bus BT25. The bus BT24 is connected to the terminal A1. The bus BT25 is connected to the terminal A2. One ends of the transistor pair BT21 extend from a transistor BT22 and a transistor BT23. Source or drain of the transistor BT22 is connected to the bus BT24. Source or drain of the transistor BT23 is connected to the bus BT25. In addition, the other end of the transistor pair BT21 is connected between two adjacent battery cells BT09. The other end of the transistor pair BT21 on the most upstream side of the plurality of transistor pairs BT21 is connected to the positive electrode terminal of the battery cell BT09 on the most upstream side of the battery portion BT08. The other end of the transistor pair BT21 on the most downstream side of the plurality of transistor pairs BT21 is connected to the negative electrode terminal of the battery cell BT09 on the most downstream side of the battery portion BT08.

The switching circuit BT04 switches the connection destination of the transistor pair BT21 to one of the terminal A1 and the terminal A2 by turning on or off the transistors BT22 and BT23 in response to the control signal S1. Specifically, when the transistor BT22 is turned on, the transistor BT23 is turned off, so that the connection destination of the transistor pair BT21 is the terminal A1. On the other hand, when the transistor BT23 is turned on, the transistor BT22 is turned off, so that the connection destination of the transistor pair BT22 is the terminal A2. Which of the transistors BT22 and BT23 is turned on is determined by the control signal S1.

Two transistor pairs BT21 are used to connect the terminal pair BT01 and the discharge battery cell group. Specifically, the connection destinations of the two transistor pairs BT21 are determined on the basis of the control signal S1, and the discharge battery cell group and the terminal pair BT01 are connected. The connection destinations of the two transistor pairs BT21 are controlled by the control signal S1 so that one of the connection destinations is the terminal A1 and the other is the terminal A2.

The switching circuit BT05 includes a plurality of transistor pairs BT31, a bus BT34, and a bus BT35. The bus BT34 is connected to the terminal B1. The bus BT35 is connected to the terminal B2. One ends of the transistor pairs BT31 extend from a transistor BT32 and a transistor BT33. One end extending from the transistor BT32 is connected to the bus BT34. One end extending from the transistor BT33 is connected to the bus BT35. The other end of plurality of the transistor pair BT31 is connected between two adjacent battery cells BT09. The other end of the transistor pair BT31 on the most upstream side of the plurality of transistor pairs BT31 is connected to the positive electrode terminal of the battery cell BT09 on the most upstream side of the battery portion BT08. The other end of the transistor pair BT31 on the most downstream side of the plurality of transistor pairs BT31 is connected to the negative electrode terminal of the battery cell BT09 on the most downstream side of the battery portion BT08.

The switching circuit BT05 switches the connection destination of the transistor pair BT31 to one of the terminal B1 and the terminal B2 by turning on or off the transistors BT32 and BT33 in response to the control signal S2. Specifically, when the transistor BT32 is turned on, the transistor BT33 is turned off, so that the connection destination of the transistor pair BT31 is the terminal B1. On the other hand, when the transistor BT33 is turned on, the transistor BT32 is turned off, so that the connection destination of the transistor pair BT31 is the terminal B2. Which of the transistors BT32 and BT33 is turned on is determined by the control signal S2.

Two transistor pairs BT31 are used to connect the terminal pair BT02 and the charge battery cell group. Specifically, the connection destinations of the two transistor pairs BT31 are determined on the basis of the control signal S2, and the charge battery cell group and the terminal pair BT02 are connected. The connection destinations of the two transistor pairs BT31 are controlled by the control signal S2 so that one of the connection destinations is the terminal B1 and the other is the terminal B2.

The connection destinations of the two transistor pairs BT31 are determined by the polarities of the voltages applied to the terminal pair BT02. Specifically, in the case where voltages which make the terminal B1 a positive electrode and the terminal B2 a negative electrode are applied to the terminal pair BT02, the transistor pair BT31 on the upstream side is controlled by the control signal S2 so that the transistor BT32 is turned on and the transistor BT33 is turned off. In contrast, the transistor pair BT31 on the downstream side is controlled by the control signal S2 so that the transistor BT33 is turned on and the transistor BT32 is turned off. In the case where voltages which make the terminal B1 a negative electrode and the terminal B2 a positive electrode are applied to the terminal pair BT02, the transistor pair BT31 on the upstream side is controlled by the control signal S2 so that the transistor BT33 is turned on and the transistor BT32 is turned off In contrast, the transistor pair BT31 on the downstream side is controlled by the control signal S2 so that the transistor BT32 is turned on and the transistor BT33 is turned off. In this manner, terminals with the same polarity of the terminal pair BT02 and the charge battery cell group are connected to each other. In addition, the current which flows from the terminal pair BT02 is controlled to be supplied in a direction so as to charge the battery cell group.

The voltage transformation control circuit BT06 controls operation of the voltage transformer circuit BT07. The voltage transformation control circuit BT06 generates a voltage transformation signal S3 for controlling the operation of the voltage transformer circuit BT07 on the basis of the number of the battery cells BT09 included in the discharge battery cell group and the number of the battery cells BT09 included in the charge battery cell group and outputs the voltage transformation signal S3 to the voltage transformer circuit BT07.

In the case where the number of the battery cells BT09 included in the discharge battery cell group is larger than that included in the charge battery cell group, it is necessary to prevent a charging voltage which is too high from being applied to the charge battery cell group. Thus, the voltage transformation control circuit BT06 outputs the voltage transformation signal S3 for controlling the voltage transformer circuit BT07 so that a discharging voltage (Vdis) is lowered within a range where the charge battery cell group can be charged.

In the case where the number of the battery cells BT09 included in the discharge battery cell group is less than or equal to that included in the charge battery cell group, a voltage necessary for charging the charge battery cell group needs to be secured. Therefore, the voltage transformation control circuit BT06 outputs the voltage transformation signal S3 for controlling the voltage transformer circuit BT07 so that the discharging voltage (Vdis) is raised within a range where a charging voltage which is too high is not applied to the charge battery cell group.

The voltage value of the charging voltage which is too high is determined in the light of product specifications and the like of the battery cell BT09 used in the battery portion BT08. The voltage which is raised or lowered by the voltage transformer circuit BT07 is applied as a charging voltage (Vcha) to the terminal pair BT02.

Figure 26A:
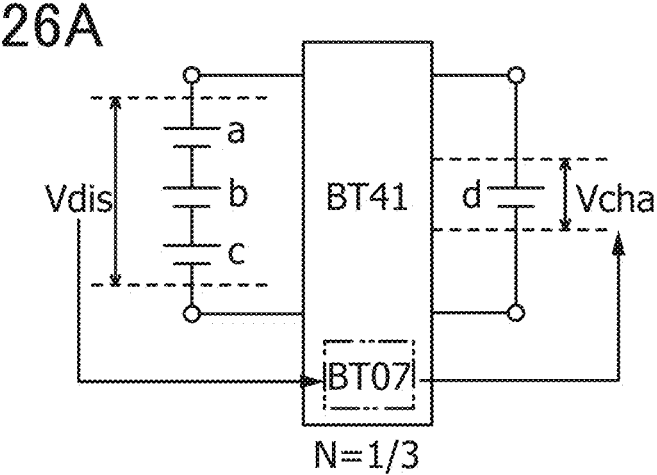
FIGS. 26A to 26C are each a conceptual diagram illustrating one embodiment of the present invention.
Figure 26B:
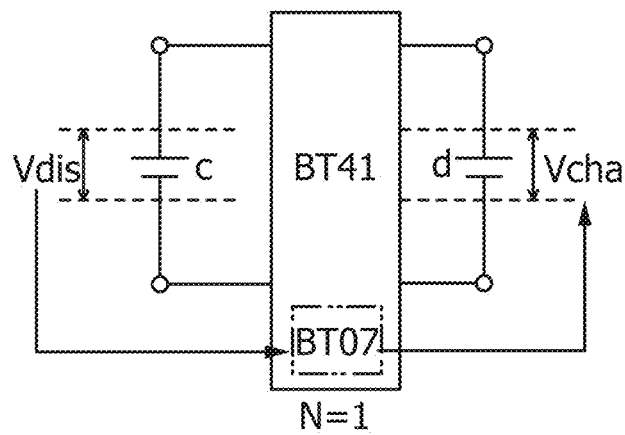
Figure 26C:
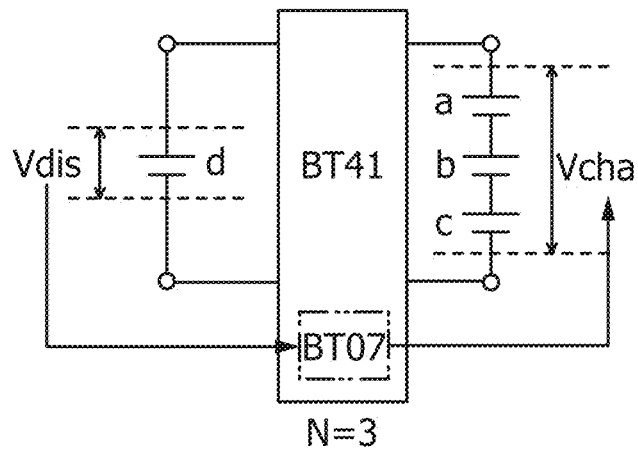

Here, operation examples of the voltage transformation control circuit BT06 in this embodiment are described with reference to FIGS. 26A to 26C. FIGS. 26A to 26C are conceptual diagrams for explaining the operation examples of the voltage transformation control circuits BT06 for the discharge battery cell groups and the charge battery cell groups described in FIGS. 23A to 23C. FIGS. 26A to 26C each illustrate a battery management unit BT41. The battery management unit BT41 includes the terminal pair BT01, the terminal pair BT02, the switching control circuit BT03, the switching circuit BT04, the switching circuit BT05, the voltage transformation control circuit BT06, and the voltage transformer circuit BT07.

In an example illustrated in FIG. 26A, the series of three high-voltage cells a to c and one low-voltage cell d are connected in series with reference to FIG. 21A. In that case, as described with reference to FIG. 21A, the switching control circuit BT03 selects the high-voltage cells a to c as the discharge battery cell group, and selects the low-voltage cell d as the charge battery cell group. The voltage transformation control circuit BT06 calculates a conversion ratio N for converting the discharging voltage (Vdis) to the charging voltage (Vcha) on the basis of the ratio of the number of the battery cells BT09 included in the charge battery cell group to the number of the battery cells BT09 included in the discharge battery cell group.

In the case where the number of the battery cells BT09 included in the discharge battery cell group is larger than that included in the charge battery cell group, when a discharging voltage is applied to the terminal pair BT02 without transforming the voltage, overvoltage may be applied to the battery cells BT09 included in the charge battery cell group through the terminal pair BT02. Thus, in the case of FIG. 26A, it is necessary that a charging voltage (Vcha) applied to the terminal pair BT02 be lowered than the discharging voltage. In addition, in order to charge the charge battery cell group, it is necessary that the charging voltage be higher than the total voltage of the battery cells BT09 included in the charge battery cell group. Thus, the transformation control circuit BT06 sets the conversion ratio N larger than the ratio of the number of the battery cells BT09 included in the charge battery cell group to the number of the battery cells BT09 included in the discharge battery cell group.

Thus, the voltage transformation control circuit BT06 preferably sets the conversion ratio N larger than the ratio of the number of the battery cells BT09 included in the charge battery cell group to the number of the battery cells BT09 included in the discharge battery cell group by about 1% to 10%. Here, the charging voltage is made larger than the voltage of the charge battery cell group, but the charging voltage is equal to the voltage of the charge battery cell group in reality. Note that the voltage transformation control circuit BT06 feeds a current for charging the charge battery cell group in accordance with the conversion ratio N in order to make the voltage of the charge battery cell group equal to the charging voltage. The value of the current is set by the voltage transformation control circuit BT06.

In the example illustrated in FIG. 26A, since the number of the battery cells BT09 included in the discharge battery cell group is three and the number of the battery cells BT09 included in the charge battery cell group is one, the voltage transformation control circuit BT06 calculates a value which is slightly larger than 1/3 as the conversion ratio N. Then, the voltage transformation control circuit BT06 outputs the voltage transformation signal S3, which lowers the discharging voltage in accordance with the conversion ratio N and converts the voltage into a charging voltage, to the voltage transformer circuit BT07. The voltage transformer circuit BT07 applies the charging voltage which is transformed in response to the voltage transformation signal S3 to the terminal pair BT02. Then, the battery cells BT09 included in the charge battery cell group are charged with the charging voltage applied to the terminal pair BT02.

In each of examples illustrated in FIGS. 26B and 26C, the conversion ratio N is calculated in a manner similar to that of FIG. 26A. In each of the examples illustrated in FIGS. 26B and 26C, since the number of the battery cells BT09 included in the discharge battery cell group is less than or equal to the number of the battery cells BT09 included in the charge battery cell group, the conversion ratio N is 1 or more. Therefore, in that case, the voltage transformation control circuit BT06 outputs the voltage transformation signal S3 for raising the discharging voltage and converting the voltage into the charging voltage.

The voltage transformer circuit BT07 converts the discharging voltage applied to the terminal pair BT01 into a charging voltage on the basis of the voltage transformation signal S3. The voltage transformer circuit BT07 applies the converted charging voltage to the terminal pair BT02. Here, the voltage transformer circuit BT07 electrically insulates the terminal pair BT01 from the terminal pair BT02. Accordingly, the voltage transformer circuit BT07 prevents a short-circuit due to a difference between the absolute voltage of the negative electrode terminal of the battery cell BT09 on the most downstream side of the discharge battery cell group and the absolute voltage of the negative electrode terminal of the battery cell BT09 on the most downstream side of the charge battery cell group. Furthermore, the voltage transformer circuit BT07 converts the discharging voltage, which is the total voltage of the discharge battery cell group, into the charging voltage on the basis of the voltage transformation signal S3 as described above.

An insulated direct current (DC)-DC converter or the like can be used in the voltage transformer circuit BT07. In that case, the voltage transformation control circuit BT06 controls the charging voltage converted by the voltage transformer circuit BT07 by outputting a signal for controlling the on/off ratio (the duty ratio) of the insulated DC-DC converter as the voltage transformation signal S3.

Examples of the insulated DC-DC converter include a flyback converter, a forward converter, a ringing choke converter (RCC), a push-pull converter, a half-bridge converter, and a full-bridge converter, and a suitable converter is selected in accordance with the value of the intended output voltage.

Figure 27:
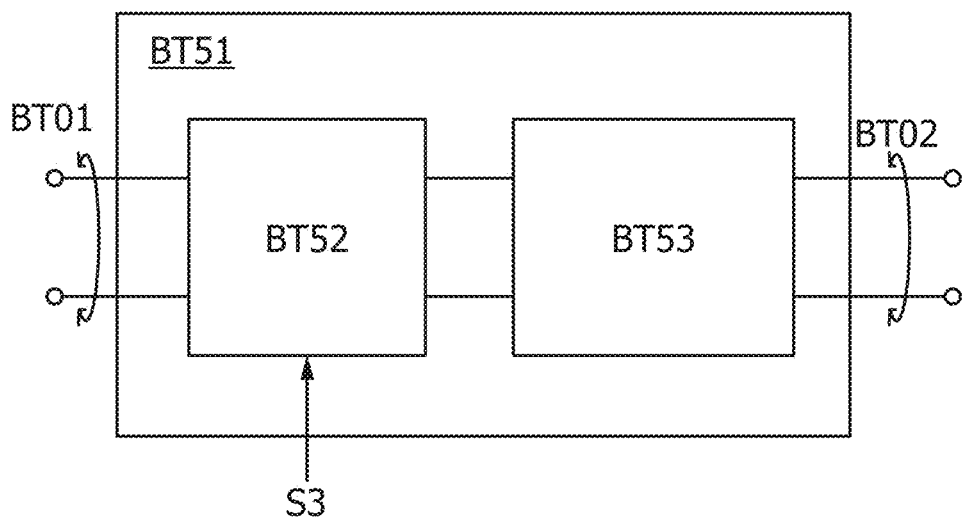
FIG. 27 is a block diagram illustrating one embodiment of the present invention.

The structure of the voltage transformer circuit BT07 including the insulated DC-DC converter is illustrated in FIG. 27. An insulated DC-DC converter BT51 includes a switch portion BT52 and a transformer BT53. The switch portion BT52 is a switch for switching the on/off state of the operation of the insulated DC-DC converter, and a metal oxide semiconductor field-effect transistor (MOSFET), a bipolar transistor, or the like is used as the switch portion BT52. The switch portion BT52 periodically turns on and off the insulated DC-DC converter BT51 in accordance with the voltage transformation signal S3 controlling the on/off ratio which is output from the voltage transformation control circuit BT06. The switch portion BT52 can have any of various structures in accordance with the type of the insulated DC-DC converter which is used. The transformer BT53 converts the discharging voltage applied from the terminal pair BT01 into the charging voltage. In detail, the transformer BT53 operates in conjunction with the on/off state of the switch portion BT52 and converts the discharging voltage into the charging voltage in accordance with the on/off ratio. As the time during which the switch portion BT52 is on becomes longer in its switching period, the charging voltage is increased. On the other hand, as the time during which the switch portion BT52 is on becomes shorter in its switching period, the charging voltage is decreased. In the case where the insulated DC-DC converter is used, the terminal pair BT01 and the terminal pair BT02 can be insulated from each other inside the transformer BT53.

Figure 28:
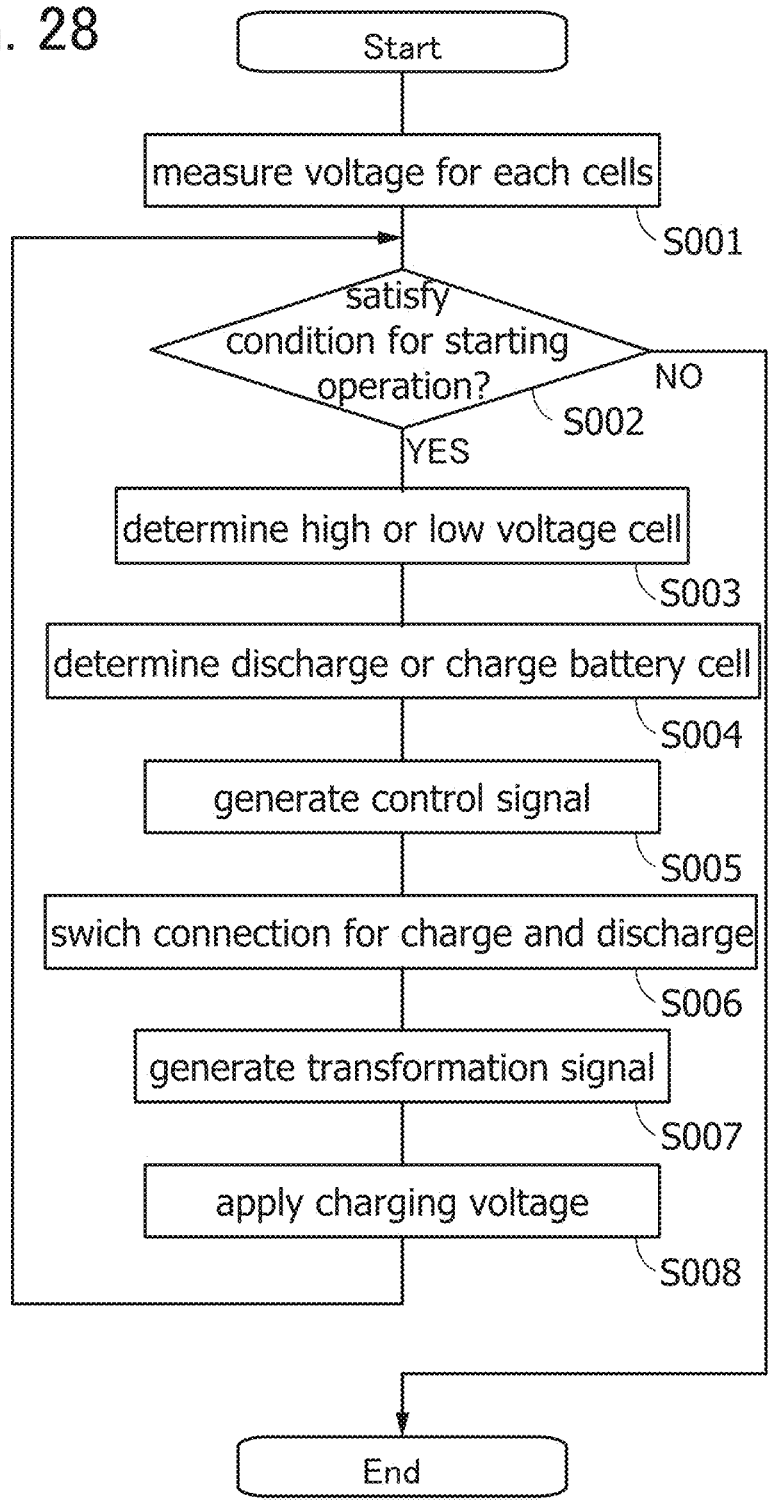
FIG. 28 is a flow chart showing one embodiment of the present invention.

A flow of operations of the power storage device BT00 in this embodiment is described with reference to FIG. 28. FIG. 28 is a flow chart illustrating the flow of the operations of the power storage device BT00.

First, the power storage device BT00 obtains a voltage measured for each of the plurality of battery cells BT09 (step S001). Then, the power storage device BT00 determines whether or not the condition for starting the operation of reducing variations in voltage of the plurality of battery cells BT09 is satisfied (step S002). An example of the starting condition can be that the difference between the maximum value and the minimum value of the voltage measured for each of the plurality of the battery cells BT09 is higher than or equal to the predetermined threshold value. In the case where the starting condition is not satisfied (step S002: NO), the power storage device BT00 does not perform the following operation because voltages of the battery cells BT09 are well balanced. In contrast, in the case where the condition is satisfied (step S002: YES), the power storage device BT00 performs the operation of reducing variations in the voltage of the battery cells BT09. In this operation, the power storage device BT00 determines whether each battery cell BT09 is a high voltage cell or a low voltage cell on the basis of the measured voltage of each cell (step S003). Then, the power storage device BT00 determines a discharge battery cell group and a charge battery cell group on the basis of the determination result (step S004). In addition, the power storage device BT00 generates the control signal S1 for setting the determined discharge battery cell group as the connection destination of the terminal pair BT01, and the control signal S2 for setting the determined charge battery cell group as the connection determination of the terminal pair BT02 (step S005). The power storage device BT00 outputs the generated control signals S1 and S2 to the switching circuit BT04 and the switching circuit BT05, respectively. Then, the switching circuit BT04 connects the terminal pair BT01 and the discharge battery cell group, and the switching circuit BT05 connects the terminal pair BT02 and the discharge battery cell group (step S006). The power storage device BT00 generates the voltage transformation signal S3 based on the number of the battery cells BT09 included in the discharge battery cell group and the number of the battery cells BT09 included in the charge battery cell group (step S007). Then, the power storage device BT00 converts the discharging voltage applied to the terminal pair BT01 into a charging voltage based on the voltage transformation signal S3 and applies the charging voltage to the terminal pair BT02 (step S008). In this way, electric charge of the discharge battery cell group is transferred to the charge battery cell group.

Although the plurality of steps are shown in order in the flow chart of FIG. 28, the order of performing the steps is not limited to the order.

According to the above embodiment, when an electric charge is transferred from the discharge battery cell group to the charge battery cell group, a structure where an electric charge from the discharge battery cell group is temporarily stored, and the stored electric charge is sent to the charge battery cell group is unnecessary, unlike in the a capacitor type circuit. Accordingly, the charge transfer efficiency per unit time can be increased. In addition, the switching circuit BT04 and the switching circuit BT05 determine which battery cell in the discharge battery cell group and the charge battery cell group to be connected to the voltage transformer circuit.

Furthermore, the voltage transformer circuit BT07 converts the discharging voltage applied to the terminal pair BT01 into the charging voltage based on the number of the battery cells BT09 included in the discharge battery cell group and the number of the battery cells BT09 included in the charge battery cell group, and applies the charging voltage to the terminal pair BT02. Thus, even when any battery cell BT09 is selected as the discharge battery cell group and the charge battery cell group, an electric charge can be transferred without any problems.

Furthermore, the use of OS transistors as the transistor BT10 and the transistor BT13 can reduce the amount of electric charge leaking from the battery cells BT09 which do not belong to the charge battery cell group or the discharge battery cell group. Accordingly, a decrease in capacity of the battery cells BT09 which do not contribute to charging or discharging can be suppressed. In addition, the variation in characteristics of the OS transistor due to heat is smaller than that of an Si transistor. Accordingly, even when the temperature of the battery cells BT09 is increased, an operation such as turning on or off the transistors in response to the control signals S1 and S2 can be performed normally.

This embodiment can be implemented in appropriate combination with any of the other embodiments and example.

Embodiment 5

<<Other Structure Examples of Secondary Battery>>

Figure 29A:
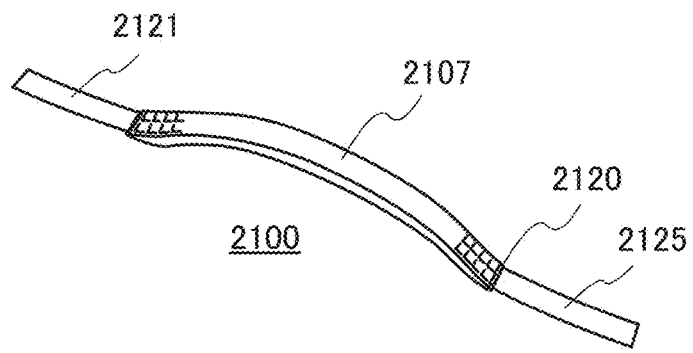
FIGS. 29A to 29C are a perspective view, a top view, and a cross-sectional view illustrating a structure example of a secondary battery.
Figure 29B:
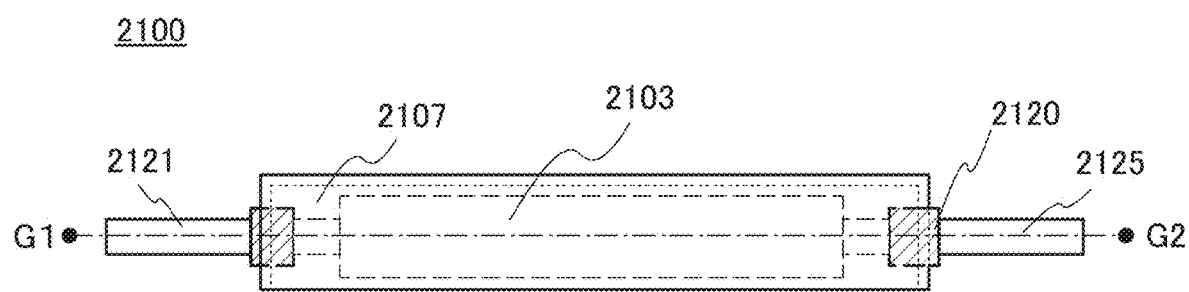
Figure 29C:
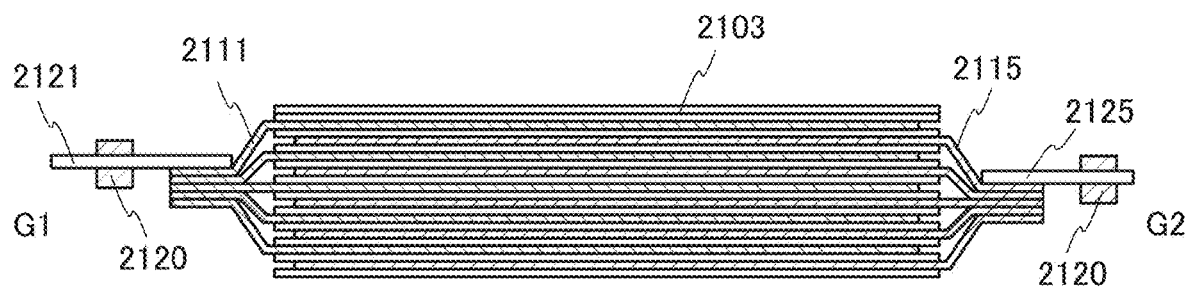

FIGS. 29A to 29C illustrate a secondary battery 2100 of one embodiment of the present invention. FIG. 29A is a perspective view of the secondary battery 2100, and FIG. 29B is a top view thereof. FIG. 29C is a cross-sectional view taken along the dashed-dotted line G1-G2 in FIG. 29B.

Three sides of an exterior body 2107 in the secondary battery 2100 are sealed, as illustrated in FIGS. 29A to 29C. Furthermore, the secondary battery 2100 includes a positive electrode lead 2121, a negative electrode lead 2125, a positive electrode 2111, a negative electrode 2115, and a separator 2103. In FIG. 29C, a positive electrode 2111, a negative electrode 2115, a separator 2103, a positive electrode lead 2121, a negative electrode lead 2125, and a sealing layer 2120 are selectively illustrated for the sake of clarity. Note that some of the electrodes may include two or more current collectors and the current collectors may be in contact with each other on surfaces where active materials are not formed.

Here, some steps in the fabricating method of the secondary battery 2100 illustrated in FIGS. 30A to 30D will be described with reference to FIGS. 29A to 29C.

First, the negative electrode 2115 is positioned over the separator 2103 (FIG. 30A) such that a negative electrode active material layer in the negative electrode 2115 overlaps with the separator 2103.

Then, the separator 2103 is folded such that part of the separator 2103 is positioned over the negative electrode 2115. Next, the positive electrode 2111 is positioned over the separator 2103 (FIG. 30B) such that a positive electrode active material layer included in the positive electrode 2111 overlaps with the separator 2103 and the negative electrode active material layer. In the case where an electrode in which an active material layer is formed on one surface of a current collector is used, the positive electrode active material layer of the positive electrode 2111 and the negative electrode active material layer of the negative electrode 2115 are positioned so as to face each other with the separator 2103 therebetween.

Figure 30A:
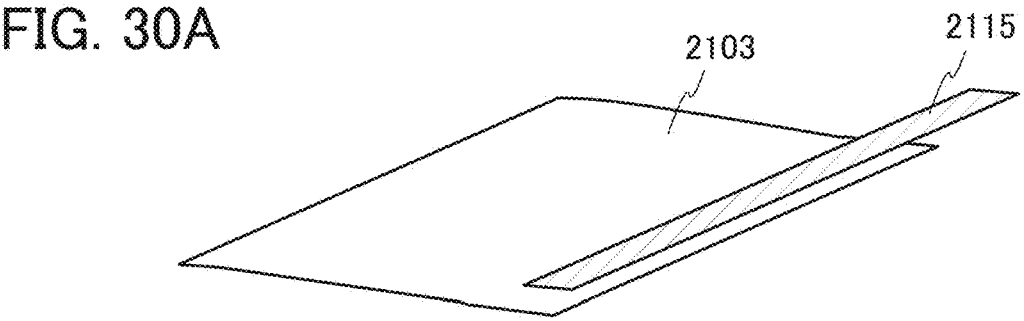
FIGS. 30A to 30D illustrate an example of a manufacturing method of a secondary battery.
Figure 30B:
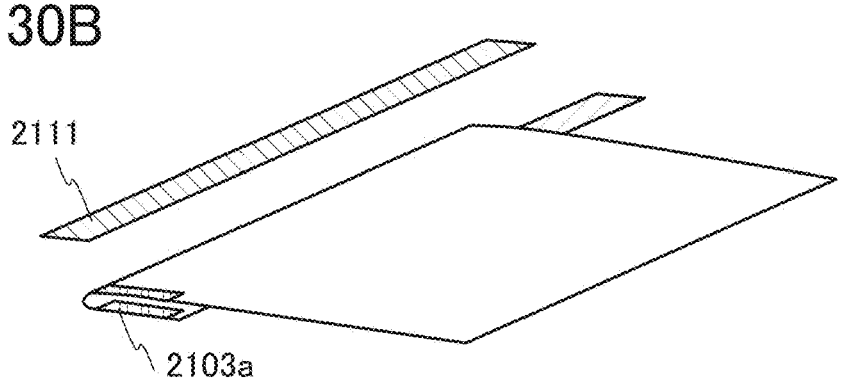

In the case where the separator 2103 is formed using a material that can be thermally welded, such as polypropylene, a region where the separator 2103 overlap with itself is thermally welded and then another electrode is positioned so as to overlap with the separator 2103, whereby the slippage of the electrode in the manufacturing process can be minimized. Specifically, a region which does not overlap with the negative electrode 2115 and the positive electrode 2111 and in which the separator 2103 overlaps with itself, e.g., a region 2103*a* in FIG. 30B, is preferably thermally welded.

Figure 30C:
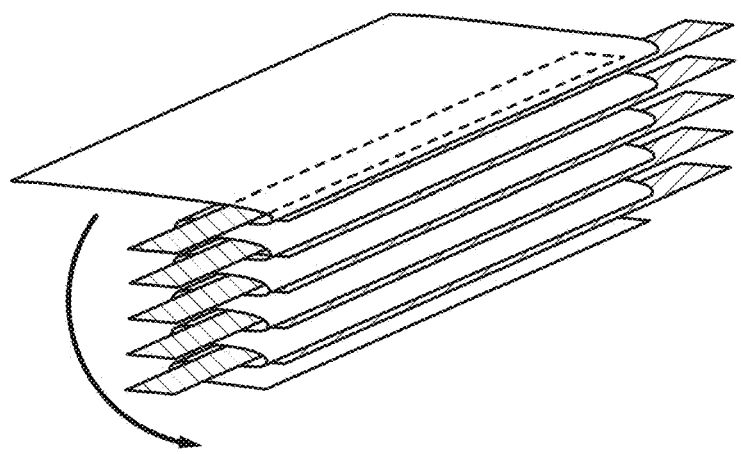

By repeating the above steps, the positive electrode 2111 and the negative electrode 2115 can overlap with each other with the separator 2103 therebetween as illustrated in FIG. 30C.

Note that a plurality of negative electrodes 2115 and a plurality of positive electrodes 2111 may be alternately placed to be sandwiched between portions of the separator 2103 that is repeatedly folded in advance.

Next, as illustrated in FIG. 30C, the plurality of positive electrodes 2111 and the plurality of negative electrodes 2115 are covered with the separator 2103.

Figure 30D:
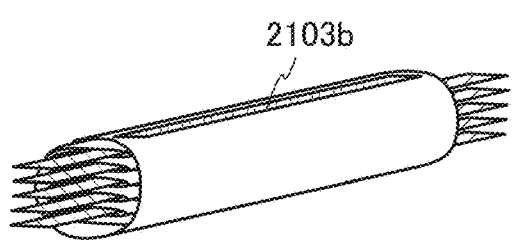

Then, as illustrated in FIG. 30D, a region where the separator 2103 overlaps with itself, e.g., a region 2103*b* in FIG. 30D, is thermally welded, whereby the plurality of positive electrodes 2111 and the plurality of negative electrodes 2115 are covered with and bundled in the separator 2103.

Note that the plurality of positive electrodes 2111, the plurality of negative electrodes 2115, and the separator 2103 may be bundled using a binding material.

Since the positive electrodes 2111 and the negative electrodes 2115 are stacked through the above steps, one separator 2103 has a region sandwiched between the plurality of positive electrodes 2111 and the plurality of negative electrodes 2115 and a region positioned so as to cover the plurality of positive electrodes 2111 and the plurality of negative electrodes 2115.

In other words, the separator 2103 included in the secondary battery 2100 in FIGS. 29A to 29C is a single separator which is partly folded. Between the folded parts of the separator 2103, the positive electrodes 2111 and the negative electrodes 2115 are sandwiched.

Figure 31A:
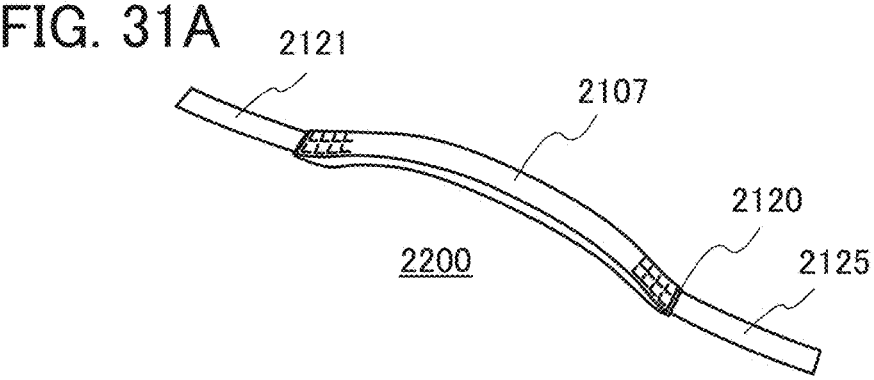
Figure 31B:
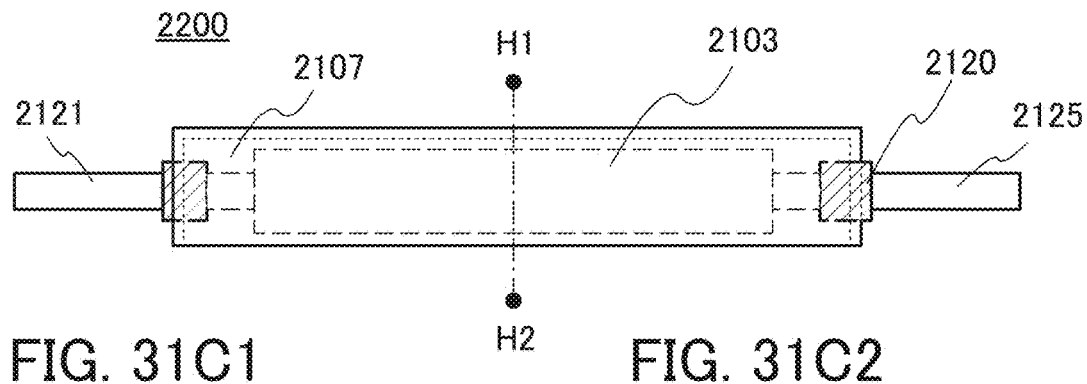
Figure 31B:
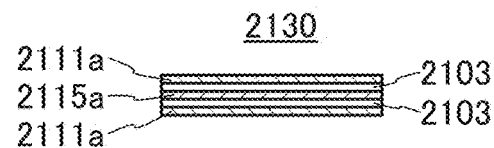
Figure 31B:
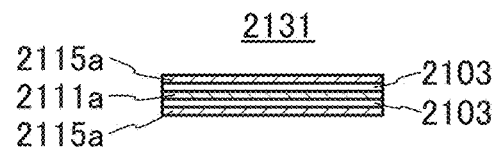
Figure 31D:
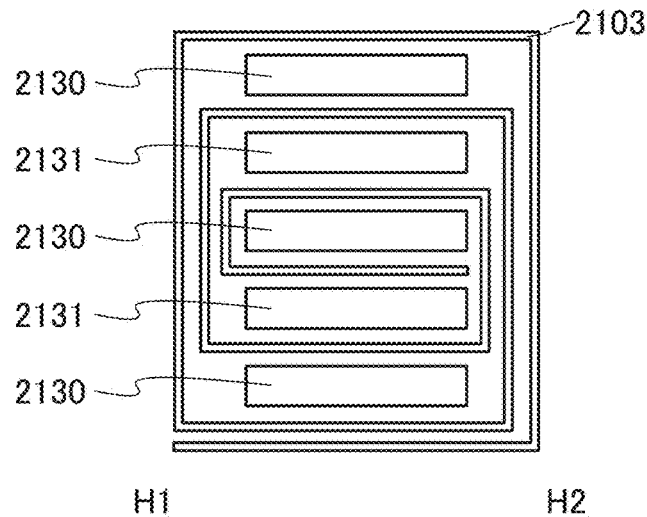

FIGS. 31A, 31B, 31C1, 31C2, and 31D illustrate a secondary battery 2200, which is different from the secondary battery illustrated in FIGS. 29A to 29C. FIG. 31A is a perspective view of the secondary battery 2200, and FIG. 31B is a top view thereof. FIG. 31C1 is a cross-sectional view of a first electrode assembly 2130, and FIG. 31C2 is a cross-sectional view of a second electrode assembly 2131. FIG. 31D is a cross-sectional view taken along dashed-dotted line H1-H2 in FIG. 31B. In FIG. 31D, the first electrode assembly 2130, the second electrode assembly 2131, and the separator 2103 are selectively illustrated for clarity. Note that some of the electrodes may include two or more current collectors and the current collectors may be in contact with each other on surfaces where active materials are not formed.

The secondary battery 2200 illustrated in FIGS. 31A, 31B, 31C1, 31C2, and 31D is different from the secondary battery 2100 illustrated in FIGS. 29A to 29C in the positions of the positive electrodes 2111*a*, the negative electrodes 2115*a*, and the separator 2103.

As illustrated in FIG. 31D, the secondary battery 2200 includes a plurality of first electrode assemblies 2130 and a plurality of second electrode assemblies 2131.

As illustrated in FIG. 31C1, in each of the first electrode assemblies 2130, a positive electrode 2111*a* including positive electrode active material layers on both surfaces of a positive electrode current collector, the separator 2103, a negative electrode 2115*a* including negative electrode active material layers on both surfaces of a negative electrode current collector, the separator 2103, and the positive electrode 2111*a* including the positive electrode active material layers on both surfaces of the positive electrode current collector are stacked in this order. As illustrated in FIG. 31C2, in each of the second electrode assemblies 2131, the negative electrode 2115*a* including the negative electrode active material layers on both surfaces of the negative electrode current collector, the separator 2103, the positive electrode 2111*a* including the positive electrode active material layers on both surfaces of the positive electrode current collector, the separator 2103, and the negative electrode 2115*a* including the negative electrode active material layers on both surfaces of the negative electrode current collector are stacked in this order.

As illustrated in FIG. 31D, the plurality of first electrode assemblies 2130 and the plurality of second electrode assemblies 2131 are covered with the wound separator 2103.

Here, some steps in a fabricating method of the secondary battery 2200 illustrated in FIGS. 31A, 31B, 31C1, 31C2, and 31D will be described with reference to FIGS. 32A to 32D.

Figure 32A:
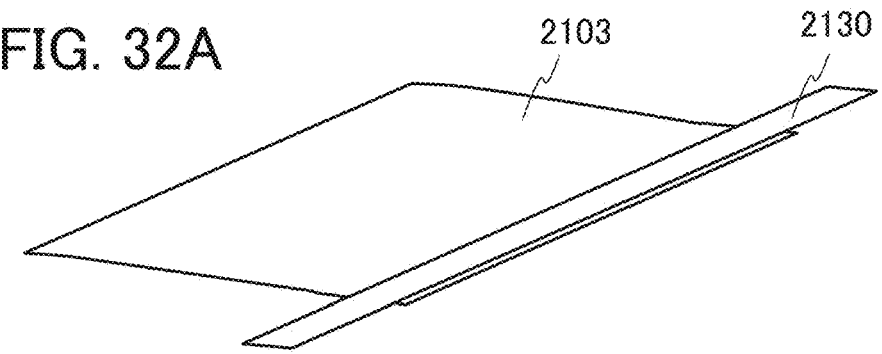
FIGS. 32A to 32D illustrate an example of a manufacturing method of a secondary battery.

First, the first electrode assembly 2130 is positioned over the separator 2103 (FIG. 32A).

Figure 32B:
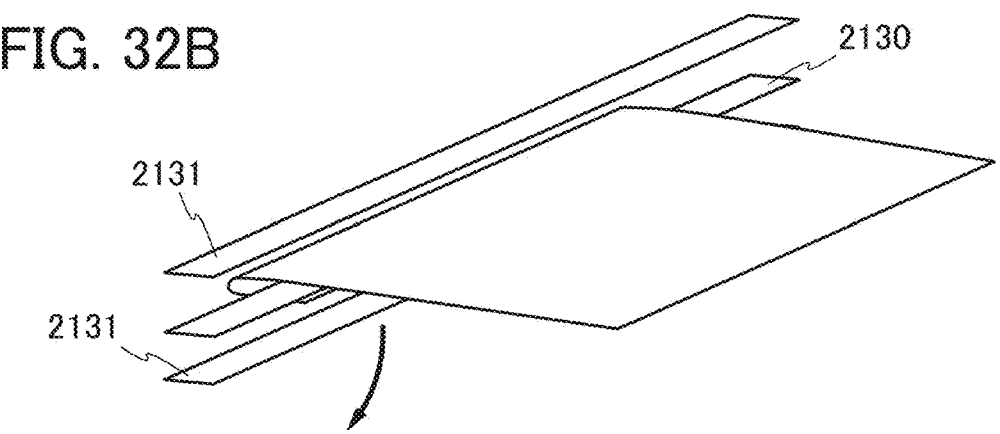

Then, the separator 2103 is folded such that part of the separator 2103 is positioned over the first electrode assembly 2130. Next, two second electrode assemblies 2131 are positioned over and under the first electrode assembly 2130 with the separator 2103 therebetween (FIG. 32B).

Figure 32C:
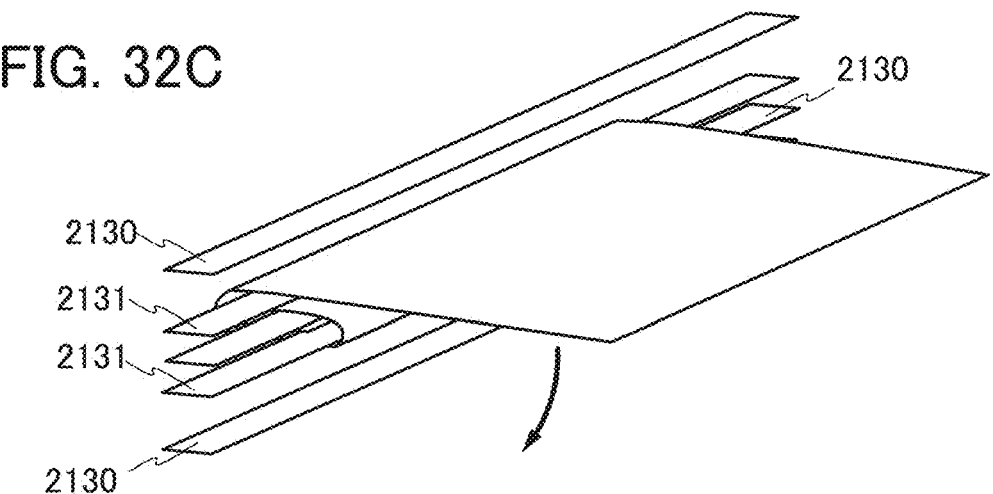

Then, the separator 2103 is wound so as to cover the two second electrode assemblies 2131. Next, two first electrode assemblies 2130 are positioned over and under the two second electrode assemblies 2131 with the separator 2103 therebetween (FIG. 32C).

Figure 32D:
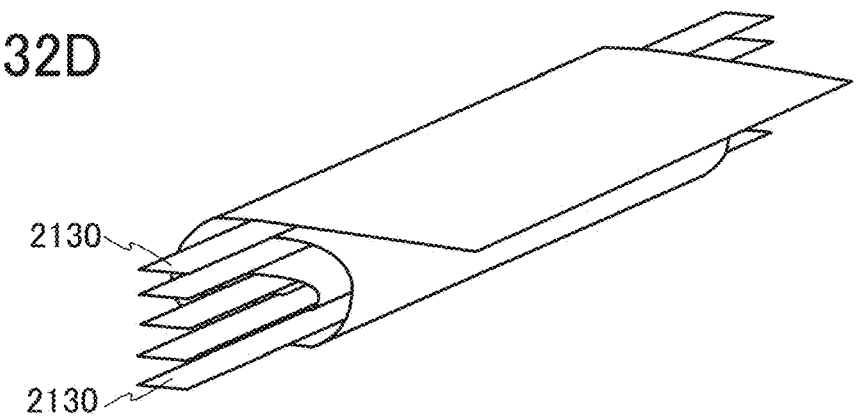

Then, the separator 2103 is wound so as to cover the two first electrode assemblies 2130 (FIG. 32D).

Since the plurality of first electrode assemblies 2130 and the plurality of second electrode assemblies 2131 are stacked through the above steps, the electrode assemblies are positioned between portions of the separator 2103 that is spirally wound.

It is preferable that the positive electrode 2111a of the first electrode assembly 2130 that is positioned on the outermost side include no positive electrode active material layer on the outer side.

In the example illustrated in FIGS. 31C1 and 31C2, the electrode assembly includes three electrodes and two separators; however, one embodiment of the present invention is not limited to this example. The electrode assembly may include four or more electrodes and three or more separators. As the number of electrodes is increased, the capacity of the secondary battery 2200 can be further improved. Note that the electrode assembly may include two electrodes and one separator. In the case where the number of electrodes is small, the secondary battery 2200 can have higher resistance to bending. In the example illustrated in FIG. 31D, the secondary battery 2200 includes three first electrode assemblies 2130 and two second electrode assemblies 2131; however, one embodiment of the present invention is not limited to this example. The storage battery 2200 may include more electrode assemblies. As the number of electrode assemblies is increased, the capacity of the secondary battery 2200 can be further improved. The secondary battery 2200 may include a smaller number of electrode assemblies. In the case where the number of electrode assemblies is small, the secondary battery 2200 can have higher resistance to bending.

The description of FIGS. 29A to 29C can be referred to for structures other than the positions of the positive electrodes 2111, the negative electrodes 2115, and the separator 2103 of the secondary battery 2200.

This embodiment can be implemented in appropriate combinations with any of the other embodiments.

EXAMPLE 1

In this example, the lithium-containing complex phosphate manufactured according to one embodiment of the present invention by the method described in Embodiment 1 will be described.

First, $LiOH \cdot H_2O$, $FeCl_2 \cdot 4H_2O$, and $NH_4H_2PO_4$ were individually weighed so that the molar ratio of Li:Fe:P was 2:1:1. Specifically, $LiOH \cdot H_2O$, $FeCl_2 \cdot 4H_2O$, and $NH_4H_2PO_4$ were individually weighed to be 1.6784 g, 3.9758 g, and 2.3014 g, respectively.

Subsequently, $LiOH \cdot H_2O$, $FeCl_2 \cdot 4H_2O$, and $NH_4H_2PO_4$ were individually dissolved in 30 ml of pure water which had been subjected to nitrogen bubbling for 30 minutes, so that a solution containing Li, a solution containing P, and a solution containing Fe were formed.

The solution containing Li and the solution containing P were mixed while being stirred in an air atmosphere, so that a mixed solution C was formed.

Subsequently, the solution containing Fe was added dropwise little by little and 10 ml of pure water which had been subjected to nitrogen bubbling for 30 minutes was added to the mixed solution C while the mixed solution C was stirred in an air atmosphere, so that a mixed solution D was formed.

Subsequently, the mixed solution D was put into an autoclave including an inner cylinder made of fluororesin and the mixed solution D was heated at 150° C. for 19 hours. During heating, the pressure inside the inner cylinder was in the range of 0.2 MPa to 0.4 MPa. After the heat treatment was performed, the inner cylinder was cooled, the synthetic material in the inner cylinder was filtered, and the residue was washed with water. For the autoclave, a mini reactor MS200-C manufactured by OM labotech Corp. was used.

Subsequently, the obtained substance was dried in a vacuum atmosphere at 60° C. for two hours, so that a synthetic material B was obtained.

Figure 33:
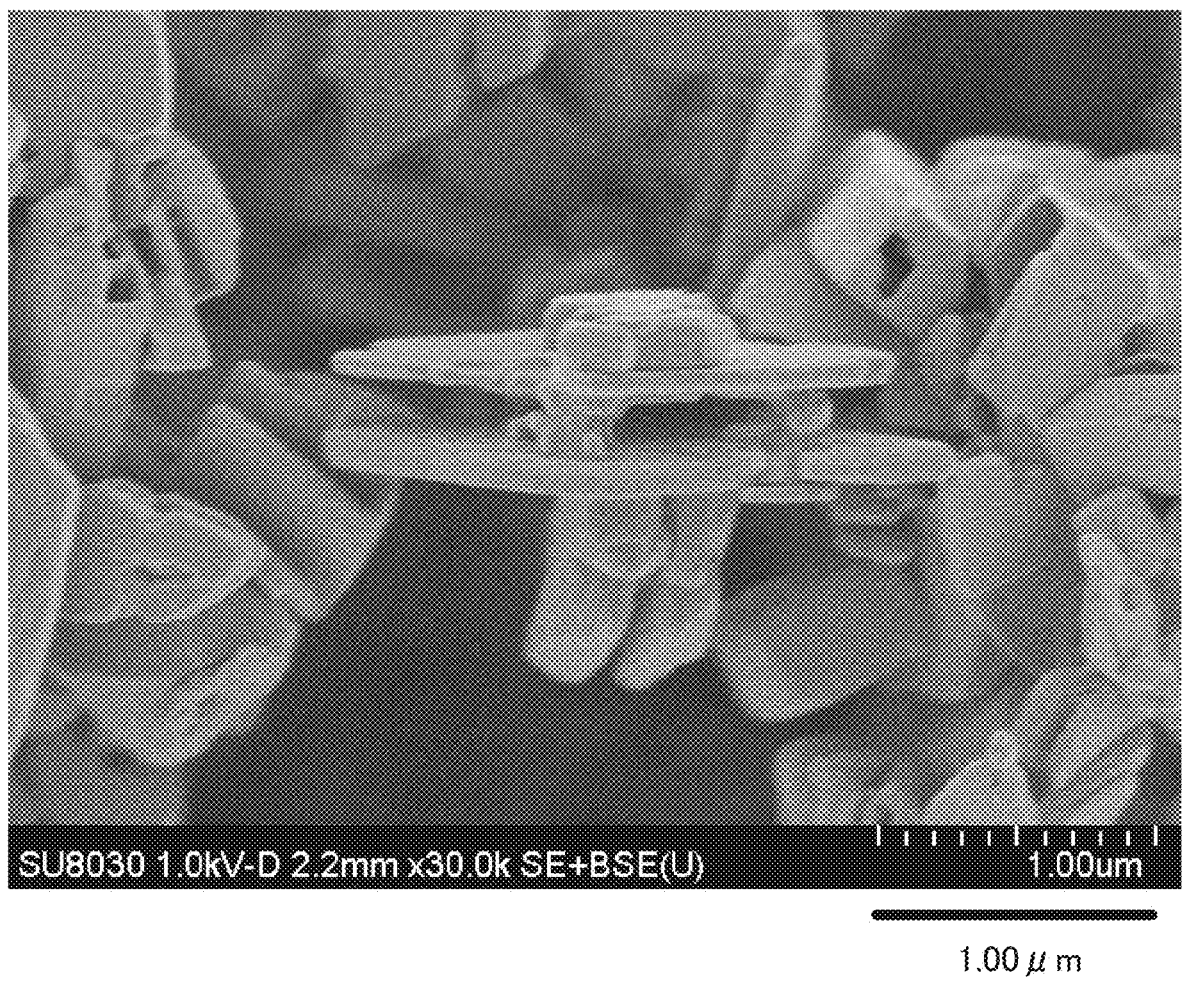
FIG. 33 is a SEM image of a lithium-containing complex phosphate.
Figure 34A:
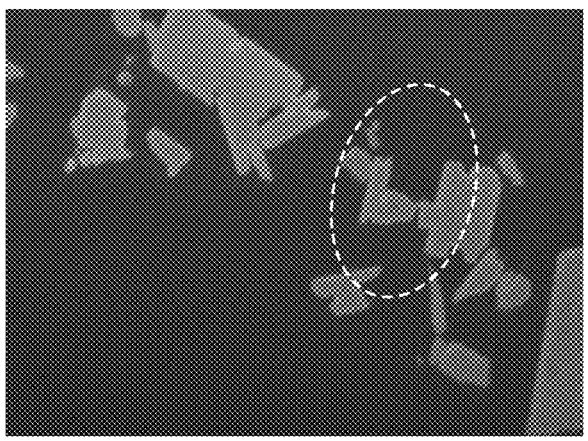
FIGS. 34A to 34F are SEM images of a lithium-containing complex phosphate.
Figure 34D:
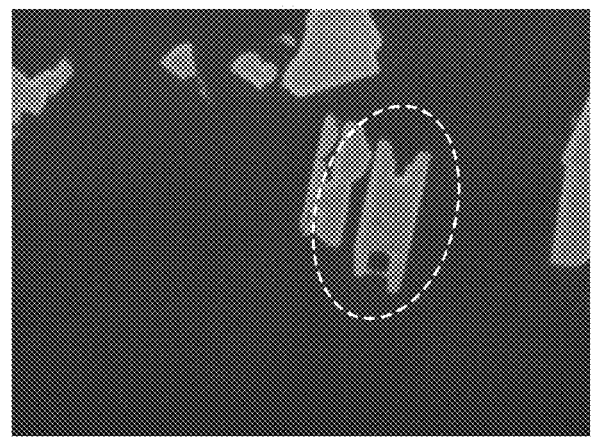
Figure 34B:
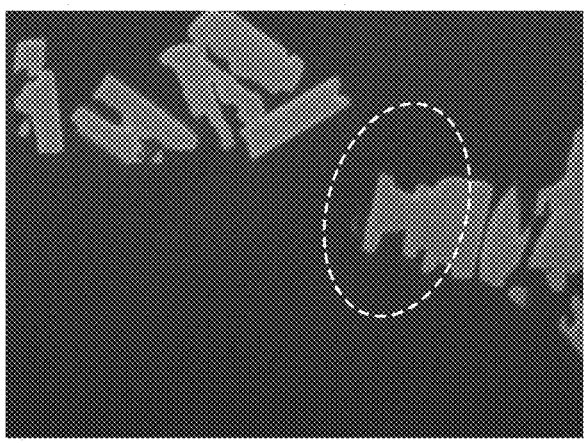
Figure 34E:
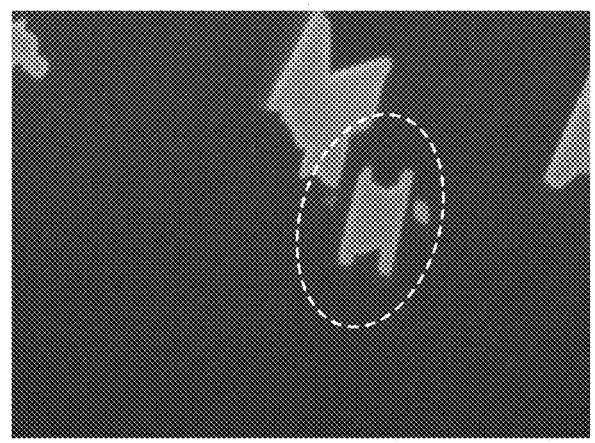
Figure 34C:
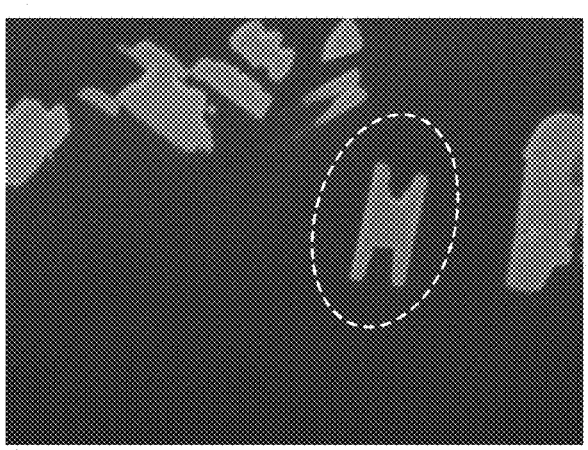
Figure 34F:
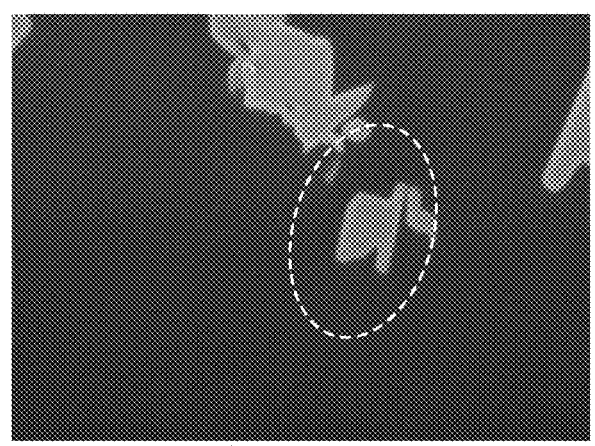

Subsequently, the synthetic material B was observed with a scanning electron microscope (SEM). FIG. 33 shows a SEM image. Two plate-like components included in the lithium-containing complex phosphate, a prismatic component provided between the two plate-like components, and a space between the two plate-like components can be observed. Note that the SEM observation was performed using scanning electron microscope SU8030 produced by Hitachi High-Technologies Corporation at a magnification of 30,000 times.

Subsequently, the synthetic material B was subjected to cross-section processing by focused ion beam (FIB) and the cross sections thereof were observed with SEM. FIGS. 34A to 34F show SEM images. Repeating the cross-section processing and the SEM observation enables obtainment of three-dimensional information on the component. This observation method is called "slice and view". FIGS. 34A to 34F are images obtained by "slice and view" and particles illustrated with the dotted lines in FIGS. 34A to 34F show the same particle. Two plate-like components included in the lithium-containing complex phosphate, a prismatic component provided between the two plate-like components, and a space between the two plate-like components can be observed. Note that for the FIB processing, Helios Nanolab 650 produced by FEI Company was used. For the SEM observation, Helios Nanolab 650 produced by FEI Company was used.

Figure 35:
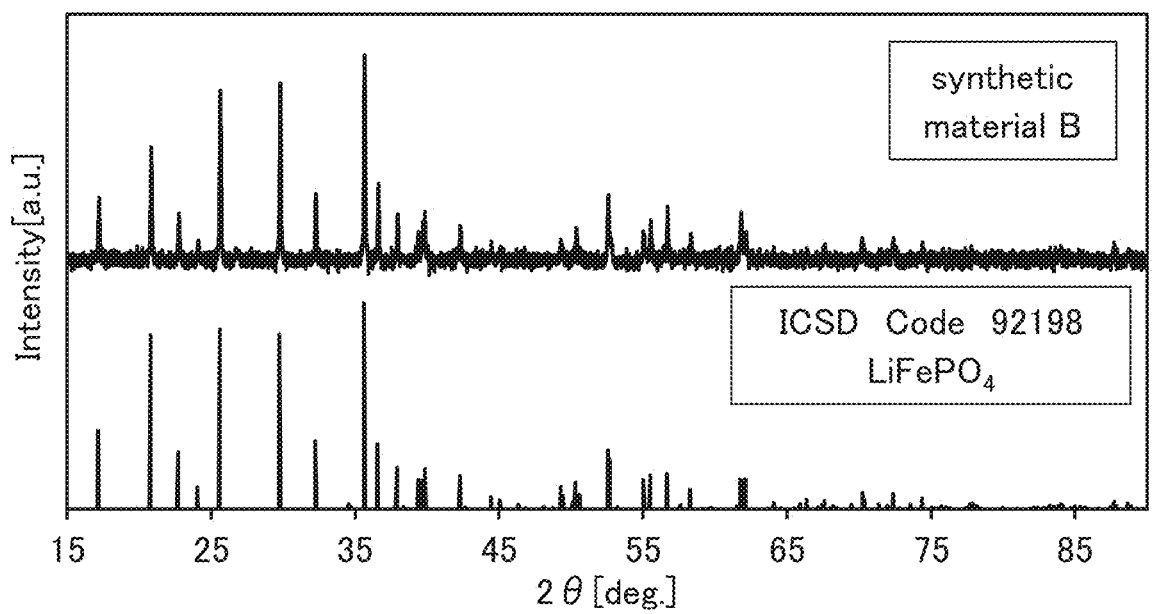
FIG. 35 shows an XRD spectrum of a lithium-containing complex phosphate.

Subsequently, X-ray diffraction (XRD) measurement of the synthetic material B was performed. FIG. 35 shows XRD spectra. In FIG. 35, the horizontal axis represents the diffraction angle $2\theta$ [deg.] and the vertical axis represents the X-ray diffraction intensity (arbitrary unit). The upper half of FIG. 35 shows the XRD spectrum of the synthetic material B and the lower half shows that of $LiFePO_4$ (ICSD Code 92198) of the Inorganic Crystal Structure Database (ICSD). Since peak positions are substantially the same, the synthetic material B can be identified as a crystal of lithium iron phosphate of olivine structure. Note that for the XRD measurement, an X-ray diffractometer D8 ADVANCE manufactured by Bruker AXS was used and CuKα rays with a wavelength of 0.154178 nm were used as the X-ray source.

Figure 36:
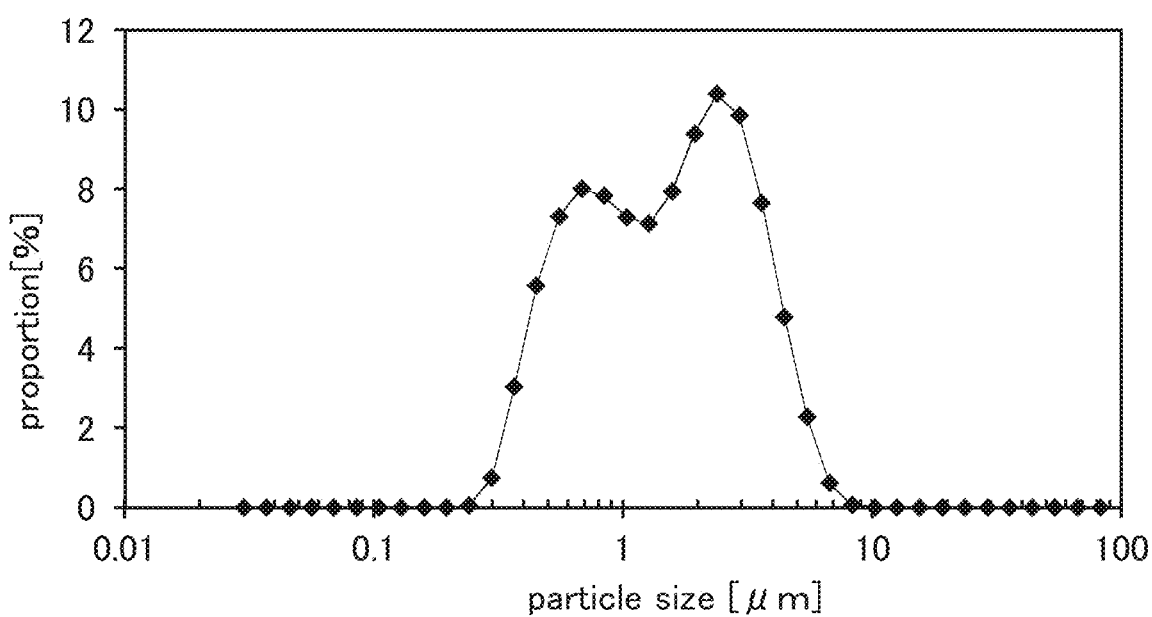
FIG. 36 shows a histogram of particle size of a lithium-containing complex phosphate.

Subsequently, particle size measurement of the synthetic material B was performed. FIG. 36 shows a histogram of particle size. In FIG. 36, the horizontal axis represents the particle size [μm] and the vertical axis represents the proportion of particles with respect to volume [%]. It can be considered that small particle size distribution represents primary particles and large particle size distribution represents aggregate particles (secondary particles). The peak of the primary particles was 0.68 μm. Note that for the measurement of particle size, a laser diffraction particle size analyzer SALD-2200 manufactured by Shimadzu Corporation was used and measurement was performed in the range of 0.03 μm to 1000 μm in particle size at 51 intervals divided by logarithmic scale.

In the above manner, the lithium-containing complex phosphate according to one embodiment of the present invention was synthesized and the particle shape thereof and the like were observed in this example.

This application is based on Japanese Patent Application serial no. 2016-040959 filed with Japan Patent Office on Mar. 3, 2016, the entire contents of which are hereby incorporated by reference.

What is claimed is:

1. A positive electrode active material of a lithium-ion battery, comprising:
    a first component;
    a second component substantially parallel to the first component;
    a third component between the first component and the second component; and
    a space between the first component and the second component,
    wherein each of the first component, the second component, and the third component comprises lithium, a metal, phosphorous and oxygen.

2. A positive electrode active material of a lithium-ion secondary battery, comprising:
    a first component;
    a second component substantially parallel to the first component;
    a third component between the first component and the second component; and
    a space between the first component and the second component,
    wherein each of the first and second components has a plate-like shape,
    wherein a top surface of the third component is in contact with a top surface of the second component and in contact with a bottom surface of the first component,
    wherein the first component comprises a first surface, a second surface, and a third surface,
    wherein each of the first and second surfaces has a larger area than the third surface, and
    wherein the third surface is a side surface.

3. The positive electrode active material of a lithium-ion secondary battery according to claim 2,
    wherein the first surface and the second surface do not share a side.

4. The positive electrode active material of a lithium-ion secondary battery according to claim 2,
    wherein the first surface is not adjacent to the second surface.

5. The positive electrode active material of a lithium-ion secondary battery according to claim 2,
    wherein the first surface has a substantially n-gon shape (n is a natural number of 5 or more), and
    wherein at least one of interior angles of the n-gon shape is 100° or less.

6. The positive electrode active material of a lithium-ion secondary battery according to claim 1,
    wherein the third component has a substantially polygonal columnar shape.

7. The positive electrode active material of a lithium-ion secondary battery according to claim 1, further comprising a fourth component between the first component and the second component,
    wherein the space is between the fourth component and the third component.

8. The positive electrode active material of a lithium-ion secondary battery according to claim 1,
    wherein the metal comprises at least one of iron, manganese, cobalt, and nickel.

9. The positive electrode active material of a lithium-ion secondary battery according to claim 1,
    wherein the third component is thicker than any one of the first component and the second component.

10. The positive electrode active material according to claim 9,
    wherein the first component, the second component, and the third component are polyhedrons having a different number of surfaces.

11. The positive electrode active material according to claim 9,
    wherein the third component does not extend beyond the first component and the second component,
    wherein the first component and the second component entirely cover the third component.

12. The positive electrode active material of a lithium-ion secondary battery according to claim 1,
    wherein the first component, the second component, and the third component has an H-shape.

13. A secondary battery comprising:
    a positive electrode comprising the positive electrode active material according to claim 1;
    a negative electrode; and
    an electrolyte.

14. A battery management unit comprising:
    the secondary battery according to claim 13; and
    a control circuit.

15. An electronic device comprising:
    the secondary battery according to claim 13; and
    at least one of a power switch and a display device.

16. An electronic device comprising:
    the secondary battery according to claim 13; and
    an input-output terminal,
    wherein the input-output terminal is configured to perform wireless communication.

17. A positive electrode active material of a lithium-ion secondary battery, comprising a particle having substantially an H-shape,
    wherein the particle comprises a first component, a second component, and a third component,
    wherein the third component positioned between the first component and the second component is larger than a space between the first component and the second component,
    wherein the particle has a size in the range of 0.3 μm to 7 μm, and
    wherein each of the first component, the second component, and the third component comprises lithium iron phosphate.

18. The positive electrode active material of a lithium-ion secondary battery according to claim 17, wherein lithium iron phosphate is $LiFePO_4$.

19. A secondary battery comprising:
a positive electrode comprising the positive electrode active material according to claim 17;
a negative electrode; and
an electrolyte.

20. The positive electrode active material of a lithium-ion secondary battery according to claim 1, further comprising a particle,
wherein a size of the particle is in the order of micrometer.

21. The positive electrode active material of a lithium-ion secondary battery according to claim 1,
wherein only one component is present between the first component and the second component.

22. The positive electrode active material of a lithium-ion secondary battery according to claim 1,
wherein the first component, the second component, and the third component are continuously connected so as to form a single entity.

* * * * *